US012762260B2

(12) United States Patent
Joshi et al.

(10) Patent No.: US 12,762,260 B2
(45) Date of Patent: Oct. 13, 2026

(54) SYSTEMS AND METHODS FOR PROTECTING TOKENS USING A UNIFIED CONTAINERIZED FRAMEWORK

(71) Applicant: Wells Fargo Bank, N.A., San Francisco, CA (US)

(72) Inventors: Arushi Sood Joshi, San Francisco, CA (US); Gregory T. Maddox, San Francisco, CA (US); Michael R. Flood, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 19/034,426

(22) Filed: Jan. 22, 2025

(65) Prior Publication Data

US 2026/0212033 A1 Jul. 23, 2026

(51) Int. Cl.
*G06F 21/00* (2013.01)
*G06F 21/60* (2013.01)
*G06F 21/62* (2013.01)

(52) U.S. Cl.
CPC ........ *G06F 21/6209* (2013.01); *G06F 21/604* (2013.01)

(58) Field of Classification Search
None
See application file for complete search history.

(56) References Cited

U.S. PATENT DOCUMENTS

| | | | |
|---|---|---|---|
| 11,438,147 | B2 | 9/2022 | Afanasyeva et al. |
| 2008/0212504 | A1 | 9/2008 | Venkataraman et al. |
| 2015/0358161 | A1 | 12/2015 | Kancharla et al. |
| 2017/0339130 | A1 | 11/2017 | Reddy et al. |
| 2019/0052456 | A1 | 2/2019 | Bygrave et al. |
| 2020/0169584 | A1 | 5/2020 | Penner et al. |
| 2022/0232043 | A1 | 7/2022 | Penner et al. |
| 2024/0020779 | A1 | 1/2024 | Larsen et al. |
| 2024/0281798 | A1 | 8/2024 | Lindell et al. |
| 2025/0165956 | A1 | 5/2025 | Malik |
| 2025/0293882 | A1 | 9/2025 | Gilchrist et al. |
| 2025/0335620 | A1 | 10/2025 | Levinson et al. |
| 2025/0385807 | A1 | 12/2025 | Finlow-Bates et al. |

FOREIGN PATENT DOCUMENTS

| | | | | |
|---|---|---|---|---|
| CN | 103390124 A | * | 11/2013 | |
| WO | WO-2026020567 A1 | * | 1/2026 | ............... H04L 9/16 |

* cited by examiner

*Primary Examiner* — Andrew J Steinle
(74) *Attorney, Agent, or Firm* — Foley & Lardner LLP

(57) ABSTRACT

Systems, method, and computer readable medium (CRM) for protecting tokens using a unified containerized framework. Some systems include a data processing system including memory and one or more processors configured to receive, from a user device, a protected record authorization for obtaining protection records and obtain, using a protected data channel, the plurality of protection records. The processors further configured to generate tokens encapsulating a metadata object, wherein each token includes a token control structure that restricts an update or an output to the metadata object. The processors further configured to store the tokens and generate a root control structure to apply operational rules for metadata object updates. The processors further configured to detect at least one off-chain event or condition and update the metadata object based on updating at least one of a status attribute of a token or a quant attribute of the token.

20 Claims, 8 Drawing Sheets

SYSTEMS AND METHODS FOR PROTECTING TOKENS USING A UNIFIED CONTAINERIZED FRAMEWORK

BACKGROUND

The present disclosure relates generally to assets, and more particularly to digital and non-digital asset protection. In a computer networked environment such as the internet, users, and entities such as people or companies exchange and store assets and other digital representations.

SUMMARY

Some implementations relate to a system, including a data processing system including memory and one or more processors. The one or more processors configured to receive, from a user device, a protected record authorization for obtaining a plurality of protection records, the plurality of protection records corresponding to a plurality of control nodes, wherein each protection record of the plurality of protection records includes at least a quant measure, a classification index, and an identifier. The one or more processors configured to obtain, using a protected data channel, the plurality of protection records from each control node of the plurality of control nodes based on performing at least one handshake verifying a source of each control node of the plurality of control nodes. The one or more processors configured to generate, based on the plurality of protection records, a set of tokens encapsulating a metadata object, wherein each token includes a token control structure that restricts an update or an output to the metadata object, and wherein the metadata object includes at least one status attribute corresponding with an operational state of a corresponding protection record and at least one quant attribute corresponding with tracking an update in the quant measure of the corresponding protection record. The one or more processors configured to store, in a ledger storage, the set of tokens. The one or more processors configured to generate a root control structure to apply a plurality of operational rules for metadata object updates, wherein the root control structure includes executable instructions to interface with a plurality of metadata objects of the set of tokens. The one or more processors configured to detect, using the root control structure, at least one off-chain event or condition corresponding with at least one protection record of the plurality of protection records. The one or more processors configured to, in response to detecting the at least one off-chain event or condition, update, on the ledger storage using at least one of the root control structure or the token control structure, the metadata object based on updating at least one of a status attribute of a token of the set of tokens or a quant attribute of the token of the set of tokens.

In some implementations, the root control structure includes additional executable instructions to interface with the token control structure of each token of the set of tokens by embedding operational logic into the metadata object, wherein the operational logic includes a plurality of instructions for updating the status attribute or the quant attribute based on the at least one off-chain event or condition detected by the root control structure.

In some implementations, to update the metadata object, the one or more processors configured to update, using at least one of the root control structure or the token control structure and the plurality of instructions, the status attribute indicating at least one of a state change or updated status corresponding with the operational state of the corresponding protection record. In some implementations, to update the metadata object, the one or more processors configured to update, using at least one of the root control structure or the token control structure and the plurality of instructions, the quant attribute of the token based at least on the update to the quant measure of the corresponding protection record.

In some implementations, to detect the at least one off-chain event or condition, the one or more processors configured to receive, using at least one of the root control structure or the token control structure and the protected data channel, a synchronization indicator from one or more control nodes of the plurality of control nodes, wherein the synchronization indicator corresponds with at least one of receipt or detection of updated resource data corresponding with the corresponding protection record or identification of a predefined temporal event corresponding with the one or more control nodes.

In some implementations, to detect the at least one off-chain event or condition, the one or more processors configured to determine at least one of an exchange at one or more control nodes of the plurality of control nodes updating the quant measure of the corresponding protection record or update the quant measure of the corresponding protection record based on a re-modeling applied by the one or more control nodes.

In some implementations, the one or more processors configured to validate, using a first public key of a first public-private key pair corresponding with at least one control node of the plurality of control nodes, a first cryptographic signature of the corresponding protection record, wherein the first cryptographic signature is generated using a first private key of the first public-private key pair. The one or more processors configured to embed a second cryptographic signature in at least one field of the metadata object of the token, wherein the second cryptographic signature is generated using a second private key of a second public-private key pair corresponding with the data processing system or a third private key of the at least one control node.

In some implementations, the one or more processors configured to store or provide, using the ledger storage or the protected data channel, a second public key of the second public-private key pair. The one or more processors configured to perform, using at least one of the root control structure or the token control structure, the update to the metadata object in response to validating the second cryptographic signature using the second public key, wherein validating includes extraction of the second cryptographic signature from the at least one field of the metadata object, decryption, using the second public key, of the second cryptographic signature to generate a validation hash, and comparison of the validation hash to a computed hash of the metadata object.

In some implementations, the one or more processors configured to perform, using the protected data channel, the at least one handshake based on at least one of (i) exchanging at least one of the first public key and the second public key with the at least one control node, (ii) executing a challenge-response protocol with the at least one control node, or (iii) analyzing a digital certificate provided by the at least one control node. The one or more processors configured to restrict, using the token control structure, the update to the metadata object based on determining that a validation of the second cryptographic signature indicates a variation between the second cryptographic signature and a computed hash of the metadata object.

In some implementations, the one or more processors configured to identify, based on the classification index, a plurality of resource descriptors corresponding with the plurality of protection records. The one or more processors configured to identify, based on the plurality of resource descriptors and a plurality of quant attributes of the set of tokens, a resource distribution corresponding with the set of tokens.

In some implementations, the quant attribute of the token includes at least one numeric or alphanumeric data field of the metadata object indicating a resource quantity of the corresponding protection record, and wherein the update in the quant measure of the corresponding protection record is based on an off-chain or on-chain modification to the resource quantity.

Some implementations relate to a method, including receiving, by one or more processors of a data processing system from a user device, a protected record authorization for obtaining a plurality of protection records, the plurality of protection records corresponding to a plurality of control nodes, wherein each protection record of the plurality of protection records includes at least a quant measure, a classification index, and an identifier. The method further includes obtaining, by the one or more processors using a protected data channel, the plurality of protection records from each control node of the plurality of control nodes based on performing at least one handshake verifying a source of each control node of the plurality of control nodes. The method further includes generating, by the one or more processors based on the plurality of protection records, a set of tokens encapsulating a metadata object, wherein each token includes a token control structure that restricts an update or an output to the metadata object, and wherein the metadata object includes at least one status attribute corresponding with an operational state of a corresponding protection record and at least one quant attribute corresponding with tracking an update in the quant measure of the corresponding protection record. The method further includes storing, by the one or more processors in a ledger storage, the set of tokens. The method further includes generating, by the one or more processors, a root control structure to apply a plurality of operational rules for metadata object updates, wherein the root control structure includes executable instructions to interface with a plurality of metadata objects of the set of tokens. The method further includes detecting, by the one or more processors using the root control structure, at least one off-chain event or condition corresponding with at least one protection record of the plurality of protection records. The method further includes, in response to detecting the at least one off-chain event or condition, updating, by the one or more processors on the ledger storage using at least one of the root control structure or the token control structure, the metadata object based on updating at least one of a status attribute of a token of the set of tokens or a quant attribute of the token of the set of tokens.

In some implementations, the root control structure includes additional executable instructions to interface with the token control structure of each token of the set of tokens by embedding operational logic into the metadata object, wherein the operational logic includes a plurality of instructions for updating the status attribute or the quant attribute based on the at least one off-chain event or condition detected by the root control structure.

In some implementations, updating the metadata object includes updating, by the one or more processors using at least one of the root control structure or the token control structure and the plurality of instructions, the status attribute indicating at least one of a state change or updated status corresponding with the operational state of the corresponding protection record or updating, by the one or more processors using at least one of the root control structure or the token control structure and the plurality of instructions, the quant attribute of the token based at least on the update to the quant measure of the corresponding protection record.

In some implementations, detecting the at least one off-chain event or condition includes receiving, by the one or more processors using at least one of the root control structure or the token control structure and the protected data channel, a synchronization indicator from one or more control nodes of the plurality of control nodes, wherein the synchronization indicator corresponds with at least one of receipt or detection of updated resource data corresponding with the corresponding protection record or identification of a predefined temporal event corresponding with the one or more control nodes.

In some implementations, detecting the at least one off-chain event or condition includes determining, by the one or more processors, at least one of an exchange at one or more control nodes of the plurality of control nodes updating the quant measure of the corresponding protection record or updating, by the one or more processors, the quant measure of the corresponding protection record based on a remodeling applied by the one or more control nodes.

In some implementations, the method can further include validating, by the one or more processors using a first public key of a first public-private key pair corresponding with at least one control node of the plurality of control nodes, a first cryptographic signature of the corresponding protection record, wherein the first cryptographic signature is generated using a first private key of the first public-private key pair and embedding, by the one or more processors using the token control structure, a second cryptographic signature in at least one field of the metadata object of the token, wherein the second cryptographic signature is generated using a second private key of a second public-private key pair corresponding with the data processing system or a third private key of the at least one control node.

In some implementations, the method can further include storing or providing, by the one or more processors using the ledger storage or the protected data channel, a second public key of the second public-private key pair and performing, by the one or more processors using at least one of the root control structure or the token control structure, the update to the metadata object in response to validating the second cryptographic signature using the second public key, wherein validating includes extraction of the second cryptographic signature from the at least one field of the metadata object decryption, using the second public key, of the second cryptographic signature to generate a validation hash and comparison of the validation hash to a computed hash of the metadata object.

In some implementations, the method can further include performing, by the one or more processors using the protected data channel, the at least one handshake based on at least one of (i) exchanging at least one of the first public key and the second public key with the at least one control node, (ii) executing a challenge-response protocol with the at least one control node, or (iii) analyzing a digital certificate provided by the at least one control node and restricting, by the one or more processors using the token control structure, the update to the metadata object based on determining that a validation of the second cryptographic signature indicates a variation between the second cryptographic signature and a computed hash of the metadata object.

In some implementations, the method can further include determining, by the one or more processors based on the classification index, a plurality of resource descriptors corresponding with the plurality of protection records and identifying, by the one or more processors based on the plurality of resource descriptors and a plurality of quant attributes of the set of tokens, a resource distribution corresponding with the set of tokens.

Some implementations relate to a non-transitory computer readable medium (CRM) including one or more instructions stored thereon that, when executed by one or more processors, cause the one or more processors to perform operations including receiving, from a user device, a protected record authorization for obtaining a plurality of protection records, the plurality of protection records corresponding to a plurality of control nodes, wherein each protection record of the plurality of protection records includes at least a quant measure, a classification index, and an identifier, obtaining, using a protected data channel, the plurality of protection records from each control node of the plurality of control nodes based on performing at least one handshake verifying a source of each control node of the plurality of control nodes, generating, based on the plurality of protection records, a set of tokens encapsulating a metadata object, wherein each token includes a token control structure that restricts an update or an output to the metadata object, and wherein the metadata object includes at least one status attribute corresponding with an operational state of a corresponding protection record and at least one quant attribute corresponding with tracking an update in the quant measure of the corresponding protection record, storing, in a ledger storage, the set of tokens, generating a root control structure to apply a plurality of operational rules for metadata object updates, wherein the root control structure includes executable instructions to interface with a plurality of metadata objects of the set of tokens, detecting, by the one or more processors using the root control structure, at least one off-chain event or condition corresponding with at least one protection record of the plurality of protection records, and in response to detecting the at least one off-chain event or condition, updating, on the ledger storage using at least one of the root control structure or the token control structure, the metadata object based on updating at least one of a status attribute of a token of the set of tokens or a quant attribute of the token of the set of tokens.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers indicate identical, functionally similar, and/or structurally similar elements.

Figure 1:
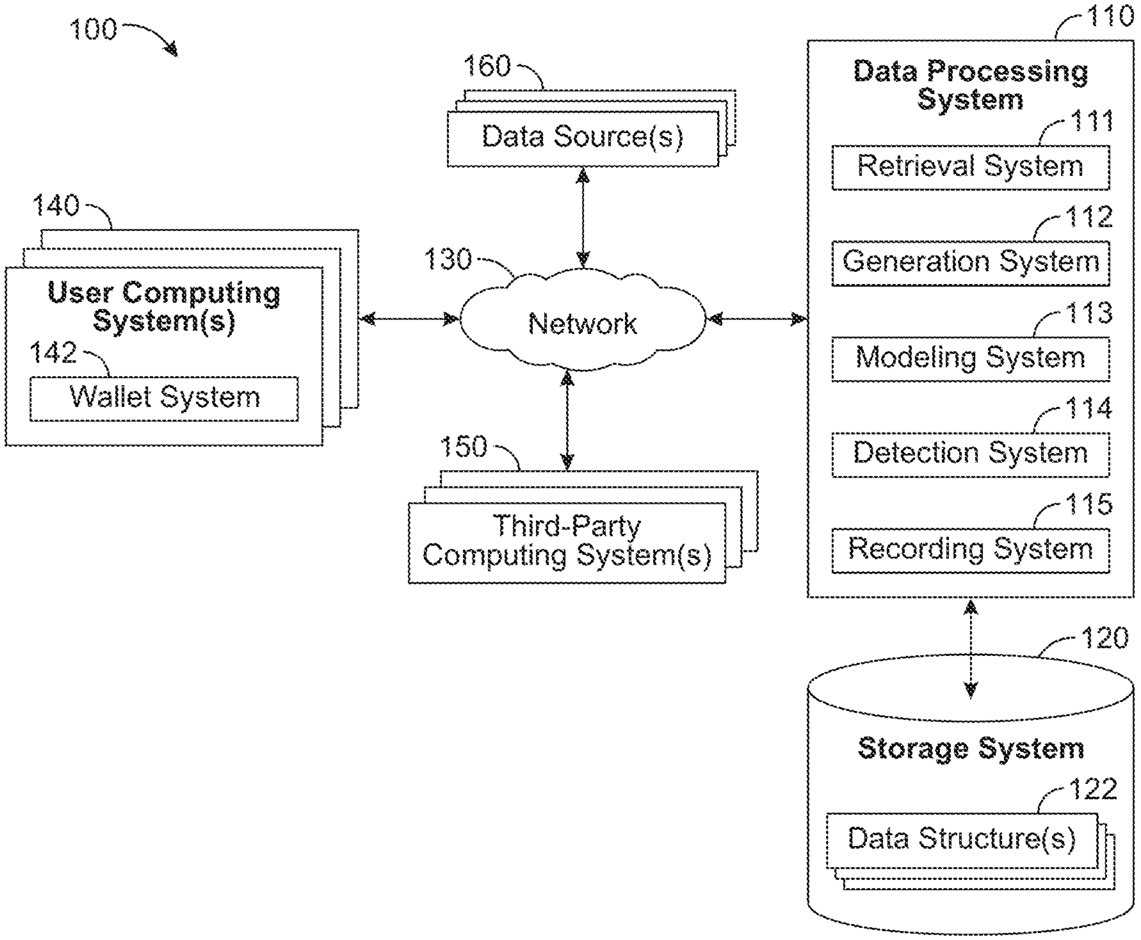
FIG. 1 depicts a block diagram of an example system, according to some implementations.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

This disclosure relates to systems and methods for digital or software-based management of resources in an account. Modern implementations often include token-based architectures (e.g., tokenization platforms, distributed ledgers, and/or various account-management frameworks) to support operations such as real-time execution of decisions, reduction of manual errors, and/or reduction of reliance on human involvement. However, certain types of accounts, including those sometimes referred to as Unified Managed Accounts (UMAs), can pose significant challenges due to the scale of usage and technical complexity.

Some methods for implementing tokenized accounts are not capable of handling large volumes of token-based operations while maintaining adequate security or performance. For example, existing infrastructures (e.g., blockchain platforms) can lack the robustness to handle resource tokenization tasks, which can increase the cost for initial setup, ongoing maintenance, and/or security measures (e.g., protection against cyber threats). In addition, regulatory and compliance demands for tokenized resource management can be fluid and context dependent, creating further uncertainties. Conventional digital platforms that address such functionalities can often be limited to localized user bases and remain fragmented when viewed across multiple entities.

Systems and methods in accordance with the present disclosure can address these challenges by providing a digital platform and/or infrastructure that supports automated management of tokenized resources in an account, such as a UMA. For example, the system can perform suitability checks, rebalancing operations, and/or similar actions in real time (or near real-time). In some implementations, a single user account can store tokens representing liquid resources (e.g., exchanged resources, such as common equities) and tokens representing illiquid resources (e.g., annuities or ownership stakes in private partnerships). The system can create intermediate data structures (e.g., sleeve tokens) based on the attributes of these tokens, thus facilitating actions at the sleeve level rather than at the level of individual tokens. This approach can reduce computational overhead by minimizing and/or reducing low-level asset token operations.

In some implementations, a two-level suitability check can be performed to determine whether the combination of liquid tokens and illiquid tokens in a single account aligns with certain objectives. For example, tokens for liquid resources (e.g., stocks and/or bonds) can be processed through a direct trading solution, whereas tokens for illiquid resources (e.g., non-publicly traded entities) can require specialized workflows. Conventional approaches often do not incorporate both liquid and illiquid tokens in one structure, which can lead to inefficiencies in resource placement and transaction processes. By contrast, the systems and methods described in this disclosure can process both resource types, while analyzing factors such as liquidity and operational constraints.

In some implementations, the digital platform can dynamically update the management logic based on real-time (or near real-time) changes to resource parameters and user profiles. For example, when processing an account that includes both commonly traded and less liquid tokens, the system can register performance metrics (e.g., settlement times and/or difficulty in placing trades) and recalculate token parameters to process changing conditions. Thus, the systems and methods described herein can provide a universal scheme for large-scale tokenized resource management, addressing complexities that arise when multiple entities, diverse token types, and/or specialized workflows are involved.

This disclosure also relates to systems and methods for dynamic data management within a unified computational framework. Traditional data processing systems often handle a variety of data sources, such as external resource feeds, decentralized data repositories, and/or independent processing nodes, resulting in fragmented and inconsistent data views. These systems rely on periodic synchronization processes that fail to adapt dynamically to operational changes, leading to inefficiencies in data validation and update procedures. For example, systems that process diverse data sets (e.g., transactional data, resource allocations, and/or compliance records) encounter challenges in maintaining consistent state representations across different environments.

Traditional approaches often employ fixed data validation models or manual reconciliation processes that are insufficient for dynamically changing data environments. For example, these models lack flexibility to account for variations in data attributes, such as lifecycle states, update frequencies, and/or threshold conditions. Moreover, reliance on static validation logic can lead to delays in detecting inconsistencies, such as breaches of operational thresholds or deferred update conditions, thereby increasing processing overhead and reducing system responsiveness. Implementations of the present disclosure relate to systems and methods for dynamic data partitioning and validation within a unified containerized framework. A data processing system can receive descriptors corresponding to various data objects, where a first subset represents dynamically updateable data and a second subset corresponds to restricted or conditionally updateable data. The system generates a unified container structure, partitioned into sub-containers, at least one (e.g., each) encapsulating metadata elements and/or operational markers for the respective data objects.

Systems and methods in accordance with the present disclosure can improve data processing by dynamically determining and applying operational parameters based on system conditions or external triggers. For example, the system can validate compliance with lifecycle restrictions or detect threshold breaches, facilitating dynamic updates for unrestricted data while deferring updates for restricted data. By partitioning data into sub-containers and applying specific validation rules, the system improves consistency and traceability. The disclosed systems and methods dynamically validate and update data partitions based on operational conditions and predefined parameters. By employing a unified containerized framework, the system can receive a plurality of data descriptors, at least one (e.g., each) encapsulating metadata and operational attributes. The data descriptors can be categorized into sub-containers according to their lifecycle characteristics, allowing customized validation and improved technical solutions.

For example, global validation parameters can be applied to the unified container to ensure overall system integrity, and specific conditions can be applied to restricted sub-containers to enforce lifecycle constraints. In some examples, updates to restricted data objects can be deferred based on operational markers or threshold conditions, while unrestricted data objects can be updated in real time. By maintaining detailed metadata records, the system ensures an audit trail and facilitates efficient data management. These systems and methods improve data consistency, reduce manual intervention, and/or optimize operational workflows across applications. For example, the system can dynamically adapt to external triggers, such as synchronization indicators or off-chain events, facilitating efficient partitioning and validation processes in distributed data environments.

This disclosure also relates to systems and methods for self-executing instructions applied to on-chain and off-chain resources. Certain implementations can process multiple resource classes, such as digital tokens, fractional data records, and/or physical representations, to facilitate tasks (e.g., real-time updates, multi-participant allocations, and data-intensive processes). Traditional approaches for handling such resources, including purely manual verification or exclusive reliance on offline confirmations, can lead to inefficiencies due to idle periods and administrative bottlenecks. For example, some systems can wait for a full external validation before performing updates, introducing processing delays. Alternatively, fragmented off-chain tracking can reduce some delays but can introduce overhead (e.g., repeated validations at multiple stages), degrading overall performance when a large number of resources or participants are involved.

Some methods for resource allocation, such as fixed distribution rules or manual adjustments, often cannot adequately address dynamic conditions. These approaches can fail to adapt in real time (or near real time) to changes in workload, different resource types, or available storage ledgers. For example, assigning fixed rules to all resources regardless of their liquidity or classification can be inefficient under varying operational conditions. Additionally, manual changes can be inconsistent or prone to human error. These methods can also lack the flexibility to accommodate diverse examples and scenarios, resulting in further inefficiencies.

Systems and methods according to this disclosure can improve instruction execution by determining distribution triggers based on real-time (or near real-time) parameters, such as on-chain event states, off-chain data signals, resource dimension attributes, or container-level constraints. That is, the disclosed system can determine when to initiate or finalize distribution (e.g., allocating updated token shares) by referencing a rules system that models account triggers (e.g., external confirmations, new resource attributes, and/or ledger states). For example, the system can analyze an off-chain feed and set a distribution parameter (e.g., adjusting a token's attribute) while adhering to operational markers (e.g., lock periods or special approval flags). This logic can be updated dynamically (e.g., periodically or continuously) based on feedback regarding performance or new resource assignments. The modeling can be used in a variety of implementations, including automated processing of digital/physical resources, multi-participant resource sharing, and/or other multi-resource environments.

In some implementations, the system can determine distribution parameters using a rules system that can balance operational efficiency with technical constraints (e.g., ensuring updates occur after certain markers are satisfied). For example, the system can determine an updated parameter for resource assignments without exceeding constraints defined by control structures that govern the container. Additionally, the system can use a designated processing component to process both initialization and runtime operations. For example, during initialization, default configurations can be loaded (e.g., initial addresses, condition flags). During runtime, the system can continuously, automatically, autonomously, and/or regularly register off-chain triggers (e.g., external data feeds) or ledger events, recalculate distribution parameters, and/or apply updated logic for subsequent resource updates. Thus, the systems and methods described herein provide technical improvements in multi-resource management, reducing manual steps and facilitating flexible distribution across various resource classes.

In some implementations, the system can process at least one first update based on an initial distribution parameter (e.g., an allocation percentage). For example, the system can log the update in ledger storage. In another example, the system can modify one or more performance metrics (e.g., latency statistics) after executing the first update. Based on these metrics, the system can determine a second distribution parameter. The system can then apply, in real time, the second distribution parameter so that subsequent on-chain or off-chain triggers cause a recalculated allocation consistent with the updated rules.

This disclosure relates to systems and methods for managing tokenized data structures within distributed computational frameworks. Conventional data systems often face challenges in synchronizing dynamic updates across diverse datasets, leading to inefficiencies in maintaining consistent and accurate records. For example, decentralized environments that rely on periodic data synchronization can encounter delays in reflecting real-time changes, particularly when managing heterogeneous data assets with varying lifecycle constraints and validation requirements. Traditional data validation models are typically static and unable to dynamically adapt to operational changes such as regulatory triggers, system reconfigurations, or data updates from external sources. This inflexibility often results in delayed detection of threshold violations, incomplete updates, and increased processing overhead. For example, synchronization delays in decentralized systems can include the consistency and accuracy of data views across interconnected environments.

Implementations of the present disclosure provide a unified containerized framework for dynamically managing data through tokenized representations. The system can categorize data into sub-containers based on lifecycle attributes and applies validation and update processes to facilitate consistency and responsiveness. The framework can include a root control structure that interfaces with tokenized metadata objects to enforce operational rules and detect external triggers. By dynamically adjusting operational parameters and metadata states, the system provides a technical solution for handling data inconsistencies and responding to off-chain events in real time.

Systems and methods in accordance with the present disclosure dynamically validate and manage tokenized data within a unified container framework. Data descriptors can encapsulate metadata objects containing attributes such as operational states and lifecycle markers, which can be used to categorize data into sub-containers for efficient validation and update processes. Multi-level validation processes can ensure compliance with global operational rules while addressing specific lifecycle constraints for restricted data subsets. For example, in examples of threshold breaches or deferred update conditions, the system can restrict updates to the corresponding sub-container, logging the condition within the metadata object. Unrestricted data updates proceed without interruption, improving data flow and ensuring consistent system performance. The disclosed system dynamically adapts to external triggers and operational changes, such as synchronization signals or rebalancing events, facilitating improved data processing across a variety of applications. By using tokenized data models and real-time (or near real-time) validation, the system enhances data consistency, operational efficiency, and/or responsiveness in distributed environments.

As used herein, in some implementations, a “digital asset” (or a “tokenized asset”) can include a data package or structure including information (e.g., values in fields) and an amount of digital or virtual currency that is owned by one or more parties (e.g., user, individual, institution, company, or so on) and used to perform exchanges (e.g., for goods or services) in a computer networked environment. The digital asset can be encrypted and decrypted using one or more public and private key pairs (sometimes referred to as a “verification and signing key pair”). In some implementations, the digital asset can be in the form of a token (e.g., a fungible token, a Non-Fungible Token (NFT), etc. In some implementations, a digital asset can be a digital form of a fiat currency of one or more nations, one or more countries, or one or more regions. In some implementations, the digital asset may be issued by a central provider (e.g., Federal Reserve System (FRS)), or by a specific provider (e.g., bank). The digital asset may be a Math-Based Currency (MBC) (e.g., cryptocurrency, Bitcoin, Ethereum, Stablecoin Tether (USDT), USD Coin (USDC)) or derived (for example, as a token) from cryptocurrency. The digital asset can be a central bank digital currency (CBDC) (e.g., Digital USD, Digital Euro, Digital Japanese Yen, Digital British Pound, Digital Swiss Franc) or derived (for example, as a token) from CBDC. In various implementations, the digital asset can include information in one or more metadata fields that may be modified by the one or more parties. Furthermore, smart contracts can be configured to provide one or more functionalities of the digital asset and can be wrapped into the data package or block data of the digital asset.

Additionally, in the context of the transactions or exchange processes corresponding with digital assets within a DLT network, public and private key pairs can be used to verify the security and integrity of exchanges. The key pairs can be used for encryption and decryption processes to safeguard the digital assets and validate transactions. For example, when a first user (transferor or sender) initiates an exchange request on a first DLT network, a private key of the first user can be used to sign the transaction. The digital signature of the first user can verify that the transaction has been initiated by the rightful owner of the digital asset. In some examples, the transaction, including data such as a source identifier, destination identifier, and amount of the digital asset (e.g., MBC) can be encrypted using the private key of the first user. The encryption using the first key of the first user can validate that transaction data remain secure and tamper-proof as the transaction data is transmitted and received over a network. In this example, on the receiving end, the processing circuits associated with a second DLT network can use the public key of the first user to decrypt and validate the exchange notification. The public key can decrypt the transaction encrypted by the corresponding private key and thereby confirm the authenticity and integrity of the transaction. Moreover, the process of creating a new block on the blockchain in both DLT networks can include the use of public and private keys. For example, when a new block is created and added to the blockchain, the block can be encrypted with a private key and can be verified by entities on the network using the corresponding public key.

As used herein, a "user" generally refers to an entity identified by the universal unique identifier and a user identifier used by each of one or more network (e.g., each provider institution, platform, application, enterprise, etc.). In some implementations, a user includes a customer, client, or operator of multiple provider institutions, platforms, applications, enterprises, etc., such that the user has multiple user identifiers and a universal unique identifier. In that regard, the user has an account with each of the multiple provider institutions, platforms, applications, enterprises, etc.

As used herein, a "transaction" or "exchange" generally refers to a transfer of a digital asset of a first user (transferor or sender) to a second user (transferee or receiver), where both the first user and the second user to the transaction are identified by respective universal unique identifiers. Examples of transactions or exchanges include transferring the digital asset from a digital wallet of the first user to a digital wallet of the second user, updating an ownership of the digital asset in distributed ledgers or blockchain databases, updating the public-private key pair of the digital asset to include the public key of the second user to be associated with the digital asset, etc.

As used herein, "smart contract" or "control structure" generally refers to a self-executing code (e.g., in a ledger network or other system) that executes when a set of conditions that have been agreed upon by the parties of the smart contract are met. Although the FIGS. and specification generally discuss utilizing smart contracts or control structures on funds or digital assets, the systems, methods, and apparatuses disclosed herein can also be used for a plurality of types of non-fungible or fungible assets, such as but not limited to commodities, common shares, options, dollar bills, fiat currency, digital currency, tokens, deeds, leases, wills, trusts, other exchanges, non-smart contracts, traditional legal contracts, financial disbursements, taxes, and other types of non-fungible or fungible assets parties use and exchange. Parties to the smart contract for funds or digital assets or other types of non-fungible or fungible assets may be individuals, companies, organizations, entities, providers, the government, and so on.

It should be understood that "real-time" as used herein does not necessarily mean instantaneous, but rather refers to a process or system in which information is updated at a frequency that is suitable for an intended purpose, thus facilitating timely responses and decisions based on the most recent data available.

Referring now to FIG. 1, a block diagram illustrating an example system 100 is shown, according to some implementations. As illustrated by way of example in FIG. 1, an example system 100 can include at least a data processing system 110, a storage system 120, a network 130, one or more user computing system(s) 140, one or more third-party computing system(s) 150, and one or more data source(s) 160. The data processing system 110 can include a retrieval system 111, a generation system 112, a modeling system 113, a detection system 114, and a recording system 115. The data processing system 110 can include or, as shown, be communicatively coupled or linked to the storage system 120, and the storage system 120 can include one or more data structure(s) 122. The user computing system(s) 140 can include a wallet system 142. Although the various computing elements of FIG. 1 can be described in the singular form below (e.g., network 130, user computing system 140, etc.), it should be understood that the example system 100 can include two or more of any device/system described herein (e.g., two or more network(s) 130, two or more user computing system(s) 140, etc.).

In some implementations, the data processing system 110 can be configured or structured to perform various operations for unified account management and/or dynamic trust execution, as further described herein. For example, the data processing system 110 can perform operations including, but not limited to, transmitting or receiving data, interfacing with control nodes, retrieving or analyzing protection records or resource descriptors, generating dynamic trust instruments, allocating or distributing resources, tokens, or other assets, detecting triggers, events, or conditions, generating or updating tokens, and/or generating or updating metadata objects, control structures, or attributes corresponding to resources or tokens. In some implementations, one or more of the subcomponents of the data processing system 110, such as retrieval system 111, generation system 112, modeling system 113, detection system 114, and/or recording system 115, can be configured or structured to perform such operations.

For example, the data processing system 110 generate real-time and/or aggregated information corresponding with customer investments across multiple domains by integrating data from various on-chain and off-chain sources. That is, the data processing system 110 can process and consolidate data from broker-dealer systems, deposit accounts, investment accounts, insurance accounts, and other financial platforms into a unified representation or account (e.g., container). In some examples, customers can manually add private assets not associated with traditional financial institutions, which can then be verified and tokenized on-chain. The data processing system 110 can connect to external accounts using distributed ledger technology (DLT), APIs, or other encrypted or protected data channels to facilitate synchronization of account balances and retrieval of asset information (e.g., resources, descriptors, data objects, tokens, etc.). For example, the data processing system 110 can retrieve and update asset information, such as account balances or distribution conditions, in real-time, near real-time, or at an agreed-upon frequency. In some implementation, the data processing system can tokenize at least one (e.g., each) asset or resource associated with a customer and represent a total balance for an account using a token or tokenized representation. As off-chain balances are updated, the data processing system 110 can mirror or update such off-chain events or conditions on-chain by updating corresponding token balances on a ledger or other distributed storage system (e.g., using mirror tokens). The data processing system 110 can analyze or access the unified account (e.g., unified management account or UMA) or container to derive various insight (e.g., at the asset class, asset mix, or individual asset level), assign risk ratings, determine investor accreditation, provide customized advisory services, and/or extend credit and margin to customers.

In some examples, the data processing system 110 can process and manage tokens associated with customer accounts or unified representations of financial resources. For example, the data processing system 110 can generate tokens structured to represent various attributes of an account, such as institutional identifiers (e.g., IDs for participating banks or brokerages), user identifiers (e.g., customer account numbers, container or sub-container identifiers, linked identifiers across general and distributed ledgers, etc.), asset classifications (e.g., liquid assets, illiquid assets, equities, fixed income payments, cryptocurrencies, non-fungible items, etc.), transaction or exchange data (e.g., new, edited, or deleted counters associated with token attributes or parameters), and asset balances (e.g., numeric or alphanumeric parameters representing a value associated with tokenized resources). In some implementations, at least one (e.g., each) token can include or correspond with embedded code (e.g., smart contracts or token control structures) and/or metadata (e.g., metadata objects). The embedded instructions and/or data can include refresh intervals (e.g., linked to a refresh schedule or event triggers), operational conditions (e.g., collateral tagging for loan issuance), and/or instruction or logic for portfolio adjustments (e.g., auto-rebalancing based on predefined rules).

That is, the data processing system 110 can update tokens dynamically in response to changes in off-chain or on-chain conditions. For example, tokens can be refreshed based on collateral adjustments, executed trades, or synchronized updates between distributed ledger technology (DLT) (e.g., on-chain ledgers and/or storage) and general ledger technology (GLT) (e.g., off-chain ledgers and/or storage). In some implementations, the data processing system 110 can utilize smart contracts to query updated information, perform risk determinations, and/or execute portfolio rebalances or other operations. For example, a smart contract can encode instructions to automatically rebalance a portfolio or unified account by analyzing asset distributions across GLT and DLT systems, determining discrepancies, and/or performing token transactions to align with target allocations and/or other rules or conditions. That is, the data processing system 110 can update or generate smart contracts within a set of tokens in a unified container to self-execute on DLT and/or GLT infrastructures and automatically mirror changes across tokenized assets and financial accounts.

In some implementations, the data processing system 110 can generate and manage a root control structure to govern operations associated with tokenized assets and financial accounts. A root control structure can operate as a foundational or system-level control element (e.g., mother smart contract in a mother-child hierarchy) that interfaces with one or more token-level control structures. That is, the root control structure can encode and enforce rules, parameters, or instructions that apply across at least one (e.g., each) of a set of tokens, a unified container, and/or included sub-containers. For example, the root control structure can manage the synchronization of token updates across distributed ledger technology (DLT) and general ledger technology (GLT), detect execution triggers or other events/conditions, coordinate portfolio rebalancing operations, and/or monitor compliance with resource allocation policies. In some implementations, the root contract can dynamically update tokens by injecting code and/or smart contract logic into tokens control structures (e.g., encoding conditions for portfolio rebalancing, instructions for asset distributions, triggers for token state changes, etc.).

In some examples, the data processing system 110 can update and/or generate mirror tokens to maintain synchronization between distributed ledger technology (DLT) and general ledger technology (GLT) systems. For example, the data processing system 110 can generate and update mirror tokens corresponding to assets within a portfolio or account of a customer. At least one (e.g., each) mirror token can encode state-based attributes (e.g., asset quantity, transaction status, collateral status) and can be updated by the data processing system 110 in response to detected transactions or other events. For example, in response to a sale of 50 out of 100 shares of an asset (e.g., a resource, such as equity), the data processing system 110 can adjust a corresponding mirror token digitally representing the asset by updating a metadata field to indicate an adjustment (e.g., updating a state attribute from "current" to "edited") and/or updated value (e.g., via a counter) to reflect the remaining 50 shares. If the asset position is entirely liquidated, the state can be updated to "deleted."

In an example, the data processing system 110 can use one or more smart contracts to rebalance a portfolio with 50% GLT stocks and 50% DLT bonds to a target allocation of 60% stocks and 40% bonds. For example, the data processing system 110 can use a root-level smart contract to detect a discrepancy between s current allocation and the target allocation, execute transactions to sell 10% of bond assets, and settle the corresponding funds in the GLT system. The smart contract can then use these funds to buy additional stock assets and update corresponding mirror token states to reflect the adjusted allocation. In some implementations, tokens associated with collateralized assets can encode logic to restrict transactions or updates when the tokens are locked as collateral. For example, the data processing system 110 can use smart contract within a token to automatically enforce conditions preventing the sale of collateralized assets and update metadata to track changes in the collateral status of the asset. In some examples, the data processing system 110 can integrate oracle feeds or contracts to inject external attributes, such as asset valuation, risk indicators, or market data, into token logic.

In some examples, the data processing system 110 can verify transactions and updates using cryptographic techniques. For example, the data processing system 110 can execute a signature authentication process using cryptographic signatures from multiple parties (e.g., an institution, a manager system, and/or a customer). In one example, a manager system associated with an illiquid asset (e.g., investment in a private fund or private company) can generate a first token representing the asset, digitally sign the token using the private key of the manager system, and transmit the signed token to the data processing system 110. Upon receipt, the data processing system 110 can verify the signature using the public key of the manager system, create a corresponding mirror token for the same asset, and digitally sign the mirror token using the private key of the provider institution. In some implementations, the data processing system 110 can further include a customer signature in the signature authentication process (e.g., to finalize or validate creation of a mirror token). The data processing system 110 can record the creation and verification of the mirror token on a blockchain or other distributed ledger to maintain an immutable record of the asset and associated transactions. In some implementations, the data processing system 110 can use hybrid encryption protocols and/or key management strategies to address operational differences between private GLT balances and public-chain cryptographic assets. For example, the data processing system 110 can use private key encryption for assets managed on private systems (e.g., GLT) and hybrid or multi-signature approaches for assets managed on private and/or public systems.

In some implementations, the data processing system 110 can create, manage, and/or execute blockchain-based or digital trusts. That is, the data processing system 110 can use distributed ledger technology (DLT) to encode and enforce trust terms as smart contracts to automatically allocate tokenized assets to designated beneficiaries (e.g., digital wallets) based on pre-established and/or dynamic terms or conditions. For example, the data processing system 110 can consolidate information related to beneficiaries, payouts, assets, and other considerations of a trustor into an immutable database or data structure, which can be stored in a digital wallet with tokenized representations of assets of the trustor and corresponding metadata objects associated with rules and conditions for distribution in response to an event or condition (e.g., new beneficiary, updated value of asset, death and/or incapacitation of trustor, etc.). That is, the data processing system 110 can generate and/or update various token attributes or parameters to automatically distribute corresponding trust assets to one or more beneficiaries.

In some implementations, the data processing system 110 can tokenize non-digital assets by creating digital twins. For example, the data processing system 110 can tokenize physical assets, such as jewelry, artwork, or real estate, by generating non-fungible tokens (NFTs) that include metadata such as images, geolocation data, serial numbers, and custody details. For examples, the data processing system can generate and provide an NFT and/or supporting artifacts, such as video assignments or signed documents, which are cryptographically secured and linked to the tokens as a protected data object. Upon confirmation of an event or condition (e.g., in response to of proof of death via an oracle service or a trusted party) the data processing system 110 can execute trust terms automatically. For example, the data processing system 110 can trigger asset disbursement according to predefined conditions, including fractional allocation of real-world assets among multiple beneficiaries.

The data processing system 110 can also support dynamic updates to trust terms and asset inventories. For example, while the trustor is alive, additional assets can be codified into the trust and tokenized within the digital wallet. The data processing system 110 can manage updates to beneficiary assignments or disbursement rules and use cryptographic signatures from both the trustor and the trustee to validate modifications. In some implementations, the data processing system 110 can integrate geolocation trackers or other verification mechanisms to dynamically update or align physical assets and corresponding digital representations. For example, the data processing system 110 can identify or track a location of a tokenized watch and automatically update a metadata object or digital twin of the corresponding NFT based on the real-time location of the physical asset.

In some examples, the data processing system 110 can convert wills into tokenized assets using predefined templates (e.g., schemas). For example, the data processing system 110 can convert structured will data into electronic assets (e.g., based on balances, account information, and types of physical or real-world assets) and categorize assets into various groups (e.g., monitorable and non-monitorable groups, electronic accounts, cash equivalents, physical possessions, etc.). Smart contracts can automatically generate tokens representing the assets, assign the tokens to the appropriate beneficiaries, and store the resulting data on a DLT network. Each token can encode attributes such as asset type, beneficiary wallet addresses, allocation percentages, and associated conditions or restrictions.

In some implementations, the data processing system 110 can manage disputes or exceptions during trust execution. For example, when an asset is missing or unverifiable, the data processing system 110 can flag the item for further review or manual intervention. In some examples, the data processing system 110 can perform an inventory of trackable assets (e.g., tokens) associated with an account (e.g., within a multi-resource or unified container). For example, the data processing system 110 can detect inconsistencies or discrepancies between tokens and corresponding physical assets using the Global Positioning System (GPS) and/or other geolocation technologies and escalate the detected inconsistencies or discrepancies to the trustee or beneficiaries for resolution. For example, the data processing system 110 can identify a missing tokenized item, such as a painting, and initiate a dispute process to verify a location, ownership, or custody status of the item.

The data processing system 110 can use cryptographic techniques (e.g., digital signatures) to validate a dynamic trust arrangement and associated updates. For example, the data processing system 110 can digitally sign trust agreements or assets (e.g., tokens within a multi-resource container) using private keys associated with the trustor and trustee (e.g., a financial institution or executor). In some implementations, updates to the trust arrangement, such as changes to beneficiary designations or asset allocations, can be digitally signed by the trustor and trustee to confirm authenticity before the data processing system 110 records the updates on a distributed ledger or other storage system. For example, the data processing system 110 can validate or authenticate a proposed update to a tokenized representation or real-world asset (e.g., a change in custody status or ownership) by confirming that the proposed update is digitally verified (e.g., signed) by one or more authorized parties, such as the trustor, trustee, and/or designated beneficiaries.

In some implementations, the data processing system 110 can manage and/or update alternative investments, such as illiquid investments (e.g., annuities, private placements, limited partnership or LLP interests, shares in an LLC, or non-tradable assets) stored within a unified account structure (e.g., unified resource container). For example, illiquid or alternative investments or resources can include restrictions or limitations (e.g., non-standard workflows, limited tradability, exchange conditions, regulatory constraints, etc.) as compared to liquid investments/resources (e.g., publicly traded stocks, mutual funds, cryptocurrencies, or cash equivalents) that can be tradable, liquidated, or rebalanced without such limitations. In some implementations, the data processing system 110 can generate a unified container including both illiquid resources and liquid resources. For example, the unified container can include data elements, tokens, and/or descriptors representing various types of assets, such as unrestricted or liquid resource tokens (e.g., tokens representing publicly traded equities or cryptocurrencies), restricted or illiquid resource tokens (e.g., tokens representing private equity, annuities, or limited partnership interests), and/or other resource descriptors. That is, a resource descriptor can include any data element, metadata object, attribute, or identifier corresponding with a restricted (e.g., illiquid) or unrestricted (e.g., liquid) resource, such as a resource token with encoded attributes (e.g., resource dimensions or resource dimension attributes) such as asset class, ownership or custody data, risk classification, regulatory designations, and/or trading constraints.

In some implementations, the data processing system 110 can organize assets or resource descriptors into sleeves (e.g., sub-containers, tokens including sets of tokens, etc.) within a unified account (e.g., UMA). For example, at least one (e.g., each) sleeve can correspond to one or more asset types, such as publicly traded equities, fixed-income securities, or alternative investments. For example, the data processing system 110 can group or encapsulate publicly tradable or unrestricted assets or resources (e.g., stocks or ETFs) into one or more sleeves (e.g., Sleeves A, B, C, and D), and restricted (e.g., non-tradable) or limited-restricted (e.g., conditional transfer) assets, such as annuities, in a separate sleeve (e.g., Sleeve E). That is, the data processing system 110 can use sleeves or sleeve tokens to monitor resources, tag assets with metadata (e.g., sleeve codes), track asset allocation, and/or perform rebalancing operations. For example, the data processing system 110 can assign target percentages to at least one (e.g., each) sleeve based on financial objectives of a customer and apply different rebalancing rules depending on characteristics or attributes associated with a sleeve type (e.g., liquid or illiquid). In some cases, a sleeve (e.g., an annuity sleeve) can be excluded from rebalancing by assigning or encoding a target allocation of zero to preserve a current balance of included tokens during portfolio adjustments.

The data processing system 110 can facilitate dynamic rebalancing operations across sleeves to maintain target asset allocations. For example, the data processing system 110 can execute transactions to adjust the proportions of assets in publicly tradable sleeves (e.g., Sleeves A-D) and can retain alternative investment sleeves (e.g., an annuity sleeve) in an unmodified state. In some implementations, the data processing system 110 can perform a two-level suitability check to evaluate whether a distribution of investments aligns with financial objectives or other parameters for a customer account. That is, the data processing system 110 can assess portfolio-wide or sleeve-level suitability attributes during creation of a unified account or UMA and/or during subsequent model switches or portfolio updates, such as reallocations of assets between sleeves or modifications of target allocations. In some implementations, the data processing system 110 can integrate external manager data into the unified account structure through cloud-based applications or other technologies. For example, the data processing system 110 can receive asset data from third-party managers, monitor drift between actual and target allocations, and/or verify balances are reinvested appropriately to maintain portfolio objectives.

In some examples, the data processing system 110 can perform and/or otherwise facilitate asset transfers between sleeves. For example, the data processing system 110 can transfer an asset or resource descriptor from a publicly traded or liquid sleeve to an alternative investment sleeve based on receiving a new target allocation for an associated account. That is, the data processing system 110 can automate workflows, such as submitting manager allocation changes, processing questionnaires, and/or executing trades or transfers of digital assets with control nodes or other external systems without the creation of sub-accounts or prompting a user for manual intervention.

In some implementations, the data processing system 110 can apply a blended calculation to assess overall portfolio suitability and compliance with investment restrictions. For example, the data processing system 110 can calculate the equity makeup of a unified account or UMA by blending the allocations of individual sleeves and comparing the result to predefined tables or thresholds. When alternative investments are included in the account, the data processing system 110 can apply different suitability parameters to validate compliance with minimum and maximum allocation bands corresponding with the alternative investments. In some examples, during an allocation or investment model switch, such as reallocating assets among one or more sleeves or introducing new alternative investment sleeves, the data processing system 110 can reevaluate suitability and adjust allocations accordingly. That is, the data processing system 110 can provide customers with unified view of multiple investments across various accounts by integrating alternative and traditional assets into a unified container or account. The features and/or functionalities of the data processing system 110 are described further herein.

In some implementations, components of the example system 100 (e.g., data processing system 110) communicate over network 130. Network 130 can include computer networks such as the Internet, local, wide, metro or other area networks, intranets, satellite networks, other computer networks such as voice or data mobile phone communication networks, combinations thereof, or any other type of electronic communications network. Network 130 can include or constitute a display network. In various implementations, network 130 facilitates secure communication between components of example system 100. As a non-limiting example, network 130 can implement transport layer security (TLS), secure sockets layer (SSL), hypertext transfer protocol secure (HTTPS), and/or any other secure communication protocol.

In some implementations, network 130 can be composed of various network devices (nodes) communicatively linked to form one or more data communication paths between participating devices. The network 130 can facilitate communication between the various nodes, such as the data processing system 110, storage system 120, one or more user computing system(s) 140, and one or more third-party computing system(s) 150 (e.g., using an OSI layer-4 transport protocol such as the User Datagram Protocol (UDP), the Transmission Control Protocol (TCP), Stream Control Transmission Protocol (SCTP), etc.). Each networked device can include at least one network interface for receiving and/or transmitting data, typically as one or more data packets. An illustrative network 130 can the Internet; however, other networks can be used. Network 130 can be an autonomous system (AS), i.e., a network that can operated under a consistent unified routing policy (or at least appears to from outside the AS network) and can generally be managed by a single administrative entity (e.g., a system operator, administrator, or administrative group).

In some implementations, the geographical scope of the network 130 can vary widely and the network 130 can include a body area network (BAN), a personal area network (PAN), a local-area network (LAN), e.g., Intranet, a metropolitan area network (MAN), a wide area network (WAN), or the Internet. The topology of the network 130 can be of any form and can include, e.g., any of the following: point-to-point, bus, star, ring, mesh, or tree. The network 130 can include an overlay network which is virtual and sits on top of one or more layers of other networks 130. The network 130 can include any such network topology as known to those ordinarily skilled in the art capable of supporting the operations described herein. The network 130 can utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite can include application layer, transport layer, internet layer (including, e.g., IPv6), or the link layer. The network 130 can include a type of a broadcast network, a telecommunications network, a data communication network, or a computer network.

The data processing system 110 can be owned by, or otherwise associated with, a provider institution or an organization that provides services to users and entities and/or facilitates exchanges of resources and/or assets. In some implementations, the data processing system 110 can be configured retrieve and/or manage data from various internal or sources. That is, the data processing system 110 can identify or obtain exchange data, process the exchange data, generate cryptographic objects, and/or maintain records of such data or objects. For example, the data processing system 110 can receive and/or transmit data with sources such as trading platforms, banks, and regulatory authorities associated with the provider institution.

In some implementations, one or more of the data processing system 110, included sub-systems of the data processing system 110 (e.g., retrieval system 111, generation system 112, modeling system 113, detection system 114, and recording system 115, etc.), storage system 120, network 130, user computing system 140, third-party computing system 150, and/or data source(s) 160 can include at least one processing system or device, such as a computing device having at least one processing circuit configured to execute instructions stored in a memory device to perform one or more operations described herein. The processing circuit can include a processor, such as a microprocessor, an application-specific integrated circuit (ASIC), a field-programmable gate array (FPGA), etc., or combinations thereof. The processing circuit can include a memory, and the memory can include, but is not limited to, electronic, optical, magnetic, or any other storage or transmission device capable of providing processor(s) with program instructions. The instructions can include code from any suitable computer programming language such as, but not limited to, ActionScript®, C, C++, C#, HTML, Java®, JavaScript®, Perl®, Python®, Visual Basic®, and XML. The memory can be included in the processing circuit and can include, but is not limited to, electronic, optical, magnetic, or any other storage devices capable of providing a processor or processing circuit with program instructions. For example, the memory can include a floppy disk, CD-ROM, DVD, magnetic disk, memory chip, ROM, RAM, EEPROM, EPROM, flash memory, optical media, or any other suitable memory from which processor(s) can read instructions.

Figure 2:
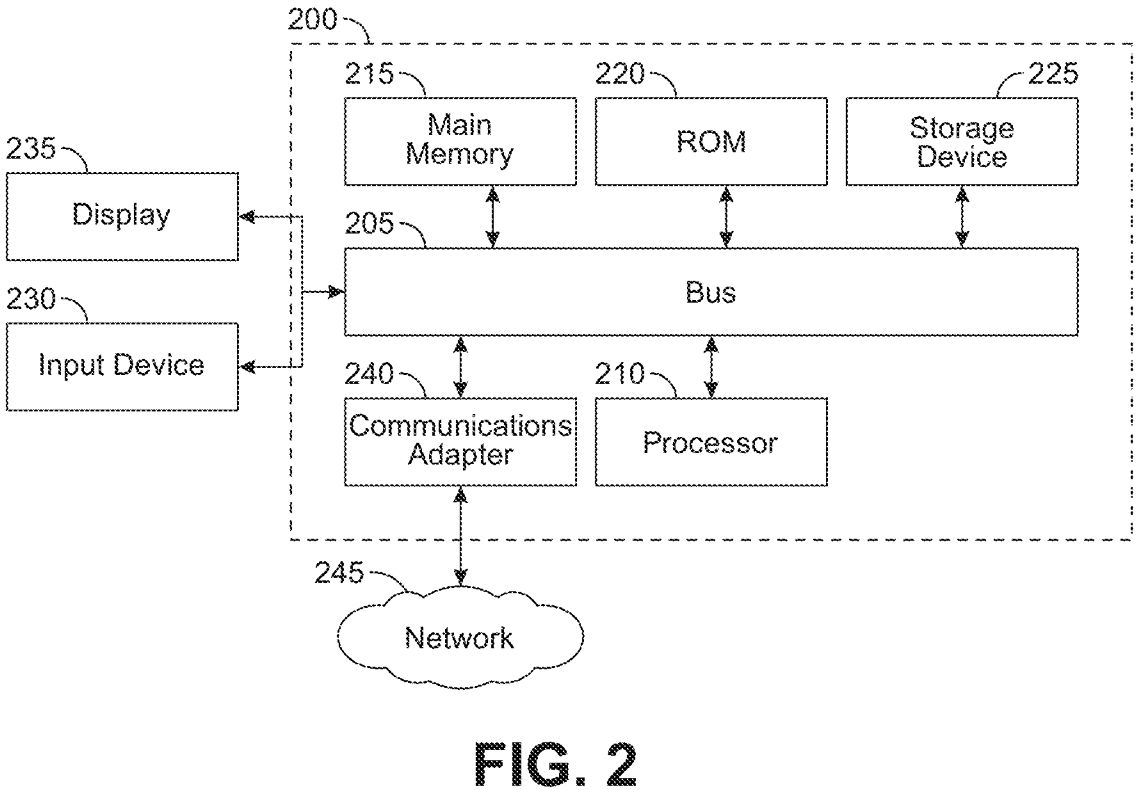
FIG. 2 depicts a block diagram illustrating an example computing system for use in the various implementations described herein.

In some implementations, the data processing system 110, retrieval system 111, generation system 112, modeling system 113, detection system 114, and recording system 115 storage system 120, user computing system(s) 140, third-party computing system(s) 150, and/or other elements of the example system 100 can include the structural components of the computing device described in FIG. 2, which can be used to run or otherwise implement the various functionalities and/or features described herein. In other implementations, one or more elements of the example system 100 can include a distributed processing cluster, server, cloud processing system, or any other computing device or system. That is, the data processing system 110, retrieval system 111, generation system 112, modeling system 113, detection system 114, and recording system 115 storage system 120, user computing system(s) 140, third-party computing system(s) 150, and/or other elements of the example system 100 can include or execute at least one computer program or at least one script. In some implementations, one or more elements of the example system 100 can include combinations of software and hardware, such as one or more processors configured to execute one or more scripts.

In some implementations, in addition to the processing circuit(s), the data processing system 110 can include and/or be communicatively coupled to one or more databases (e.g., storage system 120). The databases can be structured as a data repository that can be configured to store protection records, resource data, cryptographic data, tokens, control structures, metadata, and/or other data elements. For example, the storage system 120 can include data structures for storing information such as, but not limited to, protection records (e.g., data objects referencing customer-held resources, compliance histories, allocation logs, or associated operational states), resource data objects (e.g., on-chain or off-chain assets, corresponding trust terms, asset descriptors, transaction or exchange records, compliance certifications, financial account details, or digital resource descriptors), tokens (e.g., fungible tokens such as cryptocurrencies, non-fungible tokens such as NFTs representing specialized assets, tokenized representations of physical or intangible assets, or state-tracking tokens for dynamic resource allocation), multi-resource containers and/or corresponding data (e.g., aggregated representations of multiple assets, unified allocation parameters, or linked token groups for resource synchronization), unified resource containers and/or corresponding data (e.g., a digital structure encapsulating tokenized representations, aggregated trust terms, or execution parameters), protected data objects and/or authentication information (e.g., cryptographic artifacts, cryptographic hashes, encrypted tokens, public-private key pairs, smart contract records, or other secure data elements supporting resource management and trust execution), historical data records (e.g., logs of trust events, updates to asset allocation rules or conditions, changes in token states, lifecycle tracking of dynamic trust conditions, bi-temporal records capturing resource states at multiple time points, historical compliance certifications, etc.), metadata (e.g., timestamps, beneficiary identifiers, execution trigger indicators, trustor instructions, asset classification indices, resource allocation parameters, operational constraints, or state-based conditions), and/or other data (e.g., geolocations of private assets, inventories of non-digital assets, external certification records, audit trails of interactions with control nodes or third-party systems, etc.). For example, the storage system 120 can store data related to unified containers and multi-resource containers, tokenized representations of resources (e.g., fungible tokens, non-fungible tokens, sleeve tokens, or digital twins of physical assets), resource descriptors or token attributes, identifiers or attributes for containers or sub-containers, or other operational data used for dynamic account management, asset synchronization or updates, or trust execution.

In some implementations, the storage system 120 can be part of the data processing system 110, or a separate component that the data processing system 110 and/or the user computing system 140 can access via the network 130. The storage system 120 can also be distributed throughout the example system 100 (e.g., computing environment). For example, the storage system 120 can include multiple databases associated with the data processing system 110, a client device (e.g., user computing system 140), or both. The storage system 120 can include one or more storage mediums. The storage mediums can include, but are not limited to, magnetic storage, optical storage, flash storage, and/or RAM. In some implementations, the data processing system 110 can implement or facilitate various APIs to perform database functions (i.e., managing, synchronizing, or linking data stored in the storage system 120). The APIs can be, but are not limited to, SQL, ODBC, JDBC, NOSQL and/or any other data storage and manipulation API.

In some implementations, the user computing system 140 (sometimes, depending on the configuration of the user computing system, the user computing system can be referred to herein as an "electronic device," "mobile device," or "mobile electronic device") can be a computing device, personal computer (PC), desktop computer, laptop computer, smartphone, tablet, smart watch, smart sensor, or any other device configured to facilitate receiving, displaying, and interacting with content (e.g., applications, etc.) or data (e.g., transaction data, cryptographic objects, metadata, etc.). For example, user computing system 140 can be a cell phone configured to execute an application to receive and display content and/or actionable elements and to receive user interaction with the content and/or actionable elements. User computing system 140 can also include an input/output circuit for communicating data over network 130.

In some implementations, the user computing system(s) 140 can include an application. The user computing system 140 can include a plurality of applications. In some implementations, the user computing system(s) 140 can execute an application (e.g., web browser, etc.) to link or synchronize data elements, transactions, and/or accounts between the data processing system 110 and various data sources 160 on behalf of one or more users. For example, the application can be configured to retrieve content from other computing systems and devices over the network 130 for displaying transaction and/or account information to a user with the user computing system 140. Additionally or alternatively, the application can be a mobile application executed by the user computing system 140. The application can be a mobile application, such as a mobile banking application, which can be downloaded from an app store, pre-installed, or hard coded into memory of the device.

In some examples, the application can be provided and at least partly supported by the provider institution associated with the data processing system 110. Thus, the application can be referred to as a provider application or provider mobile application. As mentioned herein, the provider institution can provide various financial products, goods, and/or services. As such, the provider institution mobile application can provide various financial tools, such as transaction management, stock trades, home loan payments and creation, account monitoring, funds transfer, bill payments, and financial planning tools, etc. In some implementations, the provider institution mobile application can be a part of a mobile banking application associated with the provider institution or a separate application.

In some implementations, the provider institution mobile application can include a collection of software development tools contained in a package (e.g., software development kit (SDK), application programming interface (API), integrated development environment (IDE), debugger, etc.). For example, the provider institution mobile application can include an application programming interface (API) or a debugger, or an SDK that includes an API, a debugger, an IDE, and so on. In some implementations, the provider institution mobile application includes one or more libraries having functions that interface with a particular system software (e.g., iOS, Android, Linux, etc.). As a further example, the provider institution mobile application can include a function configured to collect and report data (e.g., transaction data, cryptographic objects, metadata, device analytics, etc.), and a user can insert the function into the instructions of the provider institution mobile application to cause the function to be called during specific actions of the provider institution mobile application (e.g., in response to identifying a transaction).

The provider mobile application can be installed and designed to run on smartphones, tablets, and other mobile devices. The provider mobile application can include a client-side application that interacts with server-side components over the network. The mobile application can be implemented using various programming languages and frameworks, such as Swift or Objective-C for iOS, and Kotlin or Java for Android. The provider mobile application can be packaged and distributed through app stores. In some implementations, the provider mobile application can include a presentation layer (UI/UX), a business logic layer, and a data layer. The presentation layer can handle user interactions and displays data using graphical user interface components. The business logic layer can process user inputs, manages application workflows, and enforces rules and policies. The data layer can manage data storage, retrieval, and synchronization with remote servers. The provider mobile application can utilize device capabilities such as cameras, GPS, accelerometers, and touchscreens. The provider mobile application can operate in online or offline modes, utilizing local storage and caching mechanisms to facilitate functionality when network connectivity is limited. Security measures, such as encryption, authentication, and secure communication protocols, can be implemented to protect user data and privacy.

In some implementations, the user computing system 140 and the application can be configured to provide one or more interfaces (e.g., graphical user interfaces (GUIs)), including GUIs to view and/or update assets or resources associated with a unified account, GUIs to view and/or update dynamic trust arrangements and/or associated asset or beneficiary data, and so on. In some implementations, the interfaces can include content items (e.g., for presenting content) and/or actionable elements (e.g., user-selectable or user-interactive features, such as a rebalancing or transfer button) and be presented via the application.

In some implementations, the third-party computing system(s) 150 can be associated with third-parties or other entities relative to the provider institution associated with the data processing system 110. As such, the third-parties or entities can include regulatory authorities, financial institutions, trading platforms, and/or other entities that can provide data elements associated with exchanges with users but maintained by third-parties relative to the provider institution. In some implementations, the various components of the example system 100 can interact with the third-party computing system(s) 150 to retrieve and/or update data or information (e.g., token updates or exchanges, execution triggers, transaction records, resource information, key-value pairs, certificates, financial data, etc.) between the provider institution and the third-parties and/or other entities, as further described herein.

In some implementations, the data processing system 110 can receive or obtain protection records. In some implementations, protection records can include and/or correspond with data objects referencing and/or otherwise corresponding with various customer-held resources across external systems (e.g., control nodes). That is, the protection records can correspond with one or more on-chain resources, such as blockchain-stored resources or other ledger-based asset records, and/or one or more off-chain resources, such as deposit holdings, brokerage holdings, insurance holdings, etc. The protection records can include and/or correspond with include various attributes, values, and/or states, which can be accessed, updated, and/or otherwise modified by the data processing system 110. For example, the protection records can include quant measures (e.g., numeric or alphanumeric data fields representing a resource quantity of a protection record), classification indices (e.g., asset or resource types, risk categories, regulatory compliance statuses, sleeve codes, linkages, etc.), identifiers (e.g., resource IDs, asset codes, etc.), and/or operational states (e.g., activate states, pending states, conditions, limitations, restrictions, etc.). In some implementations, the data processing system 110 can perform a handshake with one or more control nodes to obtain the protection records and/or other data using techniques such as cryptographic authentication (e.g., key-pair exchanges) or other identity assertions.

In some implementations, the data processing system 110 can obtain the protection records and/or otherwise communicate or interface with control nodes and/or other external systems using one or more protected data channels in response to performing the handshake. The protected data channel(s) can include, but are not limited to, encrypted communication protocols such as SSL and TLS, virtual private networks (VPNs), blockchain communication methods, application programming interfaces (APIs), messaging services, peer-to-peer communication protocols, database access protocols, secure file transfer protocols (SFTP), data orchestration services, oracle feeds, and more. For example, the data processing system 110 can access use an API to access financial records held by a banking system and securely retrieve, verify, update, and/or allocate deposit holdings associated with the retrieved records.

In some implementations, the data processing system 110 can generate a set of tokens to digitally represent various assets or resources. For example, a set of tokens can include one or more on-chain tokens (e.g., data structure or objects maintained on a blockchain or ledger), off-chain tokens (e.g., non-blockchain based digital assets, tokens corresponding with off-chain assets or resources, etc.), fungible tokens (e.g., interchangeable or uniform tokens such as cryptocurrencies), non-fungible tokens (e.g., NFTs that identify physical or specialized assets), tokenized representations (e.g., NFTs of one or more intangible assets), etc. At least one (e.g., each) token in the set of tokens can encapsulate or store a metadata object including various attributes, values, and/or states associated with a corresponding asset or resource. For example, a metadata object of a token can include a status attribute, such as a value or parameter corresponding with an operational state (e.g., reserved, locked, disputed, liquidated or decommissions status, etc.) of a corresponding protection record associated with the token and/or metadata object. A metadata object can also include quantitative attributes or other indicators that correspond with tracking updates in the quant measure of the corresponding protection record (e.g., determining changes in asset valuation, adjusting risk levels, initiating deferrals, managing permissions, etc.). In some implementations, the data processing system 110 can store the set of tokens in a ledger storage. A ledger storage can include and/or correspond with a blockchain or decentralized ledger, a centralized ledger or database, an on-chain and off-chain hybrid storage system, a cloud-based storage system, etc.

In some implementations, the data processing system 110 can generate, update, and/or execute control structures (e.g., smart contracts). That is, the data processing system 110 can generate a root control structure (e.g., mother smart contract of a mother-child contract hierarchy) configured to interface with the set of tokens and/or one or more corresponding metadata objects or token control structures (e.g., child smart contracts of the mother-child hierarchy). For example, a root control structure can encode and/or otherwise include system-level or container-level instructions, parameters, or operational rules for interfacing with one or more metadata objects or token control structures and/or performing other operations across one or more tokens, a container, or a sub-container (e.g., updating token attributes, verifying updates to tokens by executing a multi-level validation, managing asset or token transfers within a sleeve, enforcing compliance protocols across a set of tokens, etc.). A token control structure can encode and/or otherwise include token-level instructions, parameters, or operational rules for updating or accessing metadata objects of tokens, interfacing with or applying instructions of a root control structure, and/or performing other operations including at least one token (e.g., updating attributes of a token in response to detecting a condition affecting the token, locking or deferring actions for a token, performing token-level validations, updating token states in response to asset changes, etc.). For example, the data processing system 110 can deploy a root control structure and/or token control structures to automate enforcement of and/or responses to various triggers, rules, or other conditions associated with tokenized assets.

In some implementations, the data processing system 110 can detect an off-chain event or condition. For example, the data processing system 110 can detect and/or otherwise identify data corresponding with an occurrence or a change in an external environment related to resources represented by protection records. That is, the data processing system 110 can detect events or conditions originating outside the on-chain system (e.g., transaction events, reevaluation events, authorization updates, external trigger conditions, synchronization indicators, etc.) and corresponding with a protection record using the root control structure. In response to detecting the off-chain event or condition, the data processing system 110 can performing various operations, such as updating a metadata object of one or more tokens and/or restricting an update to a metadata object of one or more tokens. For example, the data processing system 110 can update a status attribute or quant attribute of at least one (e.g., each) token in the set of tokens in response to detecting a corresponding event, condition, or other execution trigger.

In some implementations, the data processing system 110 can receive various requests, such as a trust creation request (e.g., data to establish a dynamic or self-executing trust arrangement). That is, the trust creation request can identify and/or otherwise include one or more on-chain resource data objects (on-chain RDOs) and one or more off-chain resource data objects (off-chain RDOs). Resource data objects, or RDOs, can include or refer to any data structure, token, or other digital representation associated with a resource or asset. For example, the data processing system 110 can receive a request from a computing device associated with a trustor (e.g., entity or individual initiating a trust arrangement and providing data for defining trust terms). That is, the trust creation request can include digital resource descriptors, non-digital resource descriptors, and/or intended beneficiaries for inclusion in a dynamic trust arrangement. The data processing system 110 can use the trust creation request to create a multi-resource container or other trust instrument configured to allocate or distribute trust resources to intended beneficiaries based on one or more execution condition or instructions associated with the trust.

In some implementations, the data processing system 110 can generate a multi-resource container including a set of tokens. For example, a multi-resource container can include and/or correspond with a digital structure, data package, digital wallet, or other repository configured to manage and organize tokens, metadata, and execution rules associated with on-chain and off-chain resource data objects. The set of tokens can include one or more tokens corresponding with the on-chain RDO(s) (e.g., on-chain tokens) and at least one tokenized representation (e.g., digital twin, NFT, etc.) of the off-chain RDO(s) included in the trust creation request. In some implementations, the data processing system 110 can generate or update token control structures to execute terms or conditions of a trust. That is, at least one (e.g., each) token in a set of tokens can include (e.g., store or encapsulate) a token control structure. The token control structure can encode one or more output parameters, such as disbursement rules for assets or resources, conditions for transferring ownership to beneficiary wallets, execution triggers for resource allocation, and/or other operational constraints. In some implementations, the token control structure can include a smart contract, which can be deployed and/or implemented to apply and/or enforce the rules and conditions encoded in the output parameters.

In some implementations, the data processing system 110 can retrieve, store, or and provide one or more protected data objects. A protected data object can be associated with one or more tokens. That is, a protected object can be a data payload attached to each token in a set of tokens including metadata and/or instructions used during off-chain or on-chain processes. For example, a protected data object can include recipient metadata (e.g., wallet addresses or other identifiers corresponding to beneficiaries), assignment instructions (e.g., instructions for asset distribution), and/or operational markers (e.g., flags in metadata of the token or token control structure indicating state-based or event-based constraints). In some implementations, protected data objects can include cryptographically secured artifacts, such as video assignments or messages, geolocations of private assets, inventories of non-digital assets, and/or other digitally encapsulated representations of resources or instructions (e.g., digital twins of physical assets, serialized identifiers, access credentials for off-chain verification, etc.).

In some implementations, the data processing system 110 can detect an execution trigger. For example, an execution trigger can include any off-chain event or condition and/or on-chain event or condition. That is, an execution trigger can include a condition or signal that initiates or modifies the execution of trust terms, resource allocations, or control structures associated with a trust. In some implementations, the data processing system 110 can detect an execution trigger related to a trust arrangement or dynamic trust process. example, an execution trigger can include an off-chain event or condition corresponding with the fulfillment of a trust term (e.g., verification of an identity of a beneficiary or decedent, confirmation of authorization of a trustee or trustor, receipt of an external certificate such as a death certificate or notarized document, etc.) or an on-chain event (e.g., detection of a token state change, completion of a smart contract operation, validation of cryptographic signatures, etc.). In some implementations, the data processing system 110 can monitor data streams or feeds from trusted off-chain sources (e.g., oracle services, external systems providing certification, or government registries) and on-chain data sources (e.g., blockchain nodes or decentralized ledgers) to detect execution triggers. Upon detecting an execution trigger, the data processing system 110 can perform various operations such as activating or modifying metadata objects or control structure, initiating resource disbursements, updating token metadata objects, or generating new tokens representing updated trust states.

In some implementations, the data processing system 110 can update one or more tokens in the multi-resource container based on the execution trigger. For example, the data processing system 110 can update a resource dimension attribute (e.g., a counter, a wallet address, a quant measure or balance parameter, a disbursement percentage, a transaction history record, etc.) for one or more recipient wallet addresses corresponding with beneficiaries of a dynamic trust instrument or framework. For example, upon detecting the validation of a trust condition (e.g., the death of a trustor), the data processing system 110 can update attributes of tokens to allocate resources to beneficiary wallets based on predefined disbursement rules. That is, the data processing system 110 can execute an update to a multi-resource container by transferring ownership of tokenized resources to one or more beneficiary accounts and/or logging an update event in a ledger storage system.

In some implementations, the data processing system 110 can update tokens representing off-chain RDOs and/or on-chain RDOs. For example, the data processing system 110 can update a token for an off-chain RDO by recording a new on-chain entry (e.g., a digital twin of a physical asset) or an updated on-chain entry (e.g., a modified metadata object reflecting changes in ownership, value, or conditions). In some implementations, the data processing system 110 can record a distribution response in a ledger storage. That is, the data processing system 110 can respond to execution triggers by generating and broadcasting trust-related events or updates to connected systems, such as a trustee management platform or a beneficiary notification system. For example, the distribution response can include a resource reallocation notification, a trust term fulfillment confirmation, and/or other data corresponding with the updated resource dimension attribute of the at least one token.

In some implementations, the data processing system 110 can receive one or more resource descriptors. For example, resource descriptors can include any digital representation, metadata, or tokenized data element associated with a resource or asset, such as asset identifiers, allocation parameters, valuation metrics, operational constraints, tokens, tokenized representations, and metadata fields. In some examples, the resource descriptors can include one or more subsets or sub-groupings of related descriptors. That is, the data processing system 110 can obtain and/or otherwise retrieve a first subset of resource descriptors corresponding with unrestricted resource(s) and a second subset of resource descriptors corresponding with restricted resource(s). Unrestricted resources can include and/or correspond with instruments easily traded, liquidated, adjusted, and/or exchanged (e.g., publicly traded stocks, mutual fund shares, cryptocurrencies, etc.). Restricted resources can include assets subject to constraints, such as illiquidity conditions, deferrals or lock periods, contractual obligations, regulatory limitations, or operational constraints (e.g., annuities, private equity holdings, limited partnership shares).

In some examples, an unrestricted resource can correspond with an unrestricted resource data object and a restricted resource can include or correspond with a restricted resource data object (RDO) or a limited-restricted RDO. That is, a resource data object (RDO) can include a structured digital representation of a resource that encapsulates and/or stores attributes, metadata, and/or other operational data or parameters associated with the resource. For example, an RDO can include and/or correspond with a token including various resource dimension attributes associated with a corresponding asset (e.g., quantitative or value-based measures or attributes, an identifier or asset class code, resource conditions such trading constraints, lock periods, or allocation restrictions, and/or links or relationships to other resources, such as linkages to a sleeve token or container). For example, an unrestricted RDO can include a data object or digital representation of a cryptocurrency. For example, a restricted RDO can a data object with fields or metadata corresponding to the limitations or obligations associated with the resource (e.g., terms of a private placement, deferral conditions, regulatory restrictions, exchange restrictions on non-transferrable assets, etc.). A limited-restricted RDO can represent resources that can be subject to partial restrictions, such as assets with staggered liquidity access, tiered release schedules, or hybrid conditions combining elements of unrestricted and restricted resources. For example, an RDO (e.g., off-chain RDO) can correspond with a non-transferrable resource unit or a limited-transferrable resource unit.

In some implementations, the data processing system 110 can generate a unified resource container including one or more sub-containers (or sleeves). A unified resource container can include and/or correspond with a logical container or account structure in which one or more categories of resource descriptors (e.g., both unrestricted-lifecycle and restricted-lifecycle) are stored to facilitate consolidated operations, updates, and/monitoring. In some examples, the data processing system 110 can generate a first sub-container (e.g., a first sleeve token) within the unified resource container including one or more unrestricted resource descriptors and a second sub-container (e.g., a second sleeve token) within the unified resource container including one or more restricted resource descriptors. The data processing system 110 can analyze and/or update resources included in the first sleeve, second sleeve, and/or both sleeves by interfacing with included tokens and/or corresponding control structures or metadata objects. That is, at least one (e.g., each) resource descriptor within a unified resource container can include a metadata object. A metadata object can include and/or correspond with structured data encapsulated within at least one (e.g., each) resource descriptor. That is, the metadata object can include resource dimension attributes and/or operational markers, which can by used by the data processing system 110 in performing automated evaluations, validations, and updates within the unified resource container.

A resource dimension attribute can include and/or correspond with any quantitative or logical properties associated with a resource or resource descriptor. For example, resource dimension attributes can include allocation percentages, lifecycle types (e.g., indicating if a resource is restricted or unrestricted), target thresholds (e.g., value defining maximum or minimum allocation level, etc.), counters, and/or other quantitative and/or logical values, attributes, or parameters. An operational marker can include and/or correspond with a flag within the metadata object that indicates a state and/or transactional constraints of the associated resource descriptor. That is, the operational marker can be used by the data processing system 110 during validation or updating processes to determine whether manager approval is to be obtained to update or modify aa resource, whether updates to the resource are postponed due to lifecycle constraints, whether a resource is non-redeemable or locked within a timeframe or interval, etc.). In some examples, the data processing system 110 can update resource dimension attributes, operational markers, and/or other resource data or attributes dynamically based on validation, rebalancing, or other commands and/or outputs.

In some implementations, the data processing system 110 can perform a multi-level validation using the unified resource container and/or included sub-containers. For example, the data processing system 110 can apply a first parameter (e.g., overall risk tolerance) to the unified resource container and a second parameter (e.g., asset class-specific allocation threshold) to a sub-container. That is, the first parameter can be applied across a plurality of assets in the unified resource container to validate an overall allocation of resources (e.g., verifying that a portfolio adheres to predefined risk tolerance or liquidity constraints), and the second parameter can be applied to validate sleeve-level or asset-level conditions within a sub-container (e.g., determining that rules for restricted-lifecycle resources are satisfied, verifying that illiquid assets in another sleeve are excluded from rebalancing operations, confirming that private placements are capped at a given percentage or threshold, etc.).

In some implementations, the data processing system 110 can perform the multi-level validation by accessing at least one metadata object of a first subset of resource descriptors (e.g., unrestricted descriptors) to detect a threshold breach and/or by detecting a lifecycle restriction based on the second sub-container. A threshold breach can include or correspond with a violation of a parameter (e.g., exceeding an overall or asset-based allocation limit, surpassing a risk tolerance threshold, breaching a liquidity restriction, etc.). For example, the data processing system 110 can determine that a sleeve holding equity assets has exceeded a maximum allowable allocation percentage and can prompt reallocations, execute corrective actions, or perform additional or supplemental validations to mitigate the breach. A lifecycle restriction can include or correspond with a condition that limits updates or transactions for certain resource descriptors or tokens based on encoded rules or constraints. For example, the data processing system 110 can identify a lifecycle restriction in response to metadata fields of a restricted resource descriptor indicating that the associated token is non-redeemable within a predefined timeframe, subject to a deferred allocation rule, or governed by a contractual limitation.

In some examples, the data processing system 110 can identify compliance or a deferral condition based on the multi-level validation. For example, the data processing system 110 can identify compliance by confirming that an overall allocation of resources across multiple sub-containers complies with, satisfies, or aligns with a first parameter (e.g., allocation limit, distribution threshold, etc.) such that a resource update based on the first parameter does not trigger a threshold breach. In another example, the data processing system 110 can identify a deferral condition by analyzing sleeve codes to detect an operational marker or lifecycle restriction that prevents immediate updates to a restricted and/or limited-restricted resource descriptor (e.g., a lock period, deferred allocation rule, or condition restricting redemption). In some implementations, responsive to the multi-level validation identifying compliance or a deferral condition, the data processing system 110 can perform a resource update.

In some implementations, the data processing system 110 can perform a resource update by updating attributes corresponding with one or more resources and/or restricting updates to other resources. That is, a resource update can include the data processing system 110 (*i*) updating a resource dimension attribute for at least one unrestricted resource in the first sub-container and (ii) restricting an update to at least one unrestricted resource in the second sub-container. For example, the data processing system 110 can update attributes of liquid tokens (e.g., modifying allocation percentages, adjusting state attributes, or updating metadata fields) to reallocate liquid assets to align with a target allocation percentage and defer updates to illiquid assets associated with an illiquid sleeve token based on detected lifecycle restrictions.

In some implementations, the data processing system 110 can perform the resource update based on at least one of the parameter or the second parameter. That is, the data processing system 110 can apply the first parameter (e.g., risk tolerance thresholds for liquid assets) to determine to update unrestricted resources and the second parameter (e.g., lock periods or contractual constraints) to determine to restrict updates to restricted resources. For example, applying the first parameter can include the data processing system 110 simulating or executing allocation adjustments for liquid assets (e.g., equity) in a unified resource container. For example, applying the second parameter can include the data processing system 110 detecting lifecycle constraints or deferral conditions encoded within sleeve token metadata (e.g., a sub-container code) and preventing updates to multiple illiquid resources or tokens included in the sleeve based on the detection.

In some implementations, the data processing system 110 can record a state transition. That is, the data processing system 110 can record and/or otherwise store a state transition reflecting an updated resource dimension attribute for the at least one unrestricted resource descriptor or a deferred update status for the at least one restricted resource descriptor. For example, the data processing system 110 can record a ledger entry, append a timestamp to a metadata object, adjust a state attribute (e.g., marking an allocation as 'deferred' or 'updated'), and/or increment a counter to reflect changes in allocation or status. In some implementations, the data processing system 110 can record a state transition in a distributed ledger or other storage system to provide an immutable record of the resource update. For example, the data processing system 110 can log a state transition for liquid assets based on a portfolio rebalance and record deferred conditions for illiquid assets based on detected lifecycle constraints and/or other operational markers.

In some implementations, the data processing system 110 can include one or more sub-systems or elements, such as retrieval system 111, generation system 112, modeling system 113, detection system 114, and recording system 115, which can be structured and/or otherwise configured to perform the various operations described herein (e.g., with regard to the data processing system 110). For example, the retrieval system 111 can receive, from a user device, a protected record authorization for obtaining a plurality of protection records. A protected record authorization can refer to user consent to link one or more accounts corresponding with one or more on-chain or off-chain assets. That is, the retrieval system 111 can authenticate a request or authorization received from user computing system(s) 140 to link financial accounts of a customer across various domains. In some implementations, the plurality of protection records can correspond to a plurality of control nodes. For example, the retrieval system 111 can establish connections with third-party computing system(s) 150 via network 130 to access protection records held by banking systems, investment platforms, and/or other external systems. In some implementations, at least one (e.g., each) protection record of the plurality of protection records includes at least a quant measure, a classification index, and an identifier. That is, the quant measure can represent resource performance metrics, the classification index can indicate asset types or lifecycle states, and the identifier can distinguish and/or indicate a protection record.

In some implementations, the retrieval system 111 can obtain, using a protected data channel, the plurality of protection records. For example, the retrieval system 111 can initiate encrypted communications with third-party computing system(s) 150 via network 130 to retrieve records over an API, a distributed ledger interface, a secure file transfer protocol (SFTP), or other protected communication methods. That is, a protected data channel can use cryptographic techniques and/or other secure protocols (e.g., TLS/SSL encryption, public-private key exchanges, token-based authentication, or multi-factor authorization mechanisms) to prevent unauthorized access or tampering during data transmission. In some implementations, the retrieval system 111 can obtain the protection records from at least one (e.g., each) control node of the plurality of control nodes. For example, the retrieval system 111 can access a banking platform and an investment database to gather multiple records for inclusion in a unified account or container. Examples of protection records can include account balances, transaction histories, investment portfolio summaries, compliance documents, regulatory filings, loan details, insurance policy records, and/or other financial or operational data associated with on-chain and off-chain resources.

In some implementations, the generation system 112 can generate, based on the plurality of protection records, a set of tokens encapsulating a metadata object. That is, the generation system 112 can analyze retrieved protection records to identify attributes for inclusion in a token (e.g., quant measures, classification indices, identifiers, etc.) and structure associated data into tokenized representations. That is, at least one (e.g., each) token can encapsulate a metadata object that includes attributes and/or parameters for managing or updating the corresponding resource. In some implementations, each token generated by the generation system 112 can include a token control structure that restricts an update or output to the metadata object. For example, the token control structure can enforce lifecycle restrictions, apply operational markers to prevent unauthorized updates, or encode rules for managing access to sensitive financial data.

In some implementations, the generation system 112 can generate the metadata object including at least one status attribute corresponding to operational state of a corresponding protection record and at least one quant attribute corresponding to tracking an update in the quant measure of the corresponding protection record. That is, the status attribute can indicate whether the resource is active, pending, or deferred, and the quant attribute can indicate a metric such as a counter or an allocation percentage. In some implementations, the recording system 115 or the generation system 112 can store the set of tokens in a ledger storage. For example, the recording system 115 can write the tokens and/or associated metadata objects to a distributed ledger or database (e.g., a blockchain, storage system 120, etc.).

In some implementations, the generation system 112 can generate a root control structure to apply a plurality of operation rules for metadata updates. For example, the generation system 112 can create a root control structure that encodes global rules or parameters for managing updates across multiple tokens in a unified container or account. In some implementations, the root control structure can include executable instructions to interface with a plurality of metadata objects of the set of tokens. That is, the root control structure can apply or execute encoded instructions to perform various operations, such as synchronizing updates across distributed ledger technology (DLT) and general ledger technology (GLT) systems, enforcing compliance with allocation thresholds, updating or analyzing tokenized data, and/or applying lifecycle restrictions.

In some implementations, the detection system 114 can detect, using the root control structure, at least one off-chain event or condition. That is, the detection system 114 can process incoming data from trusted off-chain sources (e.g., one or more user computing system(s) 140, third-party computing system(s) 150, and/or other data source(s) 160) to identify events or conditions corresponding to external triggers associated with assets stored within the unified resource container. For example, the detection system 114 can detect a change in a compliance-related document, such as the expiration of an insurance policy or regulatory certificate, by monitoring off-chain data streams (e.g., third-party APIs, oracle feeds, etc.). In some implementations, the at least one off-chain event or condition can correspond with at least one protection record of the plurality of protection records. For example, the detection system 114 can identify an off-chain transaction (e.g., deposit or withdrawal) associated with an asset included in a unified account (e.g., UMA) or resource container.

In some implementations, in response to detecting the at least one off-chain event or condition, the modeling system 113 can update, on the ledger storage using at least one of the root control structure or the token control structure, the metadata object. That is, the modeling system 113 can a metadata object or token to reflect changes associated with an off-chain event associated with a corresponding asset using a system-level control structure (e.g., mother smart contract) and/or a token-level control structure (e.g., child smart contracts). In some implementations, the modeling system 113 update the metadata object by updating at least one of a status attribute of a token of the set of tokens or a quant attribute of the token of the set of tokens. That is, the modeling system 113 can adjust the status attribute to indicate a new operational state (e.g., transitioning an asset from "active" to "expired" or from "pending" to "processed") or update the quant attribute to reflect a measurable change (e.g., incrementing a counter to track a completed deposit or recalculating an allocation percentage after a resource rebalancing event). For example, the modeling system 113 can process an off-chain withdrawal event by modifying the metadata object to decrease or decrement the quant attribute for a tokenized resource (e.g., decrementing the value representing account balance, performing a reduction, etc.) and appending a timestamp or identifier to the metadata object to log the associated update.

In some implementations, the retrieval system 111 can receive, from a user device, a trust creation request. For example, the retrieval system 111 can process an incoming request from user computing system(s) 140 to initiate a dynamic trust arrangement, including data for defining trust terms and identifying associated resources. That is, the trust creation request can include information provided by a trustor to specify intended beneficiaries, allocation rules, and asset identifiers. In some implementations, the trust creation request can identify at least one on-chain resource data object (RDO) and at least one off-chain RDO. For example, the trust creation request can specify a digital asset (e.g., cryptocurrency or NFT) stored on a blockchain and a physical asset (e.g., a property deed or artwork) represented by an off-chain RDO. In some examples, the retrieval system 111 can authenticate the request using multi-factor authentication mechanisms or digital signatures to validate secure transmission and verify an identity of the trustor.

In some implementations, the generation system 112 can generate, in a ledger storage, a multi-resource container. That is, the generation system 112 can create a digital structure encapsulating on-chain and off-chain resources and facilitating unified management and dynamic execution of trust terms. In some implementations, the multi-resource container can include a set of tokens, and the set of tokens can include one or more tokens for the at least one on-chain RDO and at least one tokenized representation of the at least one off-chain RDO. For example, the generation system 112 can tokenize a physical asset by creating a digital twin linked to the metadata of the asset (e.g., serial numbers, location, ownership history, etc.). In some implementations, at least one (e.g., each) token of the set of tokens includes a token control structure encoding output parameters for a plurality of recipient wallet addresses. That is, the token control structure can include rules for distributing resources based on execution triggers (e.g., events for transferring ownership, inclusion of additional or supplemental beneficiaries, changes in asset conditions, etc.). For example, the generation system 112 can generate and/or otherwise provide a token control structure that triggers disbursement to wallet addresses of beneficiaries in response to various events and/or conditions (e.g., upon verification of the death of a decedent, responsive to satisfying lifecycle conditions, etc.).

In some implementations, the recording system 115 can store, corresponding with at least one token of the set of tokens in the multi-resource container, at least one protected data object. For example, the recording system 115 can store a protected data object associated with a tokenized representation of an off-chain resource, such as a cryptographically verified photo or recording or a geolocation of an asset. In some implementations, the at least one protected data object can include recipient metadata, assignment instructions, and at least one operational marker. For example, recipient metadata can include wallet addresses or beneficiary identifiers associated with the resource, assignment instructions can define asset disbursement conditions (e.g., proportional allocations or event-based distributions), and operational markers can signal lifecycle states (e.g., deferred allocation periods, constraints linked to off-chain validation processes, etc.). That is, the recording system 115 can maintain and provide access to protected data objects encapsulating rules, identifiers, and/or state-based information for distributing trust resources.

In some implementations, the detection system 114 can detect an execution trigger corresponding to an off-chain event or condition. For example, the detection system 114 can monitor trusted external data sources, such as third-party computing system(s) 150 or data source(s) 160, to identify changes in beneficiary status or the completion of an approval process (e.g., notarized documentation or government-issued certificates). That is, the detection system 114 can receive and/or process external signals or data updates to identify events or conditions corresponding to trust terms, such as changing in beneficiary statuses, death and/or incapacitation of asset owners, regulatory confirmations, lifecycle events, etc. In some implementations, the modeling system 113 can update, using the token control structure and based on the execution trigger, at least one token in the multi-resource container. For example, the modeling system 113 can modify a token to reflect changes in resource allocations, such as reallocating a resource to a designated wallet address or updating metadata to indicate the fulfillment of a trust condition. For example, the modeling system 113 can modify a token attributes to reflect a state transition (e.g., reallocation of ownership of a tokenized asset to a digital wallet of a beneficiary).

In some implementations, the modeling system 113 can update the at least one token by updating a resource dimension attribute for at least one recipient wallet address of the plurality of recipient wallet addresses. For example, the modeling system 113 can modify an allocation percentage or value within a token to reflect a transfer of partial ownership of a tokenized asset (e.g., from a trustor to a beneficiary). In some implementations, updating a token corresponding with the at least one off-chain RDO includes recording at least one of (i) a new on-chain entry or (ii) an updated on-chain entry. For example, the modeling system 113 can record an initial entry for an off-chain asset, such as a private equity stake or a physical property, by tokenizing attributes (e.g., serial numbers, geolocation, or legal ownership) on a distributed ledger. In some examples, the modeling system 113 can generate and store at least one of a new blockchain transaction representing the creation of a tokenized representation of the off-chain resource or an update to an existing metadata record associated with the resource. In some examples, the modeling system 113 can update an on-chain entry by modifying an existing ledger entry to include updated metadata, such as changes in ownership, value, or lifecycle constraints.

In some implementations, the recording system 115 can record, in the ledger storage, a distribution response corresponding to the updated resource dimension attribute of the at least one token. For example, the recording system 115 can log a transaction reflecting the disbursement of tokenized resources to multiple recipient wallets including data such as allocation percentages, timestamps, and/or operational markers. That is, the recording system 115 can create an immutable ledger record documenting the fulfillment of trust terms, including a triggering event (e.g., verification of a death of a trustor) and/or resulting allocations to beneficiary accounts (e.g., a partial transfer of an NFT to one or more wallet systems). For example, the recording system 115 can store a transaction in the ledger indicating that 10% of a tokenized estate was allocated to a first wallet address and 90% to a second wallet address based on predefined trust rules and/or corresponding execution triggers.

In some implementations, the retrieval system 111 can receive a plurality of resource descriptors. That is, the retrieval system 111 can retrieve resource data from various external systems or data sources (e.g., user computing system(s) 140, third-party computing system(s) 150, or data source(s) 160) via network 130. In some implementations, a first subset of the plurality of resource descriptors corresponds with at least one unrestricted resource, and a second subset of the plurality of resource descriptors corresponds with at least one restricted resource. For example, the retrieval system 111 can retrieve and/or otherwise obtain unrestricted resource descriptors representing tradable financial instruments such as equities or mutual funds and restricted resource descriptors representing assets with associated conditions and/or limitations on exchanges (e.g., private placements, annuities, assets governed by deferred allocation rules, etc.). In some examples, the retrieval system 111 can classify descriptors into subsets by analyzing metadata fields to identify attributes such as liquidity or illiquidity, lifecycle constraints, and/or operational markers.

In some implementations, the at least one restricted resource corresponds to a restricted resource data object (RDO) or limited-restricted RDO. For example, a restricted RDO can include and/or correspond with various data objects and/or structures encoding metadata corresponding with resources (e.g., assets) and indicating resource or asset-based conditions such as lock periods, regulatory compliance states, or approval requirements. In some examples, a limited-restricted RDO can include conditional constraints for partial access or incremental disbursements (e.g., phased equity vesting schedules). In some implementations, the generation system 112 can generate, within a unified resource container, a first sub-container including at least one unrestricted resource descriptor of the at least one unrestricted resource and a second sub-container including at least one restricted resource descriptor of the at least one restricted resource. That is, the generation system 112 can construct a unified resource container to aggregate and/or organize resource descriptors into sleeves based on common attributes. For example, the generation system 112 can create a first sub-container for unrestricted resources (e.g., tradable equity tokens), and a second sub-container for restricted resources (e.g., digital representations of illiquid real estate investments). In some examples, the generation system 112 can associate sub-containers with identifiers and operational rules encoded in metadata to provide granular control over resource access and/or updates.

In some implementations, at least one (e.g., each) resource descriptor of the plurality of resource descriptors can include a metadata object encapsulating at least one resource dimension attribute and at least one operational marker. For example, a resource dimension attribute can represent and/or encode quantitative or logical data such as allocation percentages, lifecycle durations, or market performance indicators, and an operational marker can encode state-based constraints, such as approval requirements, compliance rules, or deferred allocation periods. In some examples, the metadata object can include references to linked resources or tokens (e.g., root control structures) to support hierarchical operations across related tokens or sleeves. In some implementations, the detection system 114 can perform a multi-level validation by applying a first parameter to the unified resource container and a second parameter to the second sub-container. For example, the detection system 114 can apply a first parameter (e.g., a maximum portfolio risk tolerance) to multiple sleeves (e.g., the unified resource container) and a second parameter (e.g., a lifecycle restriction) to a restricted sub-container. In some examples, the detection system 114 can analyze metadata fields to compare allocation percentages with predefined thresholds and/or to identifying whether a portfolio exceeds or satisfies risk or liquidity constraints.

In some implementations, performing the multi-level validation includes the detection system 114 accessing at least one metadata object of the first subset of the plurality of resource descriptors to detect a threshold breach and detecting a lifecycle restriction based on the second sub-container. For example, performing the multi-level validation can include the detection system 114 identifying equity allocations in the unrestricted sub-container (e.g., first sleeve) that exceed a target percentage, signaling a threshold breach, and confirming that assets in the restricted sub-container (e.g., second sleeve) remain locked based on lifecycle constraints, such as deferral periods or regulatory compliance rules encoded within metadata. In some implementations, responsive to the multi-level validation identifying compliance or a deferral condition, the modeling system 113 can perform a resource update. That is, identifying compliance can include the detection system 114 confirming that portfolio allocations within the unified resource container satisfy predefined parameters (e.g., remaining within risk thresholds for unrestricted resources and adhering to lifecycle constraints for restricted resources). For example, the detection system 114 can validate that equity tokens remain below maximum allocation percentages and/or that restricted resources include operational markers indicating deferred states. In some examples, identifying a deferral condition can include the detection system 114 detecting an operational marker or metadata field in the second sub-container that prevents updates to restricted resources. For example, the modeling system 113 can identify lifecycle constraints linked to restricted resource descriptors (e.g., lock periods or pending regulatory approvals) that trigger deferral conditions and can maintain the restricted resource state until conditions are resolved.

In some implementations, the modeling system 113 can perform a resource update by updating a resource dimension field for at least one unrestricted resource descriptor in the first sub-container and restricting an update to the at least one restricted resource descriptor in the second sub-container. That is, updating a resource dimension field can include the modeling system 113 adjusting metadata fields to reflect new allocation percentages or updated operational states for unrestricted resources. For example, the modeling system 113 can reallocate equity tokens in the unrestricted sub-container (e.g., liquid sleeve) to align with portfolio rules (e.g., reducing high-risk allocations and increasing stable investments) and maintain deferred states for illiquid assets in the restricted sub-container (e.g., liquid sleeve). In some examples, restricting an update to a restricted resource descriptor can include the modeling system 113 preserving lifecycle constraints or deferral conditions encoded in metadata (e.g., maintaining or verifying a lock period or compliance status for private placements).

In some implementations, the resource update performed by the modeling system 113 can be based on at least one of the first parameter or the second parameter. That is, the modeling system 113 can apply the first parameter (e.g., overall risk allocation limits) to execute updates for unrestricted resources and the second parameter (e.g., lock periods or regulatory constraints) to prevent updates for restricted resources. For example, applying the first parameter can include the modeling system 113 reallocating equity tokens across multiple wallet addresses to achieve a balanced portfolio distribution that adheres to risk thresholds and liquidity requirements. That is, applying the second parameter can include the modeling system 113 tagging deferred resources with operational markers, such as indicators of pending approval or deferred allocation rules. In some implementations, the recording system 115 can record, within one or more metadata objects of the plurality of resource descriptors, a state transition reflecting an updated resource dimension attribute for the at least one unrestricted resource descriptor or a deferred update status for the at least one restricted resource descriptor. For example, the recording system 115 can append a timestamp, increment a counter, or modify a state attribute in a metadata object to reflect changes such as allocation adjustments or deferred updates. That is, the recording system 115 can log state transitions in ledger storage (e.g., blockchain or distributed database) to create an immutable record of resource updates and compliance events.

In some implementations, the data processing system 110 can include a network interface controller to link the data processing system 110 with one or more of the other networks, systems, or devices using one or more application interfaces or protocols. An application interface can include, for example, an application programming interface ("API") compatible with a component of the example system 100. That is, the communication interface can provide a communication protocol compatible with a component of the data processing system 110 and one or more of the user computing system(s) 140, third party computing system(s) 150, etc. The interface controller can be compatible with tokens and can be compatible with metadata delivery systems corresponding to one or more tokens.

In some implementations, the interface controller can establish a data channel between a source address and a destination address, such that receivals or transmissions of a token occurs between the addresses on a ledger and/or a digital wallet (e.g., provided by the mobile wallet system 142). An address can be generated based on executing, by a cryptographic key processor of the data processing system 110, a math-based function (e.g., hash, symmetric encryption, asymmetric encryption) on a public key of a public and private key pair (or a verification key of a verification and signing key pair). For example, if the interface controller receives a token from any system or device described herein, the token or other data received can include metadata associated with a source address, and the interface controller can determine a destination address (e.g., may be provided to the system sending the token in advance) to store the token in a blockchain storage. In various implementations, the addresses may be a unique sequence of randomized (or pseudo-randomized) numerical digits, characters, punctuation, whitespace, code (e.g., QR), or symbols.

In some implementations, the interface controller can establish a data channel between a source network address and a destination network address, such that receivals or transmissions of a token occurs between the networks on a leger, blockchain storages, and/or a digital wallet. The source network and the destination address can be generated based on executing, by the cryptographic processor, the math-based function on a public key of a public and private key pair and executing, by a network processor of the data processing system 110, a securitization engine to securely connect to the source demand network and the destination demand network. For example, if the interface controller receives a token, the token or other data received may include metadata associated with a source network address and establish a secure connection with the destination network address (e.g., provided by the metadata) to store the token in the blockchain storage.

In some implementations, the data processing system 110 can include a cryptographic key processor to generate and/or modify cryptographic keys. For example, the cryptographic key processor can include one or more asymmetric or symmetric key generators and can generate public-private key pairs. For example, a public-private key pair can include a public key configured to encrypt in accordance with a particular transform process. For example, a public-private key pair can include a private key configured to decrypt in accordance with a particular transform process compatible with the public key. In some implementations, the cryptographic key processor can link the public-private key pair with any individual object or component. In some implementations, the cryptographic key processor can link any public key or private key corresponding to the public-private key pair with any individual object or component. For example, the cryptographic key processor can generate a key compatible with or linked with an identifier corresponding to a particular, device, user, customer, account, system, or any combination thereof.

Upon receiving a token, the cryptographic key processor can identify a public key and/or a private key associated with the token. Upon identifying one or more private keys of the token, the cryptographic key processor can verify the token using the one or more identified public keys. In some implementations, the token can be previously stored on a distributed database ledger and the public-private key pairs may be stored thereon or throughout the example system 100. In some implementations, the received token may be an external token stored on a storage medium or a cache remote from the data processing system 110 (e.g., a digital wallet, a crypto-wallet, other storage mediums or caches, etc.).

In some implementations, the cryptographic key processor can sign the token using a private key and verify the token using a public key. For example, signing the token can include using a private key to create a digital signature (e.g., biometric scan, fingerprint capture, passcode verification, etc.), and verifying the token can include decrypting the token using a public key to verify the digital signature of the private key, or an address of the private key. The address of the specific private can be a hashed version of the specific private key based on a hash function (e.g., hash table, hash map). The public and private keys may be symmetric (e.g., use the same key to sign/verify) or asymmetric (e.g., use different keys to sign/verify). For example, an algorithm (e.g., a hash algorithm, etc.) can be applied to a private key to generate a public key.

Generating private and public keys can include concatenating multiple public-private key pairs into a single public-private key pair based on merging, using a math-based function, multiple key pairs. For example, a wallet public key or wallet public-private key pair can be provided by the wallet system 142 with a token (e.g., for deposit). The cryptographic key processor can generate a new internal public-private key pair prior to storing the token. The math-based function can be, but is not limited to, a Rivest-Shamir-Adleman, elliptic curve cryptography, Digital Signature Algorithm, asymmetric algorithm, hash algorithm or function, or symmetric algorithm, and so on. For example, executing the math-based function can include generating (or aggregating) a concatenated public key based on executing a concatenation of the wallet public key and the additional public key and hashing, utilizing salting, the concatenated public key based on a hash function, where salting includes providing random data and the concatenated public key as input to the hash function. In particular, the "salt" can be random data such as random bits that is used as an additional input to a one-way function such as a hashes or encryption algorithm. A new salt can be randomly generated by the cryptographic key processor each time salting occurs. Salting can occur based on a preference of a user depositing the token or in response to analyzing metadata of the token (e.g., based on value of the token or data stored in a metadata object).

In some implementations the cryptographic key processor can also be configured to generate public and private key pairs and the interface controller can be configured to provide public keys (or public and private key pairs, or private keys) to one or more computing devices for use in a token collateral request. The interface controller can interface (e.g., using an API) with one or more other ledger systems (other blockchain ledgers) and wallets (e.g., digital, crypto, etc.). In various implementations, the public and private key pair can be generated based on a cryptographic function (e.g., symmetric-key algorithms (Data Encryption standard (DES), Advanced Encryption Standard (AES), etc.), asymmetric-key algorithms (Ed25519 signing, Elliptic Curve Cryptography (ECC), etc.), public-key algorithms (Rivest-Shamir-Adleman (RSA), etc.), etc.) and be stored using the data processing system 110. In some implementations, the keys of the public and private key pairs may be stored in separate locations. For example, public keys may be stored in a key dataset and the private keys may be stored in a cold storage ledger. In some examples, the public and private key pairs may be stored together (as one data package) in a key dataset. In some implementations, the data processing system 110 can maintain (e.g., store and access keys) the key dataset such that each token may be locked-unlocked and associated with a public key or public-private key pair stored on the key dataset. In some implementations, public-private key pairs can be shared amongst a plurality of tokens or can be unique to each token on a blockchain storage.

The key processor can generate, transfer, and modify various cryptographic keys. The key processor can transfer one or more of the account key pairs (e.g., wallet key(s), internal keys, etc.) to or from a smart contract control structure. For example, the key processor can transfer a cryptographic key pair, a public key, a private key, a symmetric key, or any combination thereof, to or from the smart contract control structure to indicate a change in control of a particular token account to the smart contract control structure. The key processor can authenticate the smart contract control structure to a token account based on a key of the smart contract control structure. For example, the key processor can identify a token account associated with internal keys (e.g., internal public-private key pair). For example, the key processor can transmit a hash based on the internal keys to the wallet system 142 associated with the token account, to authenticate the smart contract control structure to the token account associated with the internal keys. The key processor can generate a corresponding number of "internal keys" or "wallet keys" such as "public and private key pairs" that can control restrictions on output by the particular metadata object linked with the particular smart contract control structure compatible with the particular token.

The wallet system 142 can include an interface to execute instructions corresponding to a particular wallet account, and to modify the structure or contents of a particular smart contract corresponding to a wallet account. For example, the wallet system 142 can include a user interface to receive input indicating selections of various tokens, transactions, accounts, devices, users, or systems. The user interface can include a graphical user interface that can be presented at a display device. The display device can display at least one or more user interface presentations and can include an electronic display. An electronic display can include, for example, a liquid crystal display (LCD), a light-emitting diode (LED) display, an organic light-emitting diode (OLED) display, or the like. The display device can receive, for example, capacitive or resistive touch input. The wallet system 142 can transmit one or more instructions, tokens, keys, or any combination thereof to, from, or with the data processing system 110 and/or user computing system 140.

The user computing system(s) 140 or wallet system 142 can include data fields regarding information about an owner of a respective user computing system 140 or wallet system 142. The data fields can include tokens corresponding to a user and a type for the tokenized asset. For example, a user computing system 140 can include a data field to indicate a user "John Doe" (identified using the universal unique identifier and multiple user identifiers) with tokenized assets correspond to a loan type. The data field can be visible to other user devices within network 130. For example, user computing system 140 owned by "John Doe" can be visible to another user computing system 140 owned by "Joe Smith." The owners may not access the tokenized assets of other user computing systems 140.

In some implementations, one or more tokens and/or the data processing system 110 can include a token processor configured to identify one or more characteristics of tokens. For example, the token processor can identify one or more characteristics of an individual token or a plurality of tokens satisfying criteria. The criteria by which tokens can be identified can include aspects of the token, fields, or components of the token, transform processes used to generate or modify the token, aspects of a metadata object linked with the token, owners of the token (e.g., a user identified by the universal unique identifier) or any combination thereof. For example, aspects of the token can include a hash of the token, or a value of an individual field of the token. The token processor can generate a trait corresponding to one or more characteristics of a token or an object linked with the token. For example, the trait can include a scalar or vector quantity corresponding to one or more values of an aspect of the token. The trait can include a numeric value corresponding to an identifier of the token. In some implementations, the token may be a fungible or an NFT. The token processor can communicate with, authenticate, and update various tokens and NFTs. The token processor can include one or more interfaces corresponding to an API or a smart contract interface, for example. A smart contract interface can include one or more executable instructions integrated with a smart contract. The smart contract interface can execute instructions at the smart contract or triggered by the smart contract in response to detection of objects or conditions external to the smart contract. The token processor can include at least a portion of a control structure of the smart contract.

In some implementations, the data processing system 110 can include a smart contract engine (e.g., smart contract processing circuit, etc.) configured to generate and/or modify one or more smart contracts. The smart contract engine can execute instructions to generate or modify a cryptographic container, to add or remove objects from a cryptographic container, and to execute various processors linked with or embedded with a smart contract. For example, the smart contract engine can execute various processors of a smart contract in response to detecting input including or corresponding to a token at the smart contract. In another example, the smart contract engine can include one or more processors to read, write, generate or modify one or more objects contained within a container of the smart contract, one or more tokens input to the smart contract, or one or more processors of the smart contract. Furthermore, the smart contract engine can obtain one or more tokens from the token processor against one or more smart contracts. For example, the smart contract engine can obtain one or more tokens from the token processor to compare the one or more tokens against one or more tokens requested by one of the one or more smart contracts. In some examples, the smart contract engine can execute smart contracts for a digital asset of a user, identified using the universal unique identifier. A smart contract can be executed in connection with a digital asset in response to determining that the universal unique identifier of the user of the digital asset is the same as the universal unique identifier for the smart contract.

In some implementations, the network processor can receive tokens and one or more metadata objects from one or more user computing systems 140. In some examples, the metadata objects can include a transaction ID, a timestamp, a type for the number of tokens, and user information. For example, a metadata object can include the universal unique identifier of the user or a link, address, or identifier of the block on a blockchain of a distributed database ledger storing the universal unique identifier of the user. In some examples, a token of a user can include the universal unique identifier of the user or a link, address, or identifier of the block on a blockchain of the distributed database ledger storing the universal unique identifier of the user. In some examples, a metadata object can include a funds type for the number of tokens.

The network interface can communicate with one or more external systems and networks compatible with transferring a token. For example, the network interface can include an API compatible with a third-party exchange system and/or user devices. For example, the network interface can be configured to receive characteristics associated with tokens, types of tokens, or metadata objects linked with tokens. For example, the network interface can be configured to receive quantitative values corresponding to a transfer of tokens between accounts and networks.

In various implementations, any data shared over a protected data channel can be encrypted and/or secured (e.g., hashed, password protected, etc.) to prevent unauthorized parties from performing unauthorized actions on the intermittent secure connection. For example, a masking algorithm may be executed performing bitwise operations (e.g., NOT, AND, NAND, OR, XOR, Complement, left-shift (logical or arithmetic), right-shift (logical or arithmetic), rotate right, rotate left, etc.) on any data transferred over the intermittent secure connection. That is, communications over a protected data channel can be encrypted with one or more secure network protocols (e.g., Secure Shell (SSL), Kerberos, IPSec, Secure Sockets Layer (SSL), Hypertext Transfer Protocol Secure (HTTPS), etc.) implemented utilizing a cryptographic function (e.g., symmetric encryption, asymmetric encryption, hashing, etc.). In some examples, the cryptographic function can be a homomorphic encryption function. In some examples, the cryptographic function can be any symmetric encryption function (e.g., Triple Data Encryption Standard (TDES), RC5, AES, Blowfish, CAST, etc.), and/or asymmetric encryption function (e.g., RSA, Efficient and Compact Subgroup Trace Representation (ECSTR or XTR), Digital Secure, Escrowed Encryption Standard (EES), etc.).

In some implementations, the data processing system 110 can include system memory including one or more hardware memory devices to store binary data, digital data, or the like. The system memory can include one or more electrical components, electronic components, programmable electronic components, reprogrammable electronic components, integrated circuits, semiconductor devices, flip flops, arithmetic units, or the like. The system memory can include at least one of a non-volatile memory device, a solid-state memory device, a flash memory device, and a NAND memory device. The system memory can include one or more addressable memory regions disposed on one or more physical memory arrays. A physical memory array can include a NAND gate array disposed on, for example, at least one of a particular semiconductor device, integrated circuit device, or printed circuit board device. The system memory can include a ledger, a token storage, a smart contract storage, and a blockchain storage including a key dataset.

The ledger can store the associations of tokens with token accounts (e.g., the association between a token account and the tokens owned or partially owned by the token account). In some examples, the blockchain storage can store portions of tokens (e.g., smart contracts containing information pointing to the off-chain content and metadata) and keys of the token (e.g., stored in the key dataset). For example, the content and metadata of the token may be stored in an on-chain hash that can point to a storage location of the content and metadata. In some examples, the tokens and token accounts can be associated with the universal unique identifier of the user.

The token storage can store one or more tokens and corresponding addresses for tokens that indicate links with the corresponding tokens. The token storage can include tokens associated with the data processing system 110 or any component thereof, the user computing system(s) 140 or any component thereof, any metadata object, or any combination thereof. In some implementations, the token storage can store one or more fungible tokens, semi-fungible tokens, and/or non-fungible tokens. The token storage can store corresponding addresses for fungible tokens that indicate links with the corresponding fungible tokens, corresponding addresses for semi-fungible tokens that indicate links with the corresponding semi-fungible tokens, and/or corresponding addresses for non-fungible tokens that indicate links with the corresponding non-fungible tokens.

The smart contract storage can store one or more smart contracts and corresponding addresses for particular smart contracts that indicate links with the corresponding smart contracts. The smart contract storage can also store one or more control structures and encapsulated metadata objects and corresponding addresses for control structures that indicate links with the corresponding control structures. The blockchain storage can store one or more blockchains linked to one or more smart contracts, tokens, control structures, or metadata objects, by corresponding addresses for smart contracts, tokens, control structures, or metadata objects that indicate links with a blockchain. The key dataset can store cryptographic keys associated with data processing system 110 or any component thereof, the user computing system 140 or any component thereof, any metadata object, or any combination thereof. For example, the key dataset can include public-private key pairs or private keys corresponding to accounts, tokens, smart contracts, devices, users, systems, or any combination thereof.

The wallet system 142 can include one or more tokens and keys corresponding to various accounts and linked with the user computing system(s) 140. For example, wallet system 142 can encapsulate one or more tokens within a secure container and can include an interface to manage stored tokens. The wallet system 142 can include wallet tokens, which indicate control of a metadata objects by a user linked with the wallet system 142 via an identifier and/or a cryptographic key or key pair. For examples, one or more wallet keys can include a key compatible with a wallet token. The wallet keys can be stored in the key dataset and received by a token control structure via a wallet key transmission. That is, wallet system 142 can execute a transaction or modify metadata of a wallet token in response to detecting input including the wallet key. The wallet key(s) can, for example, include a wallet public-private key pair, a wallet public key, or a wallet private key compatible with the wallet system 142. The wallet system 142 can permit access to a wallet token based on the wallet key(s), for example, compatible with the encapsulation layer and operable to decrypt the encryption corresponding to the encapsulation layer.

In some implementations, the data processing system 110 can include a token transfer processor to transfer and/or modify various tokens. The token transfer processor can include an API compatible with a blockchain. The token transfer processor can selectively add or update blocks from the blockchain. For example, the token transfer processor can add or update blocks in accordance with restrictions or interfaces of a permission blockchain, and can add, modify, and delete blocks independently of the restrictions or interfaces of the permission blockchain at any portion or index of the permission blockchain. In some implementations, the data processing system 110 can include a wallet transfer processor to transfer and modify various tokens. The wallet transfer processor can include an API compatible with the wallet system 142. The wallet transfer processor can selectively deposit, withdraw, or update tokens stored on the wallet system 142. In some implementations, the data processing system 110 can include an asset processor to transfer and/or modify various tokens corresponding an asset. The asset processor can include an API to convert received tokens from the third-party network into asset tokens compatible with the data processing system 110.

In some implementations, the generation system 112 (e.g., token generator) can generate or more tokens in accordance with a metadata object. For example, the token generator can generate multiple tokens based on a number of new metadata objects or tokens indicated by an obtained token. For example, the token generator can generate one or more tokens each including a link or a reference to a parent (or primary) token or container to identify a source token corresponding to the token minted by the token generator (e.g., for a physical asset or a digital asset). For example, the token generator can generate one or more tokens each including a link or a reference to a token from which the new tokens are minted. Thus, the token generator can provide a technical improvement of validating a minting of a token based on a parameter embedded in the token. The parameter can include a hash of the parent token or the token from which the new tokens are minted, for example. Generating a token and minting a token can be used interchangeably.

The token generator can also generate one or more tokens in accordance with a token or a control structure. For example, the token generator can generate multiple tokens based on a number of new metadata objects or tokens indicated by an obtained token and linked with respective smart contract control structures. For example, the token generator can generate one or more mirror tokens, sleeve tokens, or asset tokens each linked with a smart contract control structure with which the respective token is compatible. The token generator can modify and delete tokens linked with primary tokens or parent smart contract control structures, to update control of a partial transfer of metadata object control. For example, the token generator can create a token controlling 25% of shares of a physical or digital asset and modify a token originally controlling 100% of the asset to link with a smart contract control structure controlling 75% of the asset. The token generator can make the modification in accordance with an example for a change in control of 25% of the asset controlled by the original token holder.

In some implementations, the generation system 112 (e.g., metadata generator) can generate one or more metadata objects in accordance with a received request with third-party data (e.g., various data sources). For example, the metadata generator can generate multiple tokens based on a number of new metadata objects indicated by a withdrawal, deposit, or update from the wallet system 142 each linked with a particular smart contract control structure by which the respective metadata object is controlled. The metadata generator can modify and delete metadata objects linked with tokens or the smart contract control structures. The metadata generator can modify a quantitative value corresponding to a token. For example, a quantitative value corresponding to a token can indicate a value of fiat currency or MBC currency. The metadata generator can modify the quantitative value of the token based on a determined value (such as from off-chain data) to generate a scaled quantitative value. For example, a token having a quantitative value of 10,000 denominated in United States Dollar (USD) can be scaled based on a determined value of 0.1 to 1,000. That is, the data processing system 110 can perform any linear or non-linear transformation on a quantitative value and is not limited to the example product transform discussed herein. In some examples, the metadata generator can modify an owner (e.g., a user) of a token.

Referring now to FIG. 2, a depiction of a computer system 200 is shown. The computer system 200 that can be used, for example, to implement the example system 100 of FIG. 1, the data processing system 110, storage system 120, user computing system(s) 140, third-party computing system(s) 150, and data sources 160, and/or various other example systems described in the present disclosure. The computing system 200 includes a bus 205 or other communication component for communicating information and a processor 210 coupled to the bus 205 for processing information. The computing system 200 also includes main memory 215, such as a random-access memory (RAM) or other dynamic storage device, coupled to the bus 205 for storing information, and instructions to be executed by the processor 210. Main memory 215 can also be used for storing position information, temporary variables, or other intermediate information during execution of instructions by the processor 210. The computing system 200 can further include a read only memory (ROM) 220 or other static storage device coupled to the bus 205 for storing static information and instructions for the processor 210. A storage device 225, such as a solid-state device, magnetic disk or optical disk, is coupled to the bus 205 for persistently storing information and instructions.

The computing system 200 can be coupled via the bus 205 to a display 235, such as a liquid crystal display, or active matrix display, for displaying information to a user. An input device 230, such as a keyboard including alphanumeric and other keys, can be coupled to the bus 205 for communicating information, and command selections to the processor 210. In another implementation, the input device 230 has a touch screen display 235. The input device 230 can include any type of biometric sensor, a cursor control, such as a mouse, a trackball, or cursor direction keys, for communicating direction information and command selections to the processor 210 and for controlling cursor movement on the display 235.

In some implementations, the computing system 200 can include a communications adapter 240, such as a networking adapter. Communications adapter 240 can be coupled to bus 205 and can be configured to provide communications with a computing or communications network 130 and/or other computing systems. In various illustrative implementations, any type of networking configuration can be achieved using communications adapter 240, such as wired (e.g., via Ethernet), wireless (e.g., via Wi-Fi, Bluetooth), satellite (e.g., via GPS) pre-configured, ad-hoc, LAN, WAN.

According to various implementations, the processes that effectuate illustrative implementations that are described herein can be achieved by the computing system 200 in response to the processor 210 executing an arrangement of instructions contained in main memory 215. Such instructions can be read into main memory 215 from another non-transitory computer-readable medium (CRM), such as the storage device 225. Execution of the arrangement of instructions contained in main memory 215 causes the computing system 200 to perform the illustrative processes described herein. One or more processors in a multi-processing arrangement can also be employed to execute the instructions contained in main memory 215. In alternative implementations, hard-wired circuitry can be used in place of or in combination with software instructions to implement illustrative implementations. Thus, implementations are not limited to any specific combination of hardware circuitry and software.

That is, although an example processing system has been described in FIG. 2, implementations of the subject matter and the functional operations described in this specification can be carried out using other types of digital electronic circuitry, or in computer software (e.g., application, blockchain, distributed ledger technology) embodied on a tangible medium, firmware, or hardware, including the structures disclosed in this specification and their structural equivalents, or in combinations of one or more of them. implementations of the subject matter described in this specification can be implemented as one or more computer programs, e.g., one or more subsystems of computer program instructions, encoded on one or more computer storage medium for execution by, or to control the operation of, data processing apparatus. Alternatively, or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

Although shown in the implementations of FIG. 2 as singular, stand-alone devices, one of ordinary skill in the art will appreciate that, in some implementations, the computing system 200 can include virtualized systems and/or system resources. For example, in some implementations, the computing system 200 can be a virtual switch, virtual router, virtual host, virtual server. In various implementations, computing system 200 can share physical storage, hardware, and other resources with other virtual machines. In some implementations, virtual resources of the network can include cloud computing resources such that a virtual resource can rely on distributed processing across more than one physical processor, distributed memory, etc.

Figure 3:
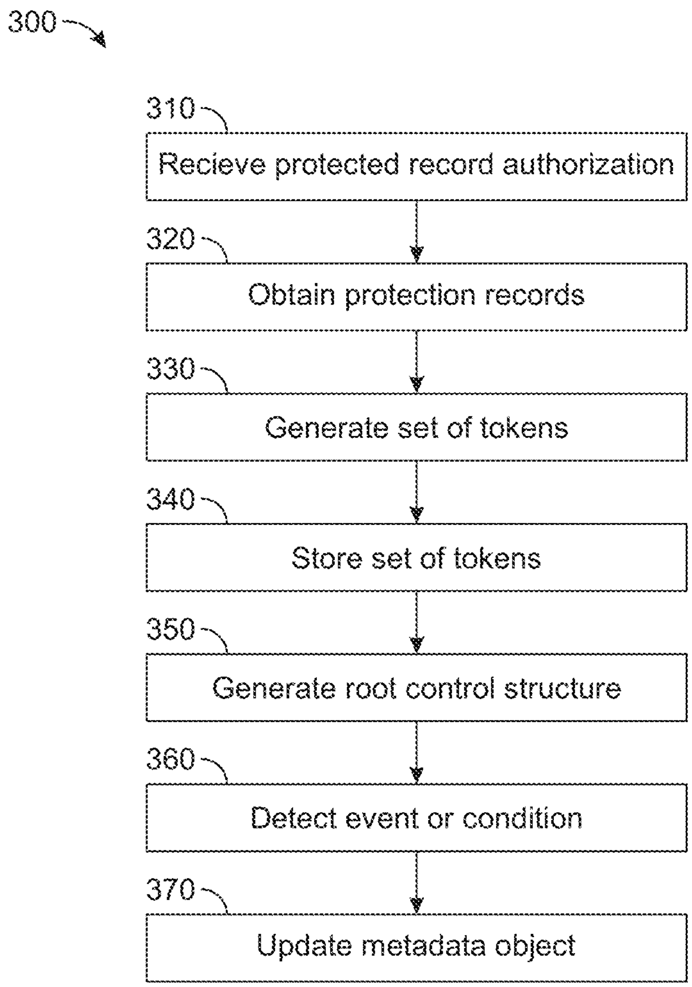
FIG. 3 depicts a flowchart diagram of an example method for protecting tokens using a unified containerized framework, according to some implementations.

Referring now to FIG. 3, a flowchart diagram of an example method 300 for protecting tokens using a unified containerized framework is shown, according to some implementations. At least one of the example systems of FIG. 1, FIG. 4, FIG. 6, and/or FIG. 8 can perform method 300 according to present implementations. In some implementations, additional, fewer, or different operations can be performed in method 300 depending on the implementation.

In some implementations, some, or all operations of method 300 can be performed by one or more processors executing on one or more computing devices, systems, or servers. In various implementations, at least one operation can be re-ordered, added, removed, or repeated. Additionally, some or all of the operations performed by the blocks can be removed or added.

In broad overview of method 300, at block 310, one or more processors (e.g., data processing system 110) can receive a protection record authorization. At block 320, the one or more processors can obtain protection records. At block 330, the one or more processors can generate a set of tokens. At block 340, the one or more processors can store the set of tokens. At block 350, the one or more processors can generate a root control structure. At block 360, the one or more processors can detect an event or condition. At block 370, the one or more processors can update a metadata object.

In some implementations, the method 300 can relate to and/or facilitate unified management of on-chain and off-chain resources in a single or unified account (e.g., UMA). For example, the method 300 can include integrating tokenized representations of off-chain and on-chain assets using a distributed ledger or other ledger storage system. In some implementations, method 300 can include operations for securely receiving authorization to access diverse financial records, tokenizing the records to encapsulate corresponding metadata (e.g., attributes for lifecycle states, allocation metrics, or operational markers), and/or performing resource updates based on conditions, rules, or detected events associated with the tokenized assets in the unified account. That is, method 300 provides structured processes for linking distributed ledger technology (DLT) and general ledger technology (GLT) by synchronizing or mirroring updates of off-chain assets on-chain while maintaining or verifying compliance with allocation thresholds or lifecycle constraints associated with the unified digital assets. In some implementations, the method 300 can include using control structures (e.g., instructions embedded in tokens, root-level control structures, etc.) that dynamically execute portfolio adjustments, log state transitions, and/or provide traceable records of resource activity in response to external triggers.

At block 310, the one or more processors (e.g., data processing system 110) can receive and/or otherwise obtain a protected record authorization. In some implementations, at block 310, the one or more processors can receive, from a user device, a protected record authorization for obtaining a plurality of protection records. For example, the data processing system 110 can process an incoming authorization request from user computing system(s) 140 including user consent to link financial accounts and/or provide access to associated records from various systems or platforms. That is, a protected record authorization can include user credentials, digital signatures, or multi-factor authentication tokens to validate access permissions for requested financial resources. In some implementations, the plurality of protection records can correspond to a plurality of control nodes. For example, the one or more processors can receive user consent to retrieve protection records from third-party computing system(s) 150 over one or more protected data channels (e.g., external banking APIs). That is, each control node can represent a distinct external system (e.g., a banking platform, investment service, or insurance provider) holding financial data relevant to the unified account. In some implementations, each protection record of the plurality of protection records received at block 310 can include at least a quant measure, a classification index, and an identifier. For example, the quant measure can reflect financial metrics, such as asset performance or risk levels. In some examples, the classification index can categorize records based on asset types (e.g., liquid assets, illiquid assets, or fixed-income instruments). In some examples, an identifier can include a numeric or alphanumeric value to distinguish and/or identify a protection record (e.g., for tracking and/or management).

At block 330, the one or more processors can generate a set of tokens. In some implementations, at block 330, the one or more processors can generate, based on the plurality of protection records, a set of tokens encapsulating a metadata object. For example, the data processing system 110 can tokenize protection records by creating cryptographically secured data structures representing individual assets or resources. For example, at least one (e.g., each) token can encapsulate a metadata object containing data attributes extracted from the protection records (e.g., quant measures, classification indices, identifiers, markers, tags, etc.). In some implementations, each token can include a token control structure that restricts an update or an output to the metadata object. For example, the one or more processors can generate a token control structure that can encode programmatic rules for resource updates that update metadata fields and/or prevent modifications to metadata fields based on detected execution triggers (e.g., rebalance request, lock periods, lifecycle restrictions, etc.) That is, the token control structure can include embedded instructions or logic (e.g., smart contracts) for applying operational constraints, verifying compliance conditions, and/or executing controlled updates based on predefined parameters. In some implementations, the metadata object can include at least one status attribute corresponding with an operational state of a corresponding protection record and at least one quant attribute corresponding with tracking an update in the quant measure of the corresponding protection record. For example, a status attribute can indicate a state-based condition or constraint (e.g., whether a resource is active, pending, or deferred). In some examples, a quant attribute can represent a quantitative or logic value (e.g., dynamic counter, allocation percentage, performance metrics, etc.).

At block 340, the one or more processors can store the set of tokens. In some implementations, at block 340, the one or more processors can store, in a ledger storage, the set of tokens. That is, the data processing system 110 can write the tokenized representations and associated metadata objects to distributed or centralized storage systems, such as blockchain networks, cloud-based databases, or hybrid ledger infrastructures. For example, the ledger storage can include distributed ledger technology (DLT) for immutably recording on-chain transactions and/or general ledger technology (GLT) for managing off-chain resources. In some examples, the one or more processors can use cryptographic techniques, such as digital signatures or hash functions, to secure token entries in the ledger storage and/or to validate data integrity or authenticity of resource exchanges or updates. For example, the one or more processors can generate or append cryptographic hashes to token entries to detect tampering and/or unauthorized changes. In some examples, the data processing system 110 can include timestamped entries to record the state and/or timing of resource updates for on-chain and/or off-chain assets.

At block 350, the one or more processors can generate a root control structure. In some implementations, at block 350, the one or more processors can generate a root control structure to apply a plurality of operational rules for metadata object updates. That is, the root control structure include and/or correspond with a system-level or container-level control layer (e.g., a master smart contract or foundational control mechanism) including code or logic for interfacing with token-level control structures to coordinate resource updates across the set of tokens. For example, the root control structure can encode global operational rules (e.g., compliance thresholds, lifecycle constraints, rebalancing instructions, etc.) to be applied across one or more tokens in a unified resource container. In some implementations, the root control structure includes executable instructions to interface with a plurality of metadata objects of the set of tokens. That is, the root control structure can synchronize updates across metadata objects by dynamically injecting, modifying, or executing embedded logic within tokenized data. For example, the root control structure can trigger updates to allocation percentages or lifecycle states across tokens in response to portfolio-level changes, such as a rebalance request or the detection of an off-chain event. In some examples, the root control structure can monitor compliance with allocation rules by querying and validating data attributes across metadata objects (e.g., confirming target allocation percentages or verifying asset lifecycle states). In some examples, the root control structure can detect discrepancies or irregularities across tokenized assets (e.g., out-of-bounds allocation metrics or expired lifecycle states) and initiate corrective actions, such as rebalancing resources or applying operational markers. For example, the data processing system 110 can use the root control structure to execute portfolio reallocation instructions by updating metadata objects to reflect adjusted resource dimensions and/or by encoding compliance confirmations in the metadata of affected tokens.

At block 360, the one or more processors can detect an event or condition. In some implementations, at block 360, the one or more processors can detect, using the root control structure, at least one off-chain event or condition corresponding with at least one protection record of the plurality of protection records. That is, the root control structure can include a smart contract configured to monitor a GLT, an external data feed, control node records, off-chain databases, event triggers, and/or other conditions or events to identify changes or updates to one or more off-chain resources that can be mirrored or replicated on tokens within a unified account (e.g., UMA) or resource container. For example, the root control structure or smart contract can receive and/or analyze data from third-party computing system(s) 150, user computing system(s) 140, or data source(s) 160 to identify events such as regulatory compliance updates, asset ownership transfers, or expiration of lifecycle conditions. In some implementations, the root control structure can encode event-detection logic to assess compliance with conditions (e.g., allocation thresholds, lifecycle constraints, etc.) and/or execute commands in response to detected events. For example, detecting the expiration of a lock period encoded in token metadata can trigger the root control structure or smart contract to re-apply updates or adjustments for an associated token. That is, the root control structure can facilitate dynamic and responsive management of tokenized resources by monitoring and recording detected off-chain events or conditions on a ledger storage.

At block 370, the one or more processors can update a metadata object. In some implementations, at block 370, the one or more processors can, in response to detecting the at least one off-chain event or condition, update, on the ledger storage using at least one of the root control structure or the token control structure, the metadata object. That is, the data processing system 110 can adjust and/or modify metadata fields associated with tokenized resources to reflect changes triggered by detected off-chain events or conditions. For example, the one or more processors can update a metadata object by modifying state attributes, such as transitioning an asset lifecycle state from locked to active following the expiration of a deferral period encoded in the metadata object. In some implementations, the one or more processors can update the metadata object based on updating at least one of a status attribute of a token of the set of tokens or a quant attribute of the token of the set of tokens. That is, a status attribute can represent a condition or state associated with the corresponding resource descriptor (e.g., marking an asset as pending, active, or liquidated), while a quant attribute can represent a dynamic value, such as an allocation percentage, asset balance, or performance metric. For example, the one or more processors can increment a counter or adjust an allocation percentage to align with updated portfolio rules or detected reallocation triggers. In some examples, the root control structure can trigger updates to metadata objects across a unified resource container to synchronize states of on-chain and off-chain assets.

In some implementations, the root control structure includes additional executable instructions to interface with the token control structure of each token of the set of tokens by embedding operational logic into the metadata object. That is, the one or more processors can generate or update a root control structure configured to inject or encode additional instructions, logic, conditions, rules, and/or other parameters into the token control structure for execution by a respective token. For example, interfacing with the token control structure can include the root control structure injecting or embedding programmatic logic or additional executable instructions (e.g., smart contract code) into the metadata object to synchronize state transitions between tokens and/or to enforce lifecycle constraints for restricted assets. In some examples, the root control structure can dynamically coordinate updates across tokenized resources by executing embedded instructions within token metadata to validate lifecycle conditions or execute rebalancing operations. In some implementations, the operational logic includes a plurality of instructions for updating the status attribute or the quant attribute based on the at least one off-chain event or condition detected by the root control structure. That is, tokens can include smart contracts or logic for updating a status attribute by modifying a state parameter of a token (e.g., transitioning from “active” to “liquidated” in response to ownership transfer events or compliance milestones). For example, the operational logic can include instructions for updating a quant attribute by automatically detecting execution triggers, recalculating allocation percentages, and adjusting dynamic counters (e.g., based on updated asset distributions, asset valuations or re-evaluations, regulatory changes, etc.).

In some implementations, to update the metadata object at block 370, the one or more processors can update, using at least one of the root control structure or the token control structure and the plurality of instructions, the status attribute indicating at least one of a state change or updated status corresponding with the operational state of the corresponding protection record. For example, the one or more processors can update and/or otherwise modify a metadata object corresponding with a token to indicate a transition of a corresponding resource or asset (e.g., to a newly introduced resource state, an updated resource state, a removed resource state). That is, updating the status attribute can include modifying a metadata object to reflect a state transition for the associated protection record (e.g., transitioning from “pending” to “active” or “locked” to “released”). For example, the one or more processors can apply operational logic embedded in the root control structure to update state parameters within token metadata based on detected off-chain triggers, such as lifecycle completions or compliance validations. In some examples, updating the status attribute can include marking an asset or resource as retired, reallocated, or liquidated to reflect corresponding changes in the operational state of a corresponding protection record.

In some implementations, to update the metadata object at block 370, the one or more processors can update, using at least one of the root control structure or the token control structure and the plurality of instructions, the quant attribute of the token based at least on the update to the quant measure of the corresponding protection record. For example, updating the quant attribute can include the one or more processors incrementing or decrementing a value in the metadata object to indicate changes in allocation percentages, asset balances, or performance metrics associated with the corresponding protection record. That is, the one or more processors can dynamically adjust the quant attribute to mirror off-chain changes or updates, such as resource rebalancing operations, transaction completions, or changes in valuation metrics. For example, the quant attribute can represent updated allocation rules or counters that reflect recalculated resource dimensions after applying portfolio adjustments triggered by external conditions. In some examples, updating the quant attribute can include embedding recalculated values for performance metrics (e.g., adjusted risk ratings, yield metrics) into the metadata object to synchronize asset representations across a unified container.

In some implementations, to detect the at least one off-chain event or condition, the one or more processors can receive, using at least one of the root control structure or the token control structure and the protected data channel, a synchronization indicator from one or more control nodes of the plurality of control nodes. That is, the synchronization indicator can represent a signal, trigger, or event notification indicating changes or updates in resource data associated with a protection record (e.g., updated asset valuations, regulatory compliance updates, or transaction confirmations). In some implementations, the synchronization indicator can correspond with receipt or detection of updated resource data corresponding with the corresponding protection record. For example, the one or more processors can receive a synchronization indicator from a control node (e.g., a banking platform or investment database) signaling the availability of new data, such as adjusted account balances or completed transactions. In some implementations, the synchronization indicator can correspond with identification of a predefined temporal event corresponding with the one or more control nodes. That is, the one or more processors can process periodic updates or supplemental data from control nodes (e.g., end-of-day reporting, scheduled data refresh events, other temporal conditions) to detect events indicating metadata object updates. For example, the one or more processors can receive data indicating the occurrence of time-based or temporal triggers, such as the expiration of a deferral period or the arrival of a periodic portfolio rebalancing interval. For example, identification of a predefined temporal event can include the one or more processors receiving data indicating the availability of updated asset data or the occurrence of a time-triggered condition or event.

In some implementations, to detect the at least one off-chain event or condition, the one or more processors can determine at least one of an exchange at one or more control nodes of the plurality of control nodes updating the quant measure of the corresponding protection record. That is, detecting an exchange can include the one or more processors identifying a transaction event, resource update, or other adjustment at a control node (e.g., asset trades, fund transfers, or payment settlements) that updates or changes a quant measure (e.g., unit price, number of shares, etc.) associated with a corresponding protection record. For example, the one or more processors can detect a trade execution event at a control node (e.g., a brokerage platform) that updates allocation percentages for a tokenized asset or resource. In some implementations, the one or more processors can update the quant measure of the corresponding protection record based on a re-modeling applied by the one or more control nodes. That is, a re-modeling event can include a reevaluation event corresponding with one or more control nodes recalculating or updating portfolio metrics (e.g., re-modeling risk ratings, re-modeling yield predictions, etc.) or updating asset valuations based on market changes or regulatory inputs. For example, the one or more processors can re-model update the quant measure of a token to reflect updated or re-modeled performance metrics (e.g., projected ROI, adjusted NAV) provided and/or retrieved over a protected data channel or other communication interface with one or more control nodes. In some examples, detecting the re-modeling event can include the one or more processors receiving and/or synchronizing recalculated quant measures to a set or group of tokens within a unified continue to dynamically represent changes in off-chain assets.

In some implementations, the one or more processors can validate, using a first public key of a first public-private key pair corresponding with at least one control node of the plurality of control nodes, a first cryptographic signature of the corresponding protection record. That is, validating the first cryptographic signature can include the one or more processors retrieving a public key associated with a control node and/or performing a verification operation (e.g., signature validation, hash comparison) to confirm an authenticity and integrity of a corresponding protection record. For example, the one or more processors can use the corresponding private key validate that the protection record was signed by the control node and has not been tampered with during transmission over a protected data channel.

In some implementations, the first cryptographic signature is generated using a first private key of the first public-private key pair. That is, the control node can generate a first signature using a private key and attach the private key to the protection record, and the one or more processors can receive and/or analyze the first signature validate the protection record to establish proof of origin or authenticity. In some implementations, the one or more processors can embed a second cryptographic signature in at least one field of the metadata object of the token. That is, in response to validating a first signature, the one or more processors can generate a second digital signature to represent a verification or acknowledgment by the provider system or by a control node (e.g., signing a token update or confirming compliance with lifecycle constraints). For example, the data processing system 110 can use a second private key or third private key to generate a second signature for multi-level or dual verification of events, transactions, assets, tokens, or other off-chain and/or on-chain data. In some implementations, the second cryptographic signature is generated using a second private key of a second public-private key pair corresponding with the data processing system or a third private key of the at least one control node. That is, the one or more processors can cryptographically verify or sign data by applying a second digital signature using a private key associated with at least one of a provider system (e.g., second private key) or a control node (e.g., third private key).

In some implementations, the one or more processors can store or provide, using the ledger storage or the protected data channel, a second public key of the second public-private key pair. That is, the data processing system 110 can record the public key in a distributed ledger, general ledger, or database to provide access for various systems or entities to validate signatures generated by the data processing system 110. For example, the one or more processors can store or provide the second public key by generating a ledger entry (e.g., blockchain record), transmitting key or other identify through a protected data channel (e.g., to a control node, user, bank, auditing service, regulatory entity, etc.), and/or storing the key in a database (e.g., storage system 120). In some implementations, the one or more processors can perform, using at least one of the root control structure or the token control structure, the update to the metadata object in response to validating the second cryptographic signature using the second public key. That is, the root control structure or token control structure can execute conditional instructions to perform metadata updates in response to verifying an authenticity of an associated operation or event. For example, validating the second cryptographic signature using the second public key can include the one or more processors confirming the validity of a transaction event (e.g., ownership transfer or compliance update) using the root control structure or token control structure. In response to the validation, the one or more processors can use the root control structure or the token control structure to apply corresponding adjustments to a quant attribute or state attribute in a metadata object based on information or data corresponding with the transaction event (e.g., synchronizing on-chain and off-chain assets in response to validating cryptographic proofs).

In some implementations, validating the second cryptographic signature can include extraction, by the one or more processors, of the second cryptographic signature from the at least one field of the metadata object. That is, the one or more processors can parse the metadata object to locate and extract the second cryptographic signature embedded in a designated field of the token. For example, the one or more processors can access the metadata object to identify a signature field or marker (e.g., a field including cryptographic verification data) and retrieve the encoded signature for validation. In some implementations, validating the second cryptographic signature can include decryption, by the one or more processors using the second public key, of the second cryptographic signature to generate a validation hash. That is, the one or more processors can use the second public key to decrypt the second cryptographic signature by generating a hash value. For example, the one or more processors can perform various cryptographic operations (e.g., symmetric encryption protocols, asymmetric encryption protocols, Advanced Encryption Standard (AES), Rivest-Shamir-Adleman (RSA), Elliptic Curve Cryptography (ECC), etc.) to derive a validation hash from the extracted signature. In some implementations, validating the second cryptographic signature can include comparison, by the one or more processors, of the validation hash to a computed hash of the metadata object. That is, the one or more processors can calculate a hash value for the metadata object using a hashing algorithm used to generate the second cryptographic signature and compare the computed hash to the validation hash. For example, in response to determining the computed hash matches the validation hash based on the comparison, the one or more processors can confirm that the metadata object has not been altered and the second cryptographic signature is valid. In response to the comparison identifying a hash mismatch (e.g., difference between the computed hash and validation hash), the one or more processors can determine that the metadata is not authenticated and/or has been tampered with.

In some implementations, the one or more processors can perform, using the protected data channel, the at least one handshake based on at least one of (i) exchanging at least one of the first public key and the second public key with the at least one control node, (ii) executing a challenge-response protocol with the at least one control node, or (iii) analyzing a digital certificate provided by the at least one control node. That is, performing the handshake by exchanging at least one of the first public key and the second public key with the at least one control node can include the one or more processors initiating a secure exchange over a protected data channel and sharing or transmitting one or more cryptographic keys of one or more public-private key pairs for mutual authentication. For example, the one or more processors can transmit the second public key to the control node and can receive and store the first public key for validation operations. In some examples, performing the handshake by executing a challenge-response protocol with the at least one control node can include the one or more processors generating a cryptographic challenge (e.g., a nonce or random value). Further, executing a challenge-response protocol can include transmitting data corresponding to the cryptographic challenge to a control node and receiving or validating a response from the control node. For example, executing or performing a challenge-response protocol can include receiving a signed challenge (e.g., response) from the control node. Further, executing a challenge-response protocol can the one or more processors verifying the signed response using a corresponding public key to complete the handshake (e.g., based on identification of successful completion of the challenge-response protocol).

In some examples, analyzing a digital certificate provided by the at least one control node can include the one or more processors receiving an electronic file or data package associated with a certificate authority or trusted issuer. For example, the one or more processors can use TLS/SSL certificates (e.g., domain validated (DV), organization validated (OV), or extended validation (EV)), code signing certificates, client certificates, email certificates, and/or wildcard certificates. That is, analyzing a digital certificate can include determining and/or confirming a certificate chain, expiration dates, and issuer validity to identify that the control node is an authorized source. For example, the one or more processors can cross-validate or compare the digital certificate against a known list of trusted certificate authorities or use other identity assertion mechanisms to validate a control node or other source providing protection records.

In some implementations, the one or more processors can restrict, using the token control structure, the update to the metadata object based on determining that a validation of the second cryptographic signature indicates a variation between the second cryptographic signature and a computed hash of the metadata object. That is, restricting the update can include the one or more processors preventing modifications to metadata fields or attributes of a token if the validation process detects a mismatch between the second cryptographic signature and the computed hash. For example, the token control structure can include logic to block updates to quant attributes, status attributes, or operational markers when a cryptographic validation failure is identified (e.g., invalid digital signature, tampered metadata, or corrupted data). In some examples, the token control structure can trigger a notification or alert to indicate that the validation mismatch requires additional authentication or remediation. For example, the one or more processors can store a validation failure marker in the metadata object to signify restricted updates and log the failure event in ledger storage (e.g., blockchain or database).

In some implementations, the one or more processors can identify, based on the classification index, a plurality of resource descriptors corresponding with the plurality of protection records. That is, the classification index can include resource data such as identifiers, tokens, or tags, which can be used to determine asset types or classes (e.g., equities, fixed income, commodities, cryptocurrencies, or real estate). For example, the one or more processors can use the classification index to categorize protection records into hierarchical structures or resource groupings, such as liquid versus illiquid assets, asset subclasses, or sector-specific classifications (e.g., technology equities, government bonds). In some examples, the classification index can encode attributes used by the one or more processors to classify or segment resources for targeted portfolio management, such as by tagging resources with labels corresponding to risk levels, regions, or investment strategies (e.g., growth-oriented, value-based). In some implementations, the one or more processors can identify, based on the plurality of resource descriptors and a plurality of quant attributes of the set of tokens, a resource distribution corresponding with the set of tokens. That is, the resource distribution can represent an asset mix of an account (e.g., allocations grouped by class, geographic region, risk profile, etc.). For example, the one or more processors can determine or calculate allocation percentages for each resource descriptor based on quant attributes (e.g., balances, valuation metrics, or allocation weights). In some examples, identifying the resource distribution can include comparing a current asset mix to predefined portfolio rules (e.g., target allocations or compliance thresholds) and/or generating metadata updates for rebalancing or compliance tracking.

In some implementations, the quant attribute of the token can include at least one numeric or alphanumeric data field of the metadata object indicating a resource quantity of the corresponding protection record. That is, the quant attribute can encode a measurable value representing a resource characteristic, such as asset balance, allocation percentage, or performance metric (e.g., NAV, ROI, or P/E ratio). For example, the quant attribute can include numeric fields (e.g., total shares, dollar value, or units) or alphanumeric identifiers (e.g., tags for resource categories or states). In some implementations, the update in the quant measure of the corresponding protection record can be based on an off-chain or on-chain modification to the resource quantity. That is, the one or more processors can detect resource modifications triggered by off-chain events (e.g., fund transfers, market trades, or valuation updates) or on-chain transactions (e.g., token exchanges, rebalancing operations, or compliance-triggered updates) affects quantities or amounts of assets. For example, updating the quant measure can include recalculating allocation weights, adjusting asset balances, or updating performance metrics in response to detected changes. In some examples, the one or more processors can mirror off-chain modifications on-chain by encoding updated quant measures in the metadata object to synchronize state transitions of resources or assets across DLT and GLT systems.

Figure 4:
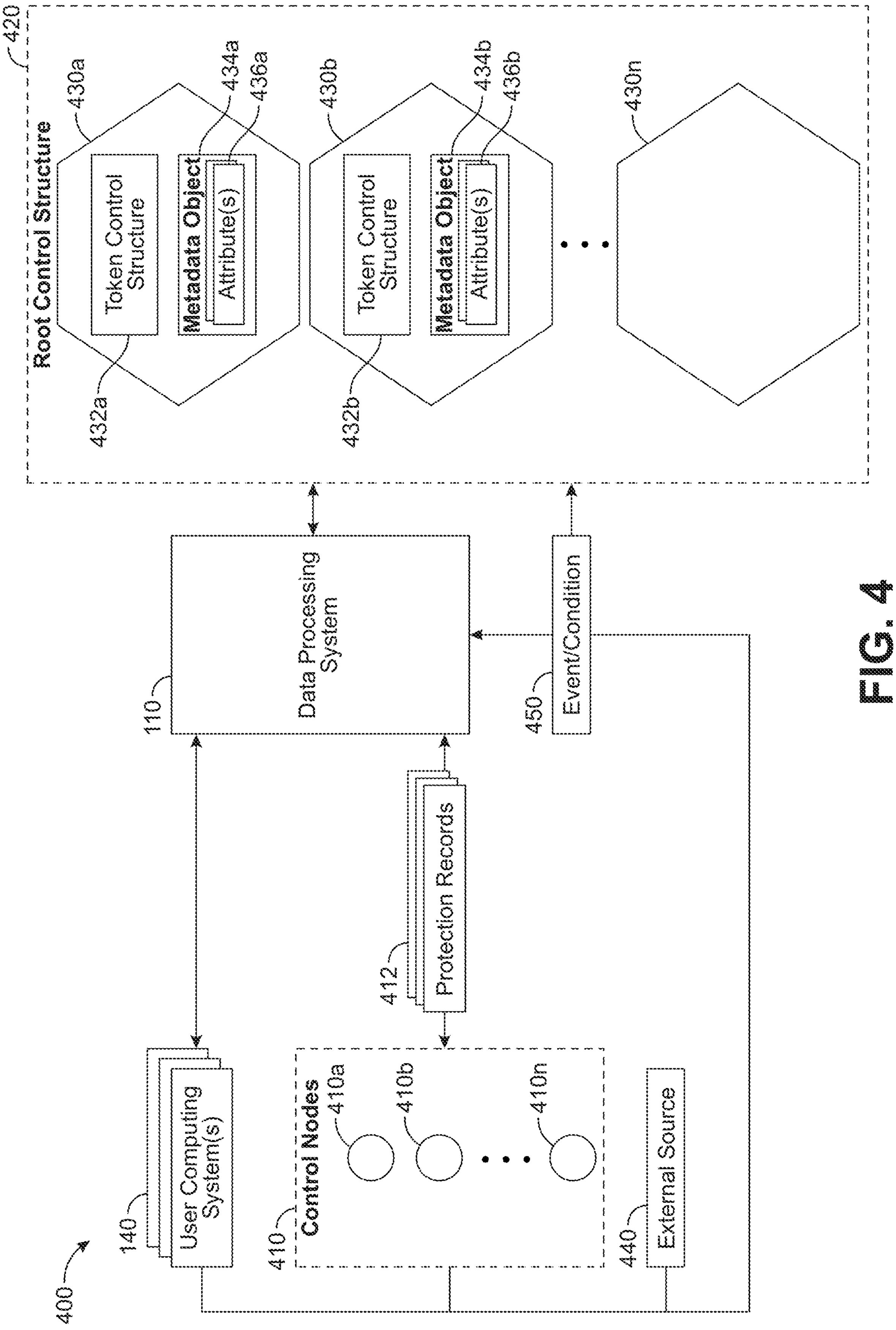
FIG. 4 depicts block diagram of an example system for protecting tokens using a unified containerized framework, according to some implementations.

FIG. 4 depicts a block diagram of an example system 400 for protecting tokens using a unified containerized framework, according to some implementations. In some implementations, the example system 400 can include data processing system 110, user computing system(s) 140, and control nodes 410*a*-410*n* (collectively, control nodes 410). The control nodes 410 can transit one more protection records 412 to the data processing system 110. In some examples, the data processing system 110 can include and/or correspond with a root control structure 420. The root control structure 420 can be configured or structured to manage one or more tokens 430*a*-430*n* (collectively, tokens 430). In some examples, the tokens 430 can include token control structures 432*a*-432*b* (collectively, token control structures 432) and metadata objects 434*a*-434*b* (collectively, metadata objects 434). For example, the metadata objects 434 can include one or more attributes 436*a*-436*b* (collectively, attributes 436). In some implementations, the data processing system 110 can detect an event/condition 450 from user computing system(s) 140, control nodes 410, and/or an external source 440. The data processing system 110 can updates one or more of the tokens 430 based on the detecting event/condition 450, as further described herein.

FIG. 4 relates to systems and methods for dynamically managing financial assets within a token-based ledger system used by financial institutions. Current financial systems face challenges in aggregating client portfolios composed of diverse assets such as liquid investments, illiquid holdings, and alternative financial instruments. These systems often rely on disparate manual or semi-automated processes to reconcile data updates, such as resource revaluations and compliance validations. For example, traditional banking platforms may experience delays and inefficiencies in managing portfolios that contain both publicly traded securities and private placements due to the lack of a unified framework for real-time updates. Legacy approaches typically use static validation models that fail to account for dynamic changes triggered by off-chain events, including regulatory updates, collateral modifications, or scheduled rebalancing activities. As a result, these methods often lead to outdated portfolio states, delayed identification of threshold breaches, and increased operational risk. For instance, detecting violations in asset allocation for restricted investments often requires batch processing, delaying corrective actions and negatively impacting portfolio performance.

Implementations of the present disclosure address these inefficiencies by introducing a unified resource container that dynamically manages and validates financial data. The system organizes client assets into a centralized structure, partitioned into sub-containers based on asset lifecycle attributes, allowing for real-time monitoring, validation, and compliance enforcement. The system incorporates a root control structure to enforce predefined operational rules, ensuring that asset updates are consistent with lifecycle restrictions and external triggers. For example, the system can dynamically track quant measures associated with each asset and apply validation logic in response to off-chain events such as revaluations or user-initiated updates. These mechanisms facilitate institutions to optimize portfolio management, reduce compliance risks, and enhance operational efficiency.

Systems and methods in accordance with the present disclosure facilitate dynamic portfolio management by integrating token-based ledger technology with financial data processing systems. The system receives resource descriptors representing client assets, each containing metadata objects with operational attributes such as quant measures and lifecycle markers. These descriptors are categorized into a unified resource container with sub-containers that correspond to unrestricted and restricted assets, allowing tailored validation and operational rule enforcement. The system employs multi-level validation to ensure compliance with global allocation parameters and asset-specific lifecycle constraints. In cases of threshold breaches or deferred update conditions, the system restricts updates to the affected sub-container while logging the conditions within the metadata object. Concurrently, unrestricted assets are updated in real time, ensuring consistent portfolio views and reducing operational delays. For example, when an off-chain event modifies the quant measure of a restricted asset, the system defers the update until the compliance checks are satisfied, logging the deferral status. Unrestricted asset updates, however, proceed without delay, facilitating rebalancing and suitability checks. This approach provides financial institutions with a framework for real-time asset management, enhancing both accuracy and operational efficiency.

In some implementations, the user computing system 140 can correspond with a customer account. The customer can input or provide consent (e.g., protected record authorization) by transmitting, using the user computing system 140, a request or permission to access account data (e.g., assets, resource descriptor, etc.) associated with one or more control nodes 410. For example, a customer may authorize the retrieval of financial data from control node 410*a* (e.g., a brokerage platform), control node 410*b* (e.g., a banking institution), or control node 410*n* (e.g., an insurance provider). For example, a customer may use a mobile banking application (e.g., executed on user computing system 140) to authorize the retrieval of investment portfolio data from control node 410*b* (e.g., a banking institution). In some examples, the consent or authorization can include an electronic signature (e.g., of an account holder) and/or other cryptographic information (e.g., hashes, keys, etc.) used by the data processing system 110 to authenticate or confirm access to resources and/or associated data held by control nodes 410. n some examples, the data processing system 110 can authenticate the protected record authorization by validating a digital signature using a public key of a customer or performing multi-factor authentication based on credentials provided by the customer. In some examples, the data processing system 110 can validate user consent by comparing a transmitted authorization against a tokenized or other digital representation a customer identity (e.g., a data entry stored in a database or ledger).

In some implementations, in response to authenticating the consent or authorization, the data processing system 110 can receive and/or otherwise obtain protection records 412 from control nodes 410. The protection records 412 can include asset or resource information such as restricted resource data objects (RDOs), asset identifiers, account balances, transaction histories, compliance documents, cryptographic signatures, and/or other data or metadata corresponding to on-chain or off-chain assets. For example, the data processing system 110 can retrieve asset positions or trade confirmations from control node 410*a* (e.g., a brokerage platform), deposit account balances or transaction histories from control node 410*b* (e.g., a banking institution), and/or insurance polices or claim records from control node 410*n* (e.g., an insurance provider). For example, control node 410*a* may provide a quant measure corresponding to the number of shares held in a specific stock, while control node 410*b* may provide a classification index indicating account types (e.g., savings or checking) for the customer.

In some examples, the data processing system 110 can parse the received protection records 412 to generate tokens 430. That is, the data processing system 110 can use the protection records 412 to generate or update one or more of the tokens 430. In some examples, a protection record can include an asset identifier (e.g., ID of a stock), a quant measure (e.g., the number of shares held), and an operational marker (e.g., restrictions on sale due to a pending transaction). For example, a protection record from control node 410*a* may include an asset identifier (e.g., an ID representing a mutual fund), a quant measure (e.g., the total number of units held in the fund), and an operational marker (e.g., a lock period preventing liquidation until a future date). In some examples, the data processing system 110 can extract attributes from a protection records 412 and embed the extracted attributes within of a metadata object 434 associated with a token 430. For example, the token 430*a* can represent a stock as a tokenized resource including metadata object 434*a* with fields and/or attributes 436*a* corresponding with an asset identifier of the stock, a quant measure (e.g., share price), operational marker (e.g., restrictions or conditions on transfers), and/or other resource dimension attributes. For example, the data processing system 110 can use a savings account number received from control node 410*b* (e.g., a banking institution) to generate token 430*b* encapsulating metadata object 434*b* with attributes 436*b* corresponding to a savings account provided and/or managed by control node 410*b*. That is, the metadata objects 434 can include various attributes 436 embedded within fields of tokens 430 that correspond with a variety of data or information, such as account balances, risk classifications (e.g., low-risk deposits), or compliance flags (e.g., indicators of regulatory thresholds met or exceeded). That is, the set of tokens 430 can provide a unified digital representation of assets or resources or updates to assets or resources associated with a customer account.

In some implementations, the root control structure 420 can encode instructions or operational rules to validate or modify the metadata objects 434 of the tokens 430 in response to off-chain events/conditions 450 (e.g., updating state attributes, recalculating quant measures, synchronizing balances, or mirroring lifecycle state changes). For example, in response to control node 410*a* (e.g., a brokerage platform) providing data indicating that a stock transaction has been executed, the root control structure 420 can trigger an update to token 430*a* by modifying metadata object 434*a* to reflect the adjusted number of shares held and recalculating allocation percentages in response to the off-chain event. That is, the root control structure 420 can synchronize tokenized assets with off-chain resources by interacting with token control structures 432. In some examples, the token control structures 432 can encode instructions or operational rules to validate or modify the metadata objects 434 of the tokens 430 in response to off-chain events or conditions. For example, token control structure 432*a* can embed logic to detect when off-chain compliance conditions are met, such as satisfying a dividend payout schedule, and trigger updates to metadata object 434*a* to include the newly credited dividend amount. For example, in response to control node 410*b* (e.g., a banking institution) transmitting updated account balance data, the root control structure 420 can initiate an update to token 430*b* by modifying metadata object 434*b* to synchronize the updated quant attribute with the new balance. In some examples, token control structures 432 can also monitor for changes in state attributes, such as transitioning a token from "restricted" to "active" upon detecting that a lock period has expired. For instance, the root control structure 420 can trigger a state update in token 430*a* after receiving a notification of lifecycle completion from control node 410*n* (e.g., an insurance provider).

In some implementations, the data processing system 110 can detect an event/condition 450 using data or signals received from user computing system(s) 140, control nodes 410, and/or external source 440. For example, the external source 440 can include one or more market data feeds, regulatory reporting systems, or third-party APIs providing updates on economic conditions or asset valuations. That is, the detection of an event/condition 450 can include identifying a change in asset valuation (e.g., receiving an indicator of stock price), a change in regulatory or market conditions (e.g., receiving notification of a regulatory compliance event), or any event or condition associated with off-chain or on-chain assets represented by tokens 430. For example, the data processing system 110 can detect an event/condition 450 corresponding to a payment settlement processed by control node 410*a* (e.g., a brokerage platform) that affects token 430*a* by reducing a corresponding value. That is, detection of event/condition 450 can include analyzing real-time data streams or external triggers to identify one or more update events, transactions, rules, instructions, or modifications to off-chain or on-chain resources.

In some implementations, the data processing system 110 can update one or more tokens 430 based on the detection of off-chain events or conditions. For example, in response to detecting a lifecycle event, such as the expiration of a lock period on an illiquid asset, the root control structure 420 can trigger an update to token 430*a* to modify the operational marker in metadata object 434*a*. For example, updating the tokens 430 can include transitioning the status attribute 436*a* of the metadata object 434*a* from a restricted state to an active state. For example, in response to a control node (e.g., control node 410*b*) providing updated account balance data reflecting the addition of new funds, the data processing system 110 can use the token control structure 432*b* to synchronize the quant attribute in metadata object 434*b* with the updated balance. That is, updates to tokens 430 can mirror off-chain changes by dynamically updating and embedding updated values in the metadata objects 434 to synchronize updates across distributed and general ledger systems.

Figure 5:
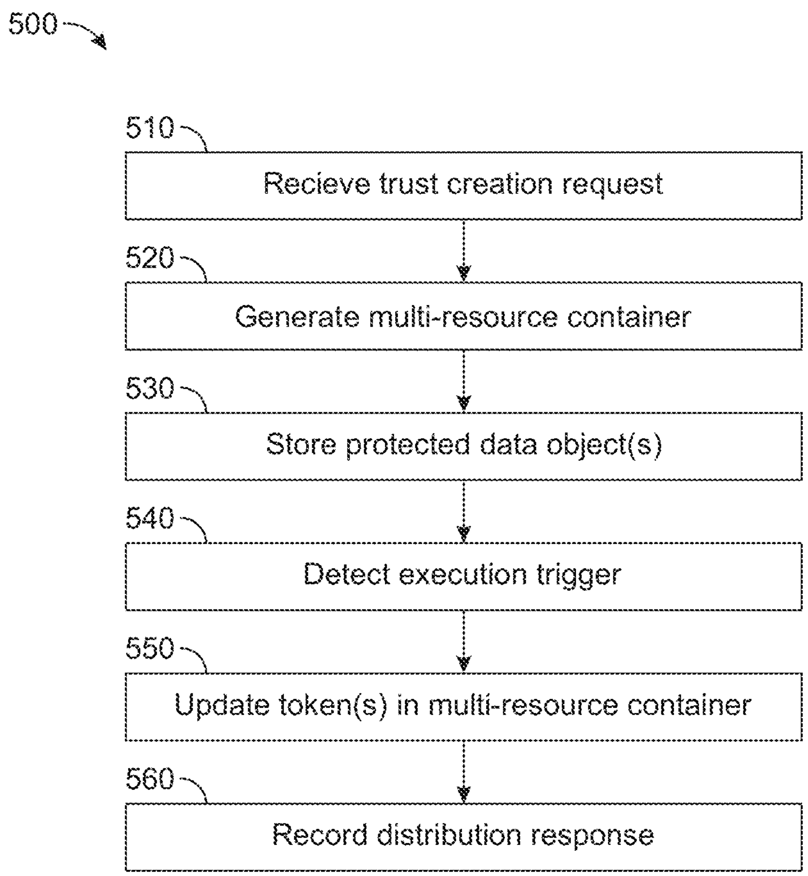
FIG. 5 depicts a flowchart diagram of an example method for dynamic modeling using control structures, according to some implementations.

Referring now to FIG. 5, a flowchart diagram of an example method 500 for dynamic modeling using control structures is shown, according to some implementations. At least one of the example systems of FIG. 1, FIG. 4, FIG. 6, and/or FIG. 8 can perform method 500 according to present implementations. In some implementations, additional, fewer, or different operations can be performed in method 500 depending on the implementation. In some implementations, some, or all operations of method 500 can be performed by one or more processors executing on one or more computing devices, systems, or servers. In various implementations, at least one operation can be re-ordered, added, removed, or repeated. Additionally, some or all of the operations performed by the blocks can be removed or added.

In broad overview of method 500, at block 510, one or more processors (e.g., data processing system 110) can receive a trust creation request. At block 520, the one or more processors can generate a multi-resource container. At block 530, the one or more processors can store protected data object(s). At block 540, the one or more processors can detect an execution trigger. At block 550, the one or more processors can update token(s) in the multi-resource container. At block 560, the one or more processors can record a distribution response.

In some implementations, the method 500 can relate to the automated management and execution of self-executing trust instructions involving both on-chain and off-chain resources in a unified digital framework. For example, method 500 can include operations to securely receive trust creation requests, generate a multi-resource container for encapsulating assets or resource descriptors, and facilitate the dynamic updating of resource attributes based on detected execution triggers (e.g., lifecycle events, compliance updates, or transaction approvals). In some implementations, the method 500 can use token control structures or root control structures embedded in a multi-resource container to encode operational instructions, validate asset updates, or enforce lifecycle rules. For example, a tokenized representation of an off-chain asset (e.g., real estate or an illiquid investment) can be updated dynamically in response to changes detected by external data sources, such as compliance verifications or trustee actions. That is, the method 500 can create traceable and cryptographically secure records for trust operations, including resource transfers, asset modifications, and beneficiary distributions.

At block 510, the one or more processors (e.g., data processing system 110) can receive and/or otherwise obtain a trust creation request. In some implementations, at block 510, the one or more processors can receive, from a user device, a trust creation request identifying at least one on-chain resource data object (RDO) and at least one off-chain RDO. That is, the trust creation request can be transmitted by a trustor device or another originating system and can identify at least one on-chain resource data object (RDO) and at least one off-chain RDO to be included in a multi-resource container. That is, the trust creation request can include digital resource descriptors (e.g., blockchain asset identifiers, wallet addresses, or tokenized contracts) and/or non-digital resource descriptors (e.g., descriptions of physical assets like real estate, tangible personal property, or documents such as insurance policies). For example, a trustor can submit a trust creation request that includes an on-chain RDO corresponding to a tokenized cryptocurrency wallet and an off-chain RDO corresponding to a physical artwork stored in physical location. In some examples, the trust creation request can include intended beneficiaries (e.g., wallet addresses for heirs or trustees) and associated allocation instructions (e.g., percentages of the trust allocated to each beneficiary). For example, the trust creation request can indicate that 60% of the cryptocurrency in the on-chain RDO be allocated to a primary beneficiary wallet and that 40% be allocated to a secondary wallet. In another example, the trust creation request can identify a physical property (e.g., a home) as an off-chain RDO and include assignment instructions for transferring ownership to a beneficiary upon detection of a triggering event (e.g., the death of the trustor). In some implementations, the trust creation request can further include cryptographic signatures from the trustor to authenticate the request.

At block 520, the one or more processors can generate a multi-resource container. In some implementations, at block 520, the one or more processors can generate, in a ledger storage, a multi-resource container including a set of tokens. That is, the one or more processors can generate data object or digital structure within a ledger storage system (e.g., a blockchain network, distributed database, or hybrid ledger infrastructure) configured to store a set of tokens corresponding to the resources specified in the trust creation request. That is, the multi-resource container can encapsulate digital representations of on-chain and off-chain resource data objects (RDOs). In some implementations, the set of tokens include one or more tokens for the at least one on-chain RDO and at least one tokenized representation of the at least one off-chain RDO. For example, the one or more processors can generate a token corresponding to an on-chain RDO, such as a cryptocurrency wallet or a digital certificate, by embedding metadata that reflects the associated properties of an on-chain resource (e.g., wallet address, token balances, or ownership data). In another example, the one or more processors can generate a tokenized representation of an off-chain RDO, such as a physical artwork, by including metadata fields describing the artwork (e.g., title, artist, physical location, or authentication data) in an NFT.

In some implementations, each token in the set of tokens can include a token control structure encoding output parameters for a plurality of recipient wallet addresses. For example, a token control structure can include instructions to apply allocation rules, such as distributing 60% of the on-chain RDO (e.g., cryptocurrency) to a primary beneficiary wallet and 40% to a secondary beneficiary wallet in response to a verified event/condition. In another example, the token control structure can encode operational markers or constraints, such as data fields indicating a lock or restriction transfer of a physical property represented by an off-chain RDO until a triggering event occurs (e.g., a lifecycle event, regulatory milestone, etc.).

At block 530, the one or more processors can store protected data object(s). In some implementations, at block 530, the one or more processors can store, corresponding with at least one token of the set of tokens in the multi-resource container, at least one protected data object comprising recipient metadata, assignment instructions, and at least one operational marker. That is, a protected data object can include cryptographically secured artifacts (e.g., video assignments or messages, location of private assets, inventory of non-digital assets) encapsulated as a payload attached to each token. For example, a protected data object attached to a token representing an on-chain RDO (e.g., a cryptocurrency wallet) can include recipient metadata (e.g., beneficiary wallet addresses), assignment instructions (e.g., allocation percentages like 50% to a primary beneficiary wallet and 25% to a secondary wallet), and/or operational markers (e.g., constraints preventing access until a lifecycle event, such as a trustor or beneficiary death, is verified). In another example, a protected data object for an off-chain RDO, such as a physical property or artwork, can include metadata fields describing the asset (e.g., location, physical dimensions, or authentication details), assignment instructions for transferring ownership (e.g., fractional shares of non-fungible assets), and/or operational markers encoding compliance conditions (e.g., jurisdictional requirements or legal documentation). In some implementations, the protected data object can include encrypted references or artifacts (e.g., cryptographic proofs, geolocation data, private asset records, or keys) for security. For example, a protected data object for a high-value non-digital asset can include an encrypted video message from the trustor providing personalized instructions and/or documentation verifying asset authenticity.

At block 540, the one or more processors can detect an execution trigger. In some implementations, at block 540, the one or more processors can detect an execution trigger corresponding to an off-chain event or condition. That is, an execution trigger can include a verifiable event or condition (e.g., death of trustor, lifecycle milestone for an asset, regulatory updates, or other qualifying events) that prompts operations (e.g., assignments, updates, distributions, etc.) associated with the trust arrangement managed by the multi-resource structure. For example, the one or more processors can detect a lifecycle event, such as the death of the trustor, based on verified data received from an oracle feed or a trusted source (e.g., a government registry or third-party certification system). In some examples, the execution trigger can correspond to a compliance event (e.g., satisfaction of a legal condition for asset transfer) or a market-related condition (e.g., valuation thresholds met for a tokenized asset). In some implementations, the execution trigger can include or correspond with a temporal event (e.g., the passage of a predetermined time period or expiration of a lock period encoded within the metadata object of a token). For example, detecting the execution trigger can include the one or more processors analyzing real-time data streams from external sources to identify changes in off-chain or on-chain conditions.

At block 550, the one or more processors can update token(s) in the multi-resource container. In some implementations, at block 550, the one or more processors can update, using the token control structure and based on the execution trigger, at least one token in the multi-resource container by updating a resource dimension attribute for at least one recipient wallet address of the plurality of recipient wallet addresses. That is, a resource dimension attribute can represent a quantifiable or logical field in the token that reflects a property of the underlying resource data object (e.g., allocation level, fractional ownership, share count, or deferred update status). For example, updating a token can include modifying the allocation level for a recipient wallet address from 50% to 70% in response to the death of a co-beneficiary as verified by an external oracle feed. In another example, the resource dimension attribute for a token representing an on-chain RDO (e.g., a cryptocurrency wallet) can be updated to reflect distribution parameters, such as allocating specific percentages of the wallet's balance (e.g., 40% to a primary beneficiary wallet and 60% to a secondary beneficiary wallet) in response to a triggering event, such as the death of the trustor. In another example, the resource dimension attribute for a token representing an off-chain RDO (e.g., a physical property) can be updated to include a new state parameter, such as a deferred update status, reflecting that the property transfer is pending regulatory approval.

In some implementations, updating a token corresponding with the at least one off-chain RDO comprises recording at least one of (i) a new on-chain entry or (ii) an updated on-chain entry. That is, the one or more processors can record a new on-chain entry to represent the tokenized ownership of an off-chain RDO, such as a fractional real estate interest, or update an existing entry to reflect a change in share count due to a transfer or adjustment. For example, the one or more processors can update the token control structure to reflect a newly added beneficiary, embedding allocation parameters that specify 30% ownership to a new recipient wallet address. In another example, in response to detecting an execution trigger corresponding to a property sale settlement, the one or more processors can update the resource dimension attribute of a token by reducing the share count from 100% to 60% and/or embedding operational markers indicating the transfer is complete and compliance conditions are met (e.g., local tax clearance).

At block 560, the one or more processors can record a distribution response. In some implementations, at block 560, the one or more processors can record, in the ledger storage, a distribution response corresponding to the updated resource dimension attribute of the at least one token. That is, the distribution response can include a record indicating the completion of an asset transfer or allocation event in response to an execution trigger. For example, the one or more processors can store a ledger entry encoding transaction data (e.g., recipient wallet addresses, transfer amounts, and timestamps) and corresponding cryptographic proofs to validate the update. In another example, the distribution response can include a digital receipt acknowledging the successful allocation of resources, such as splitting or dividing a cryptocurrency wallet balance into multiple recipient wallets. In some implementations, the distribution response can further include operational metadata, such as audit logs or compliance confirmations, that the one or more processors can store and/or provide via a ledger storage. For example, the one or more processors can generate and/or store a distribution response including audit trail of actions taken to distribute assets to beneficiaries (e.g., updates adjustments to tokenized ownership parameters and/or validations performed).

In some implementations, the at least one off-chain RDO corresponds with a non-transferrable resource unit or a limited-transferrable resource unit. That is, the off-chain RDO can include NFTs and/or corresponding physical assets with intrinsic or imposed restrictions that limit transferability or access. For example, a non-transferrable resource unit can include a family heirloom or legal document including rules or conditions indicating that ownership cannot be reassigned without trustee or legal authorization. In another example, a limited-transferrable resource unit can include a stock certificate or a restricted land deed in which exchanges or transfers are subject to jurisdictional laws, compliance approvals, and/or other regulatory constraints. In some implementations, the at least one operational marker encodes one or more constraints or restrictions for modifying or accessing the resource dimension attribute for the at least one recipient wallet address. For example, an operational marker for a tokenized representation of a restricted asset, such as a physical artwork, can include data fields indicating limitations on transfers or exchanges, such as state-based constraints (e.g., provenance verification) associated with the restricted asset. In another example, an operational marker for a limited-transferrable resource, such as a restricted stock, can include compliance flags used by the one or more processors to restrict updates and/or distributions until a vesting period or regulatory milestone has been reached. In some examples, the operational marker can include deferred update statuses used by the one or more processors to lock access or transfer capabilities for a resource until a corresponding triggering event, such as the resolution of a legal dispute or expiration of a regulatory lock period, is confirmed.

In some implementations, the one or more processors can identify a verification result including at least one of a cryptographic confirmation, an event certification, or an off-chain compliance indicator for the at least one off-chain RDO from at least one validated data source or control node. That is, the verification result can include data or evidence confirming the occurrence of a predefined event or condition, such as the death of the trustor, the completion of a legal process, or the fulfillment of regulatory requirements. For example, the one or more processors can receive verified data from an oracle feed or other trusted external source, such as a government registry, financial institution, or regulatory database, indicating the triggering event has occurred (e.g., certification of the death of a trustor, proof of asset valuation updates, or confirmation of regulatory compliance). In some implementations, the verification result can include cryptographic confirmations, such as digital signatures or certificates provided by trusted entities (e.g., trustee systems, beneficiary wallets, or control nodes), that authenticate the event or condition. For example, a cryptographic confirmation can include a digitally signed document certifying the authenticity of a non-digital resource descriptor (e.g., a land deed or legal agreement). In another example, the one or more processors can receive an event certification, such as a timestamped record or a notarized certificate, validating the occurrence of a milestone event (e.g., the conclusion of a legal dispute or expiration of a lock period).

In some implementations, in response to authenticating the verification result, the one or more processors can update, using the token control structure or a root control structure corresponding with the multi-resource container, the resource dimension attribute for the at least one recipient wallet address or the at least one token. For example, in response to verifying the death of a trustor via a cryptographic confirmation from an oracle feed, the one or more processors can update a resource dimension attribute by transitioning a deferred update status to active or modifying allocation levels for a beneficiary wallet address. In another example, the one or more processors can update operational markers within a token or metadata object to indicate and/or reflect the satisfaction of regulatory conditions, such as removing restrictions on transferring a tokenized representation of an off-chain RDO (e.g., physical artwork or restricted stock). In some implementations, the one or more processors can update the resource dimension attribute to distribute various assets within the multi-resource container by modifying allocation levels or ownership parameters associated with tokenized assets. For example, the one or more processors can adjust allocation percentages for multiple recipient wallet addresses (e.g., allocating 50% of a tokenized asset to a primary beneficiary and 25% to two secondary beneficiaries) or update the state parameters of a token to trigger the transfer of an off-chain RDO (e.g., releasing a property deed or transferring a fractional ownership interest).

In some implementations, the one or more processors can retrieve, using a protected data channel and based on detection of the execution trigger, a data payload for updating the at least one protected data object of the at least one off-chain RDO. That is, the data payload can include information or data artifacts transmitted via a secure communication protocol (e.g., TLS/SSL encryption, secure API requests) to update fields or attributes within the protected data object. In some implementations, the data payload includes custodial metadata, at least one cryptographic proof or signature, or an updated operational marker corresponding with the at least one off-chain RDO. For example, the one or more processors can retrieve geolocation data to confirm the verified location of a physical asset (e.g., a painting in a secure storage facility) or evidence of ownership, such as a notarized document or a digitally signed deed. In another example, the data payload can include cryptographically verified artifacts, such as digitally signed agreements or legal certifications, which the one or more processors can embed in the protected data object to authenticate the state of the off-chain RDO. In some examples, the one or more processors can retrieve an updated operational marker reflecting transferability restrictions (e.g., legal or jurisdictional limitations) or compliance conditions that impact the accessibility or assignability of a corresponding resource.

In some implementations, the one or more processors can update, using the token control structure or a root control structure corresponding with the multi-resource container, the at least one tokenized representation of the at least one off-chain RDO based on embedding data corresponding with the custodial metadata, the at least one cryptographic proof or signature, or the updated operational marker within at least one data field of the at least one protected data object. That is, the one or more processors can embed verified information or operational data into fields within the protected data object to encode and/or otherwise represent the state of the off-chain RDO. For example, the one or more processors can update a protected data object by embedding a cryptographic proof (e.g., a digitally signed certificate) into a designated metadata field to confirm the authenticity or ownership of a physical property represented by the token. In another example, embedding custodial metadata into a tokenized representation can include adding geolocation data indicating the verified location of an asset (e.g., a painting held in a secure vault). In some examples, the one or more processors can embed updated operational markers into a protected data object to encode restrictions or conditions (e.g., legal transfer limitations) governing the accessibility or transferability of the off-chain RDO.

In some implementations, the one or more processors can update, using the token control structure or a root control structure corresponding with the multi-resource container, the at least one tokenized representation of the at least one off-chain RDO based on updating the recipient metadata, the assignment instructions, or the at least one operational marker of the at least one protected data object based on the custodial metadata, the at least one cryptographic proof or signature, or the updated operational marker. That is, the one or more processors can modify recipient-related data or allocation instructions within the protected data object to reflect updated asset distribution parameters or compliance conditions. For example, the one or more processors can update recipient metadata to include a new beneficiary wallet address or modify assignment instructions to redistribute allocation percentages (e.g., reallocating a fractional percentage of an asset to a primary wallet and/or a secondary wallet). In another example, updating operational markers can include the one or more processors updating or revising compliance flags or state parameters within tokens to reflect the satisfaction of legal or regulatory requirements (e.g., updating a marker to indicate the expiration of a lock period or transfer restriction for a restricted stock).

In some implementations, the one or more processors can update a status level attribute corresponding with an authenticity or verification result of the at least one off-chain RDO based on the custodial metadata, the at least one cryptographic proof or signature, or the updated operational marker. That is, a status level attribute can represent a confidence metric or verification state associated with the off-chain RDO, and the one or more processors can update the status-level attribute based on the inclusion or validation of supporting data. For example, the one or more processors can determine and update the confidence level for a tokenized representation of an off-chain RDO, such as a physical artwork, by parsing, analyzing, and/or scoring associated verification data (e.g., a digitally signed certificate of authenticity, custodial records, or geolocation metadata). In another example, the status level attribute can reflect a higher confidence level for a token representing a restricted asset, such as a land deed, in response to validation of compliance conditions or regulatory certifications (e.g., legal ownership documentation or jurisdictional approvals). That is, the one or more processing can detect and/or otherwise identify information, custodial data (e.g., geolocation), and/or digital signatures associated with an off-chain resource or asset and update or increase a confidence level associated with the off-chain resource based on the supporting data.

In some implementations, the multi-resource container encapsulates or stores the set of tokens. That is, the multi-resource container can include a unified account or digital structure managed on a ledger storage to aggregate and/or update tokens representing on-chain and off-chain resource data objects (RDOs). For example, the multi-resource container can organize and link tokens corresponding to diverse asset types, such as cryptocurrency wallets (on-chain RDOs) and physical property deeds (off-chain RDOs), within a unified structure and/or framework. In some implementations, to generate the set of tokens, the one or more processors can receive, using a protected data channel, at least one unrestricted resource descriptor or protection record corresponding with the at least one on-chain RDO and at least one restricted resource descriptor or protection record corresponding with the at least one off-chain RDO. That is, the one or more processors can process input data, such as unrestricted descriptors for a cryptocurrency asset (e.g., wallet address or transaction history) and restricted descriptors for a tangible asset (e.g., location, ownership certification, or compliance flags), to create corresponding tokens within the multi-resource container. For example, the one or more processors can receive and tokenize a protection record for an on-chain RDO, such as a digital wallet, and a protection record for an off-chain RDO, such as a restricted land deed requiring jurisdictional approval for transfers.

In some implementations, the one or more processors can apply a token schema to generate the one or more tokens or the at least one tokenized representation. That is, the token schema can define a structure, format, or framework for organizing metadata, operational rules, and/or attributes associated with resource data objects (RDOs) to generate a digital representation corresponding with the RDO. For example, the token schema can include templates for encoding lifecycle states, compliance parameters, allocation rules, and custodial metadata into tokens and/or included metadata objects or control structures (e.g., smart contracts). In some implementations, the token schema corresponds with the at least one off-chain RDO or the at least one off-chain RDO. That is, the token schema can be configured for and/or correspond with a resource or asset type or feature. For example, a token schema for an on-chain RDO, such as a cryptocurrency wallet, can include metadata fields for wallet addresses, transaction histories, and/or allocation percentages. In contrast, a token schema for an off-chain RDO, such as a restricted stock certificate, can include fields for regulatory compliance data (e.g., jurisdictional transfer rules) and vesting schedules in addition to metadata fields for wallet addresses and/or allocation percentages.

In some implementations, the applying the token schema includes mapping resource data corresponding with (i) the at least one restricted resource descriptor or protection record or (ii) the at least one unrestricted resource descriptor or protection record to the output parameters encoded by the token control structure. For example, mapping unrestricted resource data, such as cryptocurrency wallet balances or tokenized asset details, can include populating and/or mapping data into token fields with allocation levels (e.g., 50% to a primary wallet) or operational rules (e.g., transaction thresholds) based on conditions or terms associated with a trust. In some examples, mapping restricted resource data (e.g., physical property deed) can include the one or more processors updating or associating custodial metadata (e.g., verified storage location) and/or compliance attributes (e.g., restrictions tied to jurisdictional laws) with fields defined in the token schema. For example, the one or more processors can analyze or parse a protection record associated with a piece of artwork to extract geolocation data, authentication artifacts, and/or state parameters and can embed the extracted resource data within one or more predefined data fields.

In some implementations, the output parameters include a plurality of operational rules encoded within the token control structure. That is, the operational rules can define executable instructions or constraints governing the lifecycle, distribution, or modification of the resource data object (RDO) represented by the token. For example, operational rules can include instructions for validating an execution trigger (e.g., verifying cryptographic signatures or compliance indicators) or applying state transitions to update attributes of a tokenized asset. In some implementations, the plurality of operational rules include a plurality of instructions for updating the resource dimension attribute for a corresponding recipient wallet address in response to the execution trigger. For example, in response to detecting the death of a trustor as an execution trigger, the operational rules can include instructions to reallocate 70% of an on-chain cryptocurrency wallet balance to a first beneficiary and 30% to a secondary beneficiary (e.g., via respective beneficiary wallet addresses). In another example, the operational rules for an off-chain RDO, such as a restricted stock certificate, can include instructions for automatically updating or transitioning a resource dimension attribute from "vested" to "transferable" upon the expiration of a lock period as verified by a regulatory compliance marker. In some examples, the token control structure can encode instructions to dynamically update allocation or compliance parameters based on detected conditions or events, such as updating a quantifiable attribute (e.g., share count or allocation level) when new custodial metadata is received.

In some implementations, the distribution response includes a ledger record corresponding with at least one of (i) the new on-chain entry or (ii) the updated on-chain entry. That is, the distribution response can capture and record the state changes or updates associated with the execution of operational rules in response to the execution trigger. For example, the one or more processors can generate a ledger record that documents a transfer or reallocation of tokenized assets, including updated resource dimension attributes (e.g., allocation values, state parameters) for corresponding recipient wallet addresses. In some implementations, the one or more processors can encode, using the token control structure, a confirmation of the execution trigger corresponding with the updated resource dimension attribute for the at least one recipient wallet address in the at least one protected data object of the at least one token. That is, the confirmation can include embedded metadata reflecting the validated execution trigger (e.g., death of a trustor, compliance milestone, or regulatory approval) and an associated effect on a corresponding resource dimension attribute. For example, the one or more processors can update a protected data object to include confirmation details, such as the execution trigger type, a cryptographic proof verifying the trigger, and/or the resulting allocation changes or state updates for associated tokens.

In some implementations, the one or more processors can store, using the ledger storage, at least one ledger identifier for the ledger record and a cryptographic hash of the updated resource dimension attribute. For example, the one or more processors can generate a data element or identifier (e.g., transaction ID or hash key) that references the ledger record and store the data and/or identifier in association with the corresponding token or multi-resource container (e.g., on a blockchain). In some examples, the cryptographic hash of the updated resource dimension attribute can be used to verify the integrity and/or authenticity of the corresponding resource update. That is, the one or more processors can store a transaction hash or other ledger identifier to reference the updated allocation level or state parameter of a tokenized resource in the multi-resource container, and the cryptographic hash of the updated resource dimension attribute can be retrieved and matched against the ledger record to confirm the authenticity of the resource update.

In some implementations, the trust creation request includes at least one digital resource descriptor corresponding with the at least one on-chain RDO, at least one non-digital resource descriptor corresponding with the at least one off-chain RDO, and one or more of the plurality of recipient wallet addresses. That is, the trust creation request can include information or identifiers associated with on-chain resources (e.g., blockchain asset IDs, wallet addresses) and off-chain resources (e.g., legal descriptions of physical assets, titles, or deeds). For example, the trust creation request can indicate and/or include information for an on-chain RDO corresponding to a cryptocurrency wallet or information for an off-chain RDO corresponding to a physical property, such as a home or artwork. In some examples, the trust creation request can include beneficiary wallet addresses (e.g., account numbers or identifiers corresponding with beneficiary wallet systems) and/or allocation instructions (e.g., metadata indicating half of a set of tokens included a cryptocurrency wallet to a primary beneficiary and a quarter of the set of tokens to two secondary beneficiaries). For example, the trust creation request can include non-digital resource descriptors for off-chain or otherwise restricted assets (e.g., a land deed with jurisdictional constraints and/or assignment instructions for transferring ownership upon the satisfaction of one or more conditions.

In some implementations, the one or more processors can detect at least one of a constraint or condition encoded by the at least one operational marker or a variation based on a comparison of the updated resource dimension attribute and an external validation result corresponding with the at least one off-chain RDO. That is, the one or more processors can analyze operational markers to identify restrictions or conditions associated with the off-chain RDO (e.g., limitations on transferring the resource due to legal constraints or compliance requirements) or compare the updated resource dimension attribute with external validation data received from one or more external sources. That is, external validation data can include data or information such as notarized ownership documents, compliance certifications, and/or third-party validation reports received from trusted data sources (e.g., an oracle feed, a government registry, a notary service, or a regulatory authority). For example, the one or more processors can detect a transfer restriction encoded within an operational marker for a physical property (e.g., a deed restricted by jurisdictional laws) or identify a dispute flag corresponding to ownership rights based on discrepancies between the resource dimension attribute and an external validation result (e.g., an updated deed certificate). In some examples, the one or more processors can identify constraints or conditions preventing resource distribution, such as unresolved legal disputes (e.g., pending litigation over asset ownership), incomplete regulatory approvals (e.g., missing required documentation for a restricted stock transfer), or inconsistencies in verification data (e.g., mismatches between geolocation metadata and custodial records for a physical asset).

In some implementations, the one or more processors can generate an action record including at least one of an update instruction, a supplemental request for external validation data, or a deferral action parameter. That is, the action record can record encoded instructions or parameters for addressing a constraint or condition identified during the detection or validation process. For example, the one or more processors can generate an update instruction to modify the updated resource dimension attribute for a tokenized representation of the at least one off-chain RDO (e.g., reallocating asset ownership percentages or updating compliance markers) in response to an external validation result. In another example, the action record can include a supplemental request for external validation data, such as a supplemental request for notarized ownership documentation or regulatory certifications from one or more data sources (e.g., government registries, oracle feeds, or notary services) to reconcile a detected variation. In some implementations, the action record can include a deferral action parameter that encodes a delay interval or operational rule for temporarily restricting or limiting resource updates or distributions until the satisfaction of a condition (e.g., resolution of a legal dispute or receipt of required approvals). For example, the one or more processors can encode and store a deferral action parameter to suspend updates to the resource dimension attribute of a restricted asset token until a compliance marker indicating regulatory approval is validated.

In some implementations, the one or more processors can perform an operational update to cause the at least one off-chain RDO to satisfy the constraint or condition or reduce the variation. That is, performing the operational update can executing instructions and/or performing operations to identify and/or address restrictions or discrepancies identified during validation. For example, the one or more processors can modify the resource dimension attribute for a tokenized representation of the at least one off-chain RDO to indicate that the resource complies with a regulatory requirement (e.g., updating an operational marker to indicate jurisdictional approval for transferring a land deed). In another example, the operational update can include the one or more processors re-encoding the recipient metadata within a tokenized representation to correct discrepancies in beneficiary allocation levels or to align ownership percentages with verified data received from external validation sources. In some examples, the operational update can include the one or more processors adding or revising custodial metadata to reflect updated storage locations or ownership details for physical assets (e.g., updating geolocation data to confirm a verified storage location for a physical artwork). Reducing In some implementations, the operational update includes at least one of (i) applying the update instruction using the token control structure, (ii) retrieving the external validation data using a protected data channel, or (iii) initiating a delay interval based on the deferral action parameter. That is, applying the update instruction using the token control structure can include executing the one or more processors executing encoded instructions to modify token attributes, such as updating the resource dimension attribute to reflect corrected ownership parameters or allocation levels. For example, the one or more processors can apply an update instruction to adjust a state parameter of a tokenized restricted stock from “vested” to “transferable” upon validating that the resource complies with a regulatory parameter. In some examples, retrieving the external validation data using a protected data channel can include transmitting a request to an entity or third-party (e.g., government registry, oracle feed) and parsing received data (e.g., notarized ownership records or compliance certifications) to verify conditions associated with the off-chain RDO. For example, the one or more processors can retrieve a digitally signed document verifying consent or agreement of a trustor and update corresponding token attributes to reflect the off-chain verification. In some examples, initiating a delay interval based on the deferral action parameter can include the one or more processors encoding a time interval or conditional rule within the token control structure to temporarily halt updates or distributions until the condition is resolved (e.g., pending resolution of a legal dispute, expiration of a regulatory lock period or delay interval, etc.). For example, the one or more processors can initiate a delay parameter to postpone asset distribution for a property deed pending the completion of jurisdictional validation checks and/or other verification operations.

In some implementations, the one or more processors can receive a first cryptographic signature for the multi-resource container generated using a first private key of a first public-private key pair of at least one originating device or computing system corresponding with the trust creation request. That is, the first cryptographic signature can include a cryptographic artifact or digital signature confirming the authorization and integrity of the trust creation request by the originating entity. For example, the first cryptographic signature can be generated by a trustor device or computing system using a private key to sign the request, and the one or more processors can embed the first cryptographic signature within the metadata of the multi-resource container to confirm the authenticity of one or more stored resource data objects (RDOs). In some implementations, the one or more processors can generate a second cryptographic signature for the multi-resource container using a second private key of a second public-private key pair of the data processing system. That is, the one or more processors can verify trust assets and/or updates to assets using a dual signature mechanism.

For example, the one or more processors can generate the second cryptographic signature to authenticate the integrity of the multi-resource container and included tokens or resources. For example, the one or more processors can use the second signature to cryptographically bind the contents of the multi-resource container, including tokens, operational markers, and metadata objects, to the ledger storage or trust system. In some examples, the one or more processors can regenerate the second cryptographic signature upon detecting updates to the multi-resource container, such as changes to allocation parameters or modifications to operational markers. That is, the one or more processors can verify that an electronic trust or will is cryptographically signed by the trustor and the trustee and resigned in response to updates to the will and/or modifications to included assets.

In some implementations, in response to the updated resource dimension attribute or recording of (i) the new on-chain entry or (ii) the updated on-chain entry, the one or more processors can transmit an updated signature request to the at least one originating device or computing system. That is, the updated signature request can include a cryptographic challenge or request for reauthorization to confirm and validate modifications made to the multi-resource container. For example, the one or more processors can generate an updated signature request for a trustor device including a prompt for the trustor to digitally sign and verify updates to tokenized assets with the trust framework (e.g., modified allocation levels, revised operational markers, and/or newly embedded metadata). For example, the one or more processors can provide a notification or message via a graphical user interface (e.g., GUI of a provider mobile application executed by a user computing system) including one or more graphical elements (e.g., a consent button, check box, etc.) that are selectable to cause the one or more processors to generate or regenerate a digital signature.

In some implementations, in response to the updated resource dimension attribute or recording of (i) the new on-chain entry or (ii) the updated on-chain entry, the one or more processors can regenerate the second cryptographic signature. For example, the one or more processors can regenerate the second cryptographic signature to verify updates in allocation percentages for beneficiary wallet addresses or changes to operational markers for tokenized representations of off-chain RDOs (e.g., a restricted stock certificate). That is, regenerating the second cryptographic signature can include generating a new hash of the updated resource dimension attribute and embedding the signature within the multi-resource container to provide tamper-evident records of the modifications. In some examples, the one or more processors can store the regenerated second cryptographic signature in association with the updated on-chain entry or ledger record.

Figure 6:
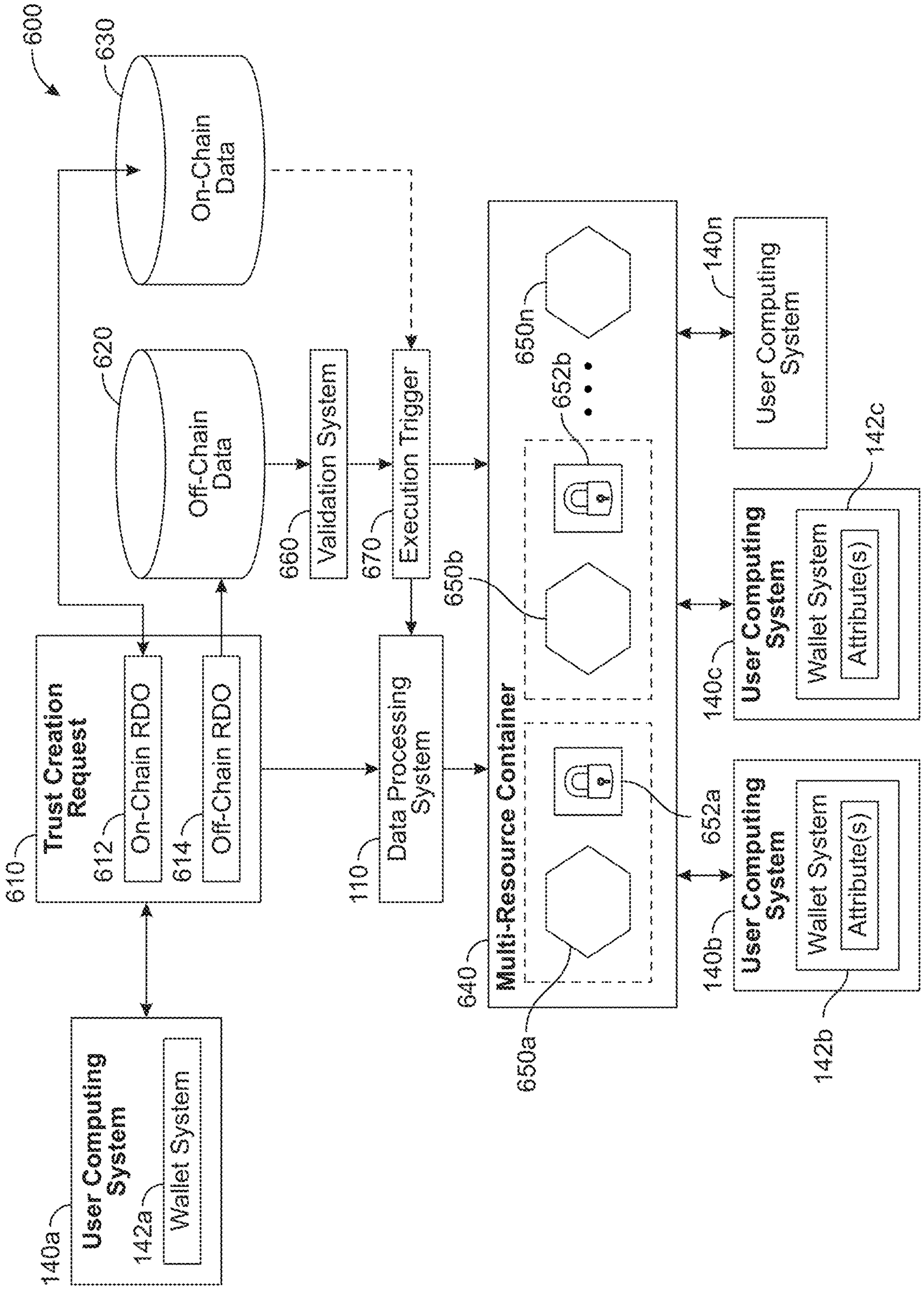
FIG. 6 depicts a block diagram of an example system for dynamic modeling using control structures, according to some implementations.

Referring now to FIG. 6, a block diagram of an example system 600 for dynamic modeling using control structures is shown, according to some implementations. In some implementations, the example system 600 can include data processing system 110 and user computing system(s) 140*a*-140*n* (collectively, user computing system(s) 140). In some examples, at least one (e.g., each) of the user computing systems 140 can include wallet systems 142*a*-142*n* (collectively, wallet systems 142). In some implementations, the data processing system 110 can receive a trust creation request 610 including at least one on-chain RDO 612 and at least one off-chain RDO 614. The on-chain RDO 612 can include or correspond with on-chain data 630 and the off-chain RDO can include or correspond with on-chain data 630. The data processing system 110 can generate a multi-resource container 640 including one or more tokens and/or tokenized representations 650*a*-650*n* (collectively, tokens and/or tokenized representations 650. At least one (e.g., each) of the tokens 650 can include and/or correspond one or more protected data objects 652*a*-652*b* (collectively, protected data objects 652). In some implementations, the data processing system 110 can receive on-chain data 630 and/or off-chain data 620, which can be validated by a validation system 660, to detect an execution trigger 670. The data processing system 110 can update and/or distribute tokens 650 stored within the multi-resource container 640 to one or more wallet systems 142 in response to the execution trigger 670, as further described herein.

FIG. 6 relates to systems and methods for self-executing trust instructions for on-chain and off-chain assets. Modern trust frameworks (e.g., estate planning systems, tokenized asset management solutions, real-time distribution platforms, and/or any high-complexity trust arrangements) often include multiple resource classes, such as digital tokens, fractional ownership records, and physical asset representations, to manage high-throughput distribution tasks (e.g., real-time disbursements, multi-beneficiary asset allocations, and/or data-intensive settlement processes). Traditional methods for estate settlements, such as entirely manual validation or offline probate, can lead to inefficiencies due to idle periods and administrative bottlenecks. For example, systems can wait for a conclusive legal determination before distributing assets, resulting in delays. Alternatively, fragmented off-chain tracking can reduce idle periods but introduce additional overhead (e.g., repeated verifications and multiple trust administrators), which can degrade performance when scaled across multiple beneficiaries or numerous asset classes.

Some methods for trust distribution, such as fixed beneficiary allocations or manual adjustments, cannot adequately balance timely execution and resource usage. These approaches often fail to adapt dynamically (e.g., in response to real-time or near real-time operational parameters) to variations in beneficiary requirements, asset types, and ledger updates. For example, fixed distribution rules (e.g., applying identical conditions for all assets regardless of their unique characteristics) can be inefficient when asset classes vary in liquidity or complexity. Additionally, manual adjustments can introduce inconsistencies or errors in the distribution process. Such methods can also lack flexibility for different estate scenarios or asset categories, leading to potential inefficiencies in trust management.

Systems and methods in accordance with the present disclosure can improve trust instructions by dynamically determining distribution triggers based on real-time (or near real-time) operational parameters, such as but not limited to, off-chain event detection, token control structures, beneficiary attributes, and/or ledger constraints. That is, the disclosed systems and methods can compute when to finalize distribution (e.g., reallocation among wallets) using a rules system receiving parameters as input, such as but not limited to, external confirmations (e.g., incapacity or regulatory notices), resource dimension attributes (e.g., fractional shares, remainders, and/or additional sub-trusts), and/or the current state of the ledger (e.g., on-chain entries, protected metadata). For example, the system can analyze an off-chain oracle feed and determine a distribution parameter (e.g., updating an attribute of a token) while modeling operational constraints (e.g., lock periods, trustee approvals, and/or the capacity of the container). The system can dynamically (e.g., periodically or continuously during operation) update distribution logic based on feedback from trust administrators regarding compliance checks or beneficiary changes. That is, the dynamic sizing of distribution triggers can be applied in various trust use cases, including real estate transfers, digital asset management, family estate planning, and/or any other resource management environment.

In some implementations, the systems and methods can determine a distribution parameter using a rules system that balances disbursement efficiency and governance conditions (e.g., restricting updates until certain operational markers are satisfied). For example, the system can compute token updates that reconcile overall beneficiary shares without exceeding constraints set by the instructions of a trustor and/or trustee. Additionally, the system can use a processing component (e.g., trust container) to facilitate initialization and runtime operations. For example, during initialization, the system can load default configurations, including designated beneficiary wallets and condition markers. During runtime, the system can fetch updated parameters periodically, register off-chain triggers (e.g., signals from a death certificate feed), and/or recalculate distribution rules to be applied on subsequent token updates. Thus, the systems and methods described herein provide improvements in automated trust administration, reducing manual overhead and facilitating flexible distribution across various asset classes.

In some implementations, the system can process at least one first token update based on a first distribution parameter (e.g., a beneficiary percentage). For example, the system can record the first distribution in ledger storage. Additionally, the system can update at least one performance metric (e.g., settlement time) based on timing data associated with the processing of the first distribution. In some implementations, the system can determine a second distribution parameter based on the updated performance metric. Furthermore, the system can apply, in real time, the second distribution parameter to the trust container so that any subsequent off-chain or on-chain event triggers a recalculated reallocation that reflects the second distribution parameter.

In some implementations, the user computing system 140*a* can correspond with a trustor and the user computing system(s) 140*b*-140*n* can correspond with one or more beneficiaries. For example, the data processing system 110 can receive the trust creation request 610 from the user computing system 140*a*. The trust creation request can include at least one on-chain RDO 612, at least one off-chain RDO 614, and/or include allocation instructions or metadata indicating distribution levels or other parameters associated with trust assets. For example, the trust creation request 610 can indicate that 70% of an on-chain cryptocurrency wallet be allocated to a primary beneficiary wallet system 142*a* and that 30% of the wallet be distributed among a secondary beneficiary wallet system 142*b* upon occurrence of an event or condition. In another example, the trust creation request 610 can indicate that an off-chain RDO 614, such as a physical property or restricted stock certificate, is to remain in trust until a regulatory compliance marker is satisfied.

In some implementations, in response to receiving the trust creation request 610, the data processing system 110 can generate and/or update a multi-resource container 640 by storing and/or updating tokens and/or tokenized representations 650. For example, one or more (e.g., each) of the tokens and/or tokenized representations 650 can correspond to at least one on-chain RDO 612, at least one off-chain RDO 614, or other resource data objects identified in the trust creation request 610. For example, token and/or tokenized representation 650*a* can represent the on-chain RDO 612, such as a cryptocurrency wallet containing digital assets (e.g., Bitcoin or Ethereum), while token and/or tokenized representation 650*b* can represent the off-chain RDO 614, such as a physical property, a land deed, a mirror token, or an NFT representing a physical asset (e.g., a watch, artwork, etc.).

In some implementations, the multi-resource container 640 can organize and/or link tokens 650 with one or more protected data objects 652. For example, protected data object 652*a* can include cryptographically secured artifacts, metadata, and instructions relevant to on-chain RDOs. For example, token 650*a* can correspond to an on-chain RDO 612 (e.g., a cryptocurrency wallet including digital assets such as Bitcoin or Ethereum) and can be associated with protected data object 652*a*. For example, protected data object 652*a* can include encrypted transaction history records, allocation instructions (e.g., directing a partial share of the wallet balance to a primary beneficiary wallet system 142*b* and a partial share to a secondary beneficiary wallet system 142*c* upon a verified execution trigger), operational markers (e.g., lifecycle state metadata), and/or cryptographic proofs verifying the authenticity of allocation or transaction events. For example, token 650*a* can correspond to a tokenized representation of stock holdings or other financial instruments. For example, token 650*a* can represent shares in a company encoded as a blockchain asset, with protected data object 652*a* including metadata such as the ticker symbol, total share count, transaction history linked to the stock, and/or instructions for allocating or distributing portions of the tokenized stock in response to predefined events and/or conditions.

In some examples, the token 650*b* can to the off-chain RDO 614 (e.g., a physical asset such as a painting, a land deed, or a restricted stock certificate) and can be associated with protected data object 652*b*. That is, protected data object 652*b* can include cryptographically secured metadata and/or operational instructions for managing and/or updating off-chain RDO 614 during over a lifecycle of the resource. For example, protected data object 652*b* can include location data confirming the verified storage of a physical asset (e.g., a painting located in a secure vault), video and/or testimonial proof (e.g., a recording from a trustor), ownership verification artifacts (e.g., notarized deed copies), and/or compliance directives (e.g., jurisdictional transfer restrictions). In some examples, protected data object 652*b* can encode assignment instructions or conditions for transferring ownership, such as prompting for consent of one or more designated beneficiaries or confirming that a compliance marker indicating regulatory approval is validated before an asset transfer or trust distribution. In another example, token 650*a* can correspond to a non-physical off-chain trust asset, such as a right to a recurring income stream (e.g., rental income from a property or dividends from a stock portfolio) or a bank account. For example, token 650*a* can correspond to a savings account held by a trustor and protected data object 652*a* can include metadata linking the token to the off-chain savings account (e.g., account number, institution details, and balance verification), operational rules (e.g., constraints on withdrawals based on execution triggers or beneficiary approvals), and/or cryptographic proofs (e.g., digital signatures from the trustor or institution verifying the account data).

In some implementations, the data processing system 110 can detect and/or otherwise identify an execution trigger 670 associated with one or more assets in the multi-resource container 640. For example, an execution trigger 670 can correspond to a verified lifecycle event (e.g., the death of a trustor, reaching a specified age of a beneficiary, or the completion of regulatory compliance requirements). That is, the data processing system 110 can analyze operational markers and/or metadata associated with the multi-resource container 640 and/or tokens 650 (e.g., included within the protected data objects 652) and compare the operational markers or metadata against validation results received from a validation system 660. In some implementations, the validation system 660 can include various data sources and/or external systems, such as oracle systems configured to provide data feeds or other trusted data sources providing verifiable external information. For example, oracles can receive data from government registries, financial institutions, or trusted third-party services and transmit cryptographically signed updates to the data processing system 110. For example, a government registry oracle can verify the death of a trustor by providing a signed death certificate, or a regulatory compliance oracle can confirm that a stock transfer satisfied jurisdictional requirements.

In some implementations, a root control structure of the multi-resource container 640 can automatically detect or identify the execution trigger 670 using embedded smart contract logic and/or instructions. In some examples, the root control structure distribute one or more of the tokens 650 and/or can interface with control structures of the tokens 650 to cause the tokens 650 to perform one or more operations for distribution (e.g., updating corresponding recipient wallet addresses) in response to the execution trigger 670. In some examples, the tokens 650 can detect and/or identify the execution trigger 670 using token control structures and/or other token-level logic or instructions.

In some implementations, in response to detecting the execution trigger, the data processing system 110 can distribute assets to one or more wallet systems 142 of user computing systems 142*b*-142*n*. That is, the data processing system 110 can update resource dimension attributes associated with wallet systems 142*b*-142*n* of designated beneficiaries (e.g., recipient wallet addresses) to exchange or distribute tokenized assets one or more recipient wallet systems according to encoded allocation parameters (e.g., partial asset shares). For example, for token 650*a* corresponding to an on-chain RDO 612, such as a cryptocurrency wallet, the data processing system 110 can update allocation percentages to distribute a share of the wallet balance to a primary beneficiary (e.g., wallet system 142*b*) and a share to a secondary beneficiary (e.g., wallet system 142*c*). In another example, if token 650*b* corresponds to an off-chain RDO 614, such as a physical property, the data processing system 110 can generate and transmit a digitally signed deed transfer artifact included within protected data object 652*b* to user computing system 140*b* to facilitate an asset transfer. For example, the protected data object 652*b* can encode metadata linking the deed to the physical property and compliance markers verifying that jurisdictional requirements for the transfer have been satisfied. The updated resource dimension attribute can include operational markers, such as a state parameter indicating the asset has been transferred, and can trigger the token control structure to notify beneficiaries of a completed transfer event.

In some implementations, the data processing system 110 can update tokens 650 within the multi-resource container 640 in response to changes in the trust arrangement, modifications to encoded allocation parameters, or external validation results. For example, the data processing system 110 can modify allocation percentages encoded in a token 650*a* representing an on-chain RDO 612, such as a stock portfolio, based on updated instructions, commands, conditions, or changes from a trustor received via user computing system 140*a*. In another example, the data processing system 110 can update or modify compliance markers or operational metadata within a token 650*b* representing an off-chain RDO 614, such as a restricted stock certificate, upon receiving validation data from a government registry via validation system 660.

In some implementations, the multi-resource container 640 can be cryptographically signed by the trustor and the trustee to confirm the integrity of the container and validate the associated tokens 650. For example, the trustor user computing system 140*a* can use a private key to generate a digital signature for the multi-resource container 640 during an initial trust creation process. The cryptographic signature can confirm the inclusion and accuracy of the on-chain RDO 612 (e.g., a digital asset wallet) and the off-chain RDO 614 (e.g., a stock certificate or land deed), along with their respective protected data objects (e.g., 652*a* and 652*b*). In some examples, the multi-resource container 640 can be updated and re-signed to reflect modifications to trust parameters or included assets. For example, the token 650*a* can correspond to a cryptocurrency wallet and allocation instructions can be updated or revised to distribute assets to updated beneficiary wallet systems. In response, the data processing system 110 can prompt the trustor and trustee to provide updated digital signatures. For example, token 650*b* can correspond to an off-chain RDO 614, such as a restricted stock certificate, and corresponding lifecycle state metadata can be updated to reflect regulatory approval or other compliance conditions. In response, the data processing system 110 can prompt a trustor computing system 140*a* and a trustee user computing system 140*b* to provide a cryptographic signature to validate the updated state.

Figure 7:
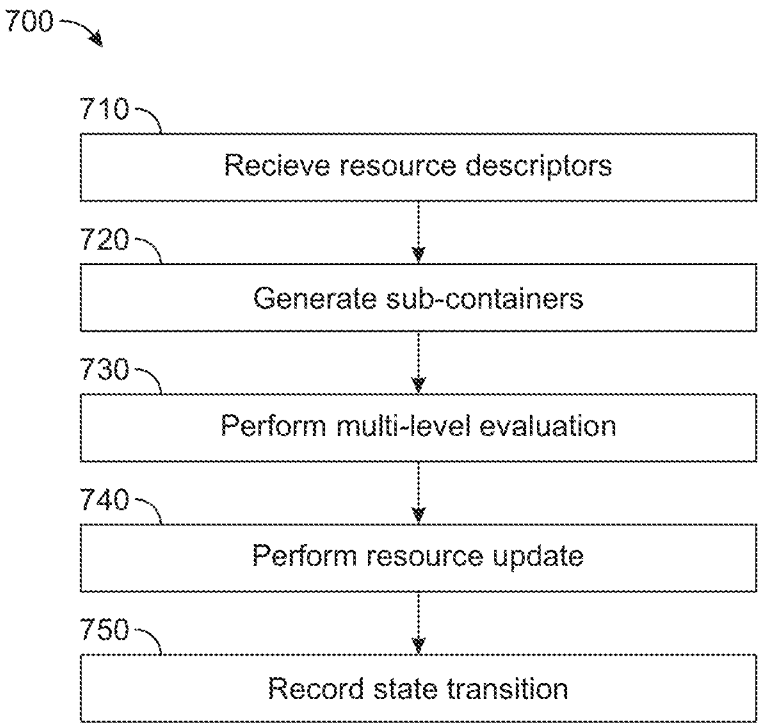
FIG. 7 depicts a flowchart diagram of an example method for multi-level validation using a unified containerized framework, according to some implementations.

Referring now to FIG. 7, a flowchart diagram of an example method 700 for multi-level validation using a unified containerized framework is shown, according to some implementations. At least one of the example systems of FIG. 1, FIG. 4, FIG. 6, and/or FIG. 8 can perform method 700 according to present implementations. In some implementations, additional, fewer, or different operations can be performed in method 700 depending on the implementation. In some implementations, some, or all operations of method 700 can be performed by one or more processors executing on one or more computing devices, systems, or servers. In various implementations, at least one operation can be re-ordered, added, removed, or repeated. Additionally, some or all of the operations performed by the blocks can be removed or added.

In broad overview of method 700, at block 710, one or more processors (e.g., data processing system 110) can receive resource descriptors. At block 720, the one or more processors can generate sub-containers. At block 730, the one or more processors perform a multi-level validation. At block 740, the one or more processors can perform a resource update. At block 750, the one or more processors can record a state transition.

In some implementations, method 700 can relate to the automated creation, management, and/or updating of unified investment accounts including liquid and illiquid assets. For example, method 700 can include operations to receive resource descriptors encoding lifecycle properties, operational constraints, and allocation parameters for tradable and non-tradable assets, and to organize or store the resource descriptors in sub-containers (e.g., liquid or illiquid sleeves). In some implementations, the method 700 can include operations such as using a multi-level validation framework that applies portfolio-wide risk parameters to liquid assets and determines or identifies restrictions or limitations on illiquid assets using metadata tags and operational markers associated with tokenized assets and/or sub-containers. In some examples, the method 700 can perform operations to update or rebalance a unified account (e.g., UMA) by modifying allocation percentages for assets in liquid sleeves (e.g., equities, ETFs, and fixed-income instruments) to maintain compliance with user-defined risk tolerances or allocation models and deferring updates to illiquid assets (e.g., annuities, private placements, or limited partnership interests) based on lifecycle restrictions or deferred update statuses. For example, sub-containers corresponding to liquid assets can be rebalanced to align with a new risk or sleeve model (e.g., a reallocation of investments among equities and bonds) and sub-containers for illiquid assets can be tagged or encoded by operational markers to identify that assets in the sub-container are excluded from rebalancing (e.g., due to transfer constraints, market unavailability, etc.) during various steps or blocks of the method 700. In some implementations, the method 700 can include operations to update or generate metadata objects associated with the resource descriptors including updated resource dimension attributes and/or other data used to monitor and/or validate portfolio changes.

At block 710, the one or more processors (e.g., data processing system 110) can receive and/or otherwise obtain resource descriptors. In some implementations, at block 710, the one or more processors can receive a plurality of resource descriptors. In some implementations, the one or more processors can receive a plurality of resource descriptors through one or more protected data channels, application interfaces, or other integrations with external systems or devices. For example, the one or more processors can retrieve resource descriptors from a financial management system, an investment cloud platform, or third-party custodial systems using encrypted API calls or file transfer protocols. In some examples, the one or more processors can receive resource descriptors transmitted as structured datasets (e.g., JSON, XML, or CSV formats) including metadata for one or more resources (e.g., identifiers, lifecycle properties, operational constraints, etc.). In some implementations, the one or more processors can receive the resource descriptors via a client-initiated request to consolidate and/or manage investments in a unified or multi-resource account or structure.

In some implementations, a first subset of the plurality of resource descriptors can correspond with at least one unrestricted resource. That is, the unrestricted resources can include liquid assets and/or instruments that are readily exchanged, adjusted, and/or rebalanced (e.g., public traded stocks, cash-equivalent instruments or treasury bills, cryptocurrencies, equities, ETFs, mutual funds, etc.). In some examples, a resource descriptor for an unrestricted resource can include a data package with metadata and/or attributes such as liquidity ratings, trading availability, and/or allocation parameters. For example, the unrestricted resource descriptor can include and/or be linked with a metadata object or token including allocation instructions indicating a target distribution level for the asset (e.g., maintaining a 10% allocation within the account) or a compliance marker indicating adherence to a risk tolerance model. In some implementations, a second subset of the plurality of resource descriptors can correspond with at least one restricted resource. That is, restricted resources can include non-tradable or illiquid assets subject to transfer, redemption, or lifecycle constraints, such as annuities, private placements, shares in an LLC, or limited partnership interests. For example, a resource descriptor for a restricted resource can include metadata encoding lifecycle restrictions (e.g., lock periods, delays, etc.), compliance requirements (e.g., jurisdictional approvals), and/or operational markers indicating deferred update statuses.

In some implementations, the at least one restricted resource corresponds to a restricted resource data object (RDO) or limited-restricted RDO. That is, a restricted RDO can encapsulate metadata, operational markers, and lifecycle properties corresponding with a restricted resource or asset. For example, a restricted RDO corresponding to an annuity can include metadata indicating a non-transferable status pending the occurrence of a predefined event (e.g., annuitant reaching a specified age or satisfying a contractual term). In some examples, a limited-restricted RDO corresponding to a private equity investment can encode conditions to validate the completion of an investor qualification check or the achievement of regulatory approval to permit allocation adjustments or distributions. In another example, a restricted RDO for a real estate holding can include operational markers indicating or flagging that updates to the resource descriptor and/or corresponding real estate asset are deferred until receipt of a notarized title transfer or completion of a compliance audit. For example the restricted RDO can correspond with a non-transferred or limited-transferrable resource unit.

At block 720, the one or more processors can generate sub-containers. In some implementations, at block 720, the one or more processors can generate, within a unified resource container, a first sub-container including at least one unrestricted resource descriptor of the at least one unrestricted resource and a second sub-container including at least one restricted resource descriptor of the at least one restricted resource. That is, the unified resource container can include a data structure or object implemented using a hierarchical data model to consolidate one or more types of resource descriptors (e.g., for both liquid and illiquid assets) and to retaining logical and/or operation separation of lifecycle-based categories (e.g., between liquid and illiquid sleeves). For example, the one or more processors can programmatically instantiate a sub-container using a containerized data structure (e.g., JSON objects, relational database schemas, or blockchain-based smart contract storage) configured to store and/or manage one or more assets or resources (e.g., publicly traded equities, ETFs, cash-equivalent instruments, cryptocurrencies, NFTs, etc.). For example, the one or more processors can generate a first sleeve token (e.g., first sub-container) and a second sleeve token (e.g., second sub-container) including various tags, links, codes, and/or metadata corresponding with stored assets (e.g., illiquid or liquid tokens) and/or an associated unified resource container.

In some implementations, each resource descriptor of the plurality of resource descriptors can include a metadata object encapsulating at least one resource dimension attribute and at least one operational marker. That is, a resource dimension attribute can include a data field corresponding with a resource descriptor indicating quantitative or logical properties corresponding with the resource descriptor. For example, resource dimension attributes can include allocation percentages (e.g., a numerical value indicating the proportion of a resource in a portfolio relative to the total container), lifecycle types (e.g., tags identifying unrestricted from restricted resources), or threshold values (e.g., predefined limits indicating a minimum or maximum permissible allocation level). In some examples, an operational marker can include a data field corresponding with the resource descriptor that indicates a state and/or restrictions or limitations corresponding with the resource descriptor. That is, the one or more processors can use the operational marker to determine a manager approval condition, a deferred update, or a lock period (e.g., delay or interval) associated with a corresponding resource descriptor.

At block 730, the one or more processors can perform a multi-level validation. In some implementations, at block 730, the one or more processors can perform a multi-level validation including applying a first parameter to the unified resource container and a second parameter to the second sub-container. That is, applying a first parameter can include analyzing or evaluating portfolio-wide metrics to validate portfolio compliance with global constraints (e.g., maintaining overall risk tolerances, liquidity targets, or diversification ratios). For example, the first parameter can include a target risk value that can be verified or validated by analyzing a weighted average risk score calculated from one or more aggregated resource descriptors (e.g., high-risk assets (e.g., equities) are capped at 60% and low-risk assets (e.g., bonds) are to constitute at least 40% of the total portfolio). In some examples, applying a second parameter applying or identifying one or more rules or conditions corresponding to restricted-lifecycle resources (e.g., alternative investments): For example, the one or more processors can determine that private placements in the second sub-container are to be capped at 10% of the total portfolio. In another example, the one or more processors can identify limited partnership assets in a second sub-container are subject to validation workflows and/or other restrictions on updates or transfers.

In some implementations, performing the multi-level validation at block 730 includes (i) accessing at least one metadata object of the first subset of the plurality of resource descriptors to detect a threshold breach and (ii) detecting a lifecycle restriction based on the second-sub container. That is, a threshold breach can include violations of predefined parameters such as a sub-container or unified container exceeding allocation limits or failing to maintain minimum liquidity levels. For example, the one or more processors can detect a threshold breach by comparing the aggregated allocation percentage of equities within the unified resource container against a predefined upper bound or lower bound of a range defined by an investment model. In some examples, the metadata object for at least one (e.g., each) resource descriptor can include tags or links to parameters that can be programmatically retrieved and/or compared during validation. In some examples, a lifecycle restriction can correspond to constraints or deferrals for restricted resources, such as lock periods or transfer prohibitions. For example, the one or more processing circuits can identify a sleeve code corresponding to the second sub-container and/or included illiquid resources and determine, based on analyzing the sleeve code, that associated resources are subject to operational constraints preventing updates or transfers pending the satisfaction of one or more conditions and/or occurrence of one or more events (e.g., expiration of a lock period, verification of a compliance marker, receipt of an external validation signal, etc.). For example, the one or more processors can detect a lifecycle restriction by retrieving a sleeve code linked to the illiquid sleeve token of the second sub-container, programmatically confirming that the sleeve token includes operational markers corresponding to a non-redeemable status, and/or bypassing processing of individual resource descriptors associated with the illiquid sleeve during rebalancing operations.

In some implementations, the multi-resource update can identify compliance or a deferral condition. That is, the one or more processors can determine or identify compliance or a deferral condition based on outputs of the multi-level validation. For example, the one or more processors can determine compliance for a liquid sleeve token by analyzing aggregated resource dimension attributes, such as allocation percentages or liquidity metrics, and confirming the resources complying with a predefined risk model or allocation threshold based on the identification or determination. In another example, the one or more processors can identify a deferral condition for an illiquid sleeve token by detecting operational markers or metadata tags indicating deferred update statuses (e.g., temporal conditions, lock periods, jurisdictional constraints).

At block 740, the one or more processors can perform a resource update. In some implementations, at block 740, responsive to the multi-level validation identifying compliance or a deferral condition, the one or more processors can perform, by the data processing system, a resource update by updating a resource dimension field for the at least one unrestricted resource descriptor in the first sub-container and restricting an update to the at least one restricted resource descriptor in the second sub-container. That is, the one or more processors can modify or adjust allocation percentages, liquidity parameters, or risk scores for unrestricted resource descriptors in the first sub-container to correspond with portfolio-wide constraints or sleeve models. For example, the one or more processors can access metadata objects corresponding to a first equity resource descriptor and a second fixed-income resource descriptor in the first sub-container and increment a resource dimension attribute for the second resource descriptor (e.g., increasing bond allocations) based on decrements to the first resource descriptor (e.g., reducing equity exposure) to align with an overall or sleeve-level allocation target.

In some implementations, the one or more processors can restrict updates to resource dimension attributes for restricted resource descriptors in the second sub-container by applying operational markers or deferral flags indicating lifecycle constraints. For example, a private equity resource descriptor can include metadata encoding a lock period and preventing allocation updates until the expiration of a predefined interval or the satisfaction of a compliance marker (e.g., receipt of external validation or notarized consent indicating a resource complies with or satisfies one or more state-based parameters or conditions). In some implementations, the resource update is based on at least one of the first parameter or the second parameter. That is, the first parameter include portfolio-wide values, constraints, thresholds, and the second parameter can encode or enforce lifecycle-based constraints or limitations for restricted resource descriptors in the second sub-container. For example, the one or more processors can apply the first parameter to adjust allocation levels for equities or fixed-income assets within the first sub-container to maintain alignment with a predefined risk tolerance model (e.g., reducing in a sleeve equities to 50% and increasing bonds in another sleeve to 30%). In another example, the one or more processors can apply the second parameter to defer updates for restricted resource descriptors in the second sub-container based on metadata encoding lifecycle restrictions or compliance markers (e.g., a private equity investment subject to a lock period or jurisdictional approval).

At block 750, the one or more processors can record a state transition. In some implementations, at block 750, the one or more processors can record, within one or more metadata objects of the plurality of resource descriptors, a state transition reflecting an updated resource dimension attribute for the at least one unrestricted resource descriptor or a deferred update status for the at least one restricted resource descriptor. That is, the one or more processors can programmatically update metadata fields or tags associated with resource descriptors to document allocation changes, compliance statuses, or lifecycle conditions. For example, the one or more processors can embed a state transition entry into a metadata object corresponding to an equity resource descriptor to indicate an updated allocation percentage following rebalancing operations. In another example, the one or more processors can append a deferral status tag to a metadata object of a restricted resource descriptor, reflecting operational constraints (e.g., non-transferable status or pending external approval) associated with a deferred update condition. In some implementations, the state transition can include generating a cryptographic hash or signature to provide an immutable audit trail for resource updates or deferrals recorded in metadata objects.

In some implementations, to perform the multi level validation at block 730, the one or more processors can apply the first parameter to the first sub-container and the second-sub container based on analyzing a distribution of a plurality of resource dimension attributes of the plurality of resource descriptors. That is, the one or more processors can calculate aggregated values, such as weighted allocation percentages, risk scores, or liquidity levels, from resource dimension attributes associated with resource descriptors in the unified resource container. For example, the one or more processors can analyze the allocation percentages of equity and fixed-income assets in the first sub-container to validate compliance with a risk model or allocation target. In some examples, the one or more processors can apply rules or thresholds encoded in the first parameter to the unified resource container to validate overall compliance with portfolio-wide constraints (e.g., cap on high-risk asset exposure).

In some implementations, to perform the multi level validation at block 730, the one or more processors can apply the second parameter to the second-sub container based on determining the lifecycle restriction or the threshold breach corresponds at least one of transferability condition or predefined metric restricting or limiting an on-chain or off-chain transfer of the restricted RDO or the limited-restricted RDO (e.g., non-transferrable resource unit or limited-transferrable resource unit). That is, the one or more processors can analyze metadata objects or operational markers in the second sub-container to identify lifecycle constraints or threshold breaches for restricted resources. For example, the one or more processors can detect a transferability condition by retrieving a lock period encoded in the metadata of a restricted RDO corresponding to a private equity holding and confirming that the lock period has not yet expired. In another example, the one or more processors can evaluate a predefined metric, such as a minimum holding period for a limited partnership interest, by comparing a timestamp recorded in the metadata object with a retention period for the interest. In some implementations, the one or more processors can apply rules encoded in the second parameter to enforce restrictions on updates or transfers for the restricted RDO or limited-restricted RDO (e.g., non-transferrable resource unit or limited-transferrable resource unit). For example, the one or more processors can programmatically bypass updates to allocation percentages for restricted assets in the second sub-container by applying deferral tags or markers indicating operational constraints (e.g., jurisdictional restrictions or pending compliance verification).

In some implementations, to perform the resource update for the first sub-container, the one or more processors can access a first metadata object corresponding with at least one first unrestricted resource descriptor and a second metadata object corresponding with at least one second unrestricted resource descriptor within the first sub-container. For example, the one or more processors can identify the first metadata object and/or the second metadata object using an identifier or tag associated with the first unrestricted resource descriptor and/or second unrestricted resource descriptor and can extract attributes (e.g., distribution metrics, risk scores, lifecycle states) from metadata fields of the first metadata object and/or the second metadata object. In another example, the one or more processors can retrieve the first metadata object and/or the second metadata object using object by navigating a linked reference or relational mapping encoded in the unified resource container and/or by accessing operational markers or resource dimension attributes associated with the first unrestricted resource and/or the second unrestricted resource descriptor.

In some implementations, to perform the resource update for the first sub-container, the one or more processors can update, based at least on the first parameter, the at least one resource dimension attribute by (i) decrementing a first resource dimension attribute of the first metadata object to indicate a reduction to a first quant measure corresponding the at least one first unrestricted resource descriptor and (ii) incrementing a second resource dimension attribute of the second metadata object by adjusting a second quant measure corresponding with the at least one second unrestricted resource descriptor based on the reduction to the first quant measure. That is, the one or more processors can programmatically rebalance allocations within the first sub-container by redistributing resource dimension attributes across unrestricted resource descriptors to align with allocation targets or risk parameters by applying corresponding increases (e.g., by incrementing counters) and/or reductions (e.g., by decrementing counters) of various tokens. For example, the one or more processors can decrement the allocation percentage of a first equity resource descriptor from 50% to 40% and increment the allocation percentage of a second fixed-income resource descriptor from 30% to 40% to achieve a balanced risk profile for the first sub-container.

In some implementations, the one or more processors can generate a linkage field for the metadata object comprising at least one of an identifier corresponding with the unified resource container or an address corresponding with a storage location or access point for the unified resource container on a ledger storage. That is, the linkage field can include an identifier and/or cryptographic object (e.g., signature or key) used to provide programmatic access and/or facilitate retrieval of data associated with the unified resource container. For example, the one or more processors can generate a cryptographic hash-based identifier for the unified resource container and store the identifier within a metadata field corresponding with the linkage field. In another example, the one or more processors can encode a URI or blockchain address as the linkage field of a metadata object to provide an access point for locating transaction or allocation records associated with the unified resource container on an external ledger or storage node. In some examples, the linkage field can include a dynamic pointer configured to update based on changes to storage locations or access points linked with the unified resource container.

In some implementations, the one or more processors can encode a sub-container tag in the metadata object indicating an association of the at least one unrestricted resource descriptor or the at least one restricted resource descriptor with at least one of the first sub-container or the second sub-container. That is, the sub-container tag can a logical marker used by the one or more processors to identify and/or group resource descriptors within respective sleeves (e.g., sub-container). For example, the sub-container tag can include a hierarchical identifier or a numeric or alphanumeric sleeve code corresponding with operational rules or constraints associated with resources and/or the sub-container. In some examples, the one or more processors can use the sub-container tag to dynamically filter or query resource descriptors for specific operations (e.g., selecting all descriptors tagged as "unrestricted" for rebalancing or excluding descriptors tagged as "restricted" from certain updates). In another example, the sub-container tag can include a linked reference to metadata fields indicating operational markers or allocation parameters for resources within the associated sub-container.

In some implementations, the unified resource container includes a root control structure including executable instructions to apply a plurality of rules for metadata object updates. For example, the root control structure can include smart contract logic configured to validate allocation changes, enforce lifecycle restrictions, or trigger state transitions based on event-driven conditions (e.g., receipt of an external validation signal or detection of a compliance breach). In some implementations, the root control structure includes additional executable instructions to interface with the metadata object of each resource descriptor by embedding operational logic into the metadata object. That is, the root control structure can inject token control structures or encoded logic into metadata fields and/or corresponding token control structured associated with resources included in the unified container. For example, the root control structure can append executable code segments or conditional rules to metadata objects of resource descriptors to autonomously validate updates or enforce restrictions. In another example, the root control structure can inject event-driven triggers into token control structures to modify operational markers or adjust resource dimension attributes when events and/or conditions occur.

In some implementations, the operational logic includes a plurality of instructions for updating the at least one resource dimension attribute for the at least one unrestricted resource descriptor or providing the deferred update status for the at least one restricted resource descriptor. That is, the operational logic can include code to update resource descriptors and/or tokenized assets. For example, the one or more processors can use the operational logic to programmatically modify allocation percentages or other attributes for unrestricted resource descriptors to align with allocation targets or apply lifecycle restrictions to restricted resource descriptors to preventing modifications pending satisfaction and/or occurrence of conditions and/or events.

In some implementations, each resource descriptor of the plurality of resource descriptors can correspond with a token encapsulating the metadata object. For example, a token can include a data structure or object including data (e.g., an identifier, hash value, etc.) indicating a corresponding resource descriptor and including metadata objects, token control structures, and/or data fields. For example, the token can correspond with a restricted resource data object (RDO) and encapsulate or store metadata fields encoding lifecycle constraints (e.g., lock periods or transfer restrictions), compliance requirements (e.g., jurisdictional approvals), and/or allocation parameters (e.g., target distribution levels). In some implementations, the token can include a token control structure including executable instructions to configured to restrict updates or outputs of the metadata object based on detecting the lifecycle restriction or threshold breach. That is, the token control structure can validate operational markers against predefined conditions to determine or identify permissible operations. For example, the token control structure can block allocation updates to a private equity resource descriptor by detecting an active jurisdictional restriction encoded in the metadata object from the identification and/or determination. In another example, the token control structure can trigger updates to resource dimension attributes when the metadata object reflects the expiration of a lock period or the receipt of external validation data.

In some implementations, the one or more processors can update, using at least one of the root control structure or the token control structure and the plurality of instructions, the at least one resource dimension attribute for the at least one unrestricted resource descriptor based on at least one quant measure or logical property corresponding with the first parameter. That is, the unrestricted resource descriptor can include and/or correspond with a protection record or other off-chain instrument or asset including a quant measure (e.g., allocation percentage, liquidity metric, or risk score) or logical property (e.g., lifecycle status or compliance flag), and the root control structure or token control structure can apply executable logic to validate or adjust corresponding tokenized attributes and/or resource descriptor data. For example, the one or more processors can perform a resource update responsive to an execution trigger corresponding with a change in a quant measure (e.g., asset valuation, etc.) or logical property (e.g., asset state) of an off-chain instrument or an off-chain event or condition by updating a corresponding resource dimension attribute of a resource descriptor included in the multi-resource container.

In some implementations, the one or more processors can provide, using at least one of the root control structure or the token control structure and the plurality of instructions, the deferred update status for the at least one restricted resource descriptor based on embedding data corresponding with the deferred update status in a data field of the token corresponding with the at least one operational marker. That is, the one or more processing circuits can provide the deferred update status by encoding and/or updating operational constraints within token metadata to preventing modifications to resource dimension attributes (e.g., token transfers or updates) pending occurrence of one or more events or conditions. For example, the one or more processors can embed a deferred update status in the metadata object of a restricted resource descriptor corresponding to a private equity holding by recording a lock period expiration timestamp and/or pending compliance marker validation. In another example, the one or more processors can update the deferred update status in the metadata object of a restricted resource descriptor in response to detecting the receipt of an external signal confirming satisfaction of jurisdictional transfer requirements associated with the resource descriptor.

In some implementations, the one or more processors can generate, using a first private key of a first public-private key pair corresponding with the data processing system, a cryptographic signature corresponding with an off-chain resource update performed for at least one resource descriptor of the first sub-container or the second sub-container. That is, an off-chain resource update can correspond to a modification or validation of properties or attributes of a resource based on events or changes occurring in an external environment or external system (e.g., updates to a private equity valuation or confirmation of a regulatory approval). In some implementations, the off-chain system can sign the resource update using a corresponding private key for the off-chain system. That is, the off-chain system can hash the resource update data and apply a private key to generate a digital signature. In some implementations, the resource update is verified using a second public key of a second public-private key pair corresponding with one or more control nodes corresponding with the at least one unrestricted resource or the at least one restricted resource. That is, the one or more processors can validate the received off-chain update by verifying the digital signature using the public key corresponding to the private key off the off-chain system. For example, the one or more processors can retrieve the public key of the off-chain system by accessing a registry, ledger, or metadata repository (e.g., a distributed ledger entry, a digital certificate store, or system-level configuration file) and can apply the public key to the received signature by executing a cryptographic verification algorithm (e.g., hashing and signature validation protocols, asymmetric encryption-based verification methods) to confirm the authenticity of the off-chain update.

In some implementations, the one or more processors can encapsulate, using the root control structure or the token control structure, the cryptographic signature for the resource update performed for the at least one resource descriptor within a corresponding metadata object. That is, the one or more processors can embed the cryptographic signature into a metadata object (e.g., as a signature attribute, validation marker, etc.) associated with the resource descriptor. For example, the root control structure can append the cryptographic signature to the metadata object of a resource descriptor by storing the signature corresponding data field. In some implementations, the one or more processors can provide, using at least one of a ledger storage or a protected data channel, a first public key of the first public-private key pair to the one or more control nodes. That is, the one or more processors can transmit as a data payload through a protected data channel (e.g., using an encrypted API call or cryptographically protected data packet) or store the public key within a ledger entry (e.g., a blockchain transaction or metadata object) accessible to the one or more control nodes.

In some implementations, the one or more processors can generate the deferred update status for the at least one restricted resource descriptor by embedding data corresponding with the lifecycle restriction or threshold breach in the at least one operational marker of the metadata object. For example, the one or more processors can update a data object and embed or record a lock period expiration timestamp, jurisdictional compliance parameters, or a pending external validation status within the metadata object associated with a restricted resource descriptor. In some implementations, the lifecycle restriction or threshold breach can include at least one of a lock period or release condition. That is, the one or more processors can encode and/or validate attributes corresponding to a lock period (e.g., a start and end timestamp) or conditions indicating release triggers (e.g., reaching a threshold value or receiving an external signal). For example, the one or more processors can store a release condition in the operational marker as a conditional attribute that is programmatically evaluated during updates to determine whether the resource descriptor remains in a deferred state. In some implementations, the lock period or release condition corresponds with an event, an interval, or a threshold value to transition the at least one restricted resource descriptor from the deferred update status to an update-permissible status. That is, the one or more processors can monitor or evaluate external inputs, timestamps, or metric changes (e.g., an equity valuation exceeding a threshold) to determine a resource descriptor can be updated (e.g., is update-permissible). In response to the identification that the descriptor is update-permissible, the one or more processors can extract or collect data for updating a corresponding operational marker. For example, the one or more processors can trigger a state transition by detecting the expiration of a lock period or receiving a digitally signed validation from an external system.

In some implementations, in response to detecting the update-permissible status, update the at least one restricted resource descriptor by modifying a corresponding resource dimension attribute. That is, the one or more processors can programmatically adjust attributes, such as allocation percentages, lifecycle states, or compliance markers, for previously restricted resources based on the transition from a deferred update status to an update-permissible status. For example, the one or more processors can update a resource descriptor of a private equity holding by modifying allocation data or risk scores to align with a portfolio rebalancing target upon receiving a signed validation signal or other update-permissible status indicating regulatory approval and/or other conditions. In some implementations, the one or more processors can record, in a corresponding metadata object, an updated state transition indicating the update to the at least one restricted resource descriptor. For example, the one or more processors can append an updated state transition entry to the metadata object of a restricted resource descriptor to record the removal of restrictions or operational constraints in response the detection of a triggering event or condition. That is, the one or more processors can embed an updated state transition including a signed state transition record or encoded validation marker within a corresponding metadata object.

In some implementations, the metadata object includes at least one external update field indicating a source for external updates. That is, the external update field can include data or references identifying external systems or devices, control nodes, or other sources configured to provide updated data corresponding with resource descriptors. For example, the external update field can include a URI, blockchain address, or cryptographic key of an external device or system. In some implementations, the one or more processors can retrieve, through a protected data channel, update instructions for performing the resource update comprising at least one of the first parameter and the second parameter from one or more control nodes or external devices corresponding with the plurality of resource descriptors. That is, the protected data channel can utilize encrypted API calls, messaging protocols, or distributed ledger transactions to retrieve resource-specific updates from external systems or management platforms. For example, the one or more processors can obtain allocation instructions, compliance verifications, or event-triggered updates from external systems, such as asset management platforms (e.g., investment cloud applications) associated with external managers. That is, the one or more processing can receive third-party or manager instructions or commands (e.g., target asset mix, risk tolerance parameters, lifecycle updates, etc.) for updating resource dimension attributes based on authenticating or verifying that the instructions or commands originate from a verified source associated with the external update field.

In some implementations, one or more control nodes or external devices correspond with the source indicated by the at least one external update field. That is, the one or more control nodes or external devices can include external systems, third-party management platforms, or regulatory interfaces identified by the external update field to provide instructions or data for updating resource descriptors. For example, the one or more control nodes can transmit allocation targets, compliance thresholds, or lifecycle parameters through for integration into the unified resource container. In some implementations, the one or more processors can determine, based on a comparison of an output of the multi-level validation to at least one of an upper bound or lower bound of at least one distribution band corresponding with the plurality of resource descriptors, the resource update complying with the lifecycle restriction or preventing the threshold breach. That is, the one or more processors can receive, analyze, and/or apply external manager instructions by validating allocation adjustments, risk thresholds, or lifecycle updates against predefined ranges (e.g., minimum or maximum allocations for asset categories). For example, the one or more processors can determine and/or identify that external allocation instructions for equity holdings remain within a permissible band or range (e.g., a lower bound of 30% and an upper bound of 70% of the portfolio) and can execute resource updates in response to the determination and/or identification.

Figure 8:
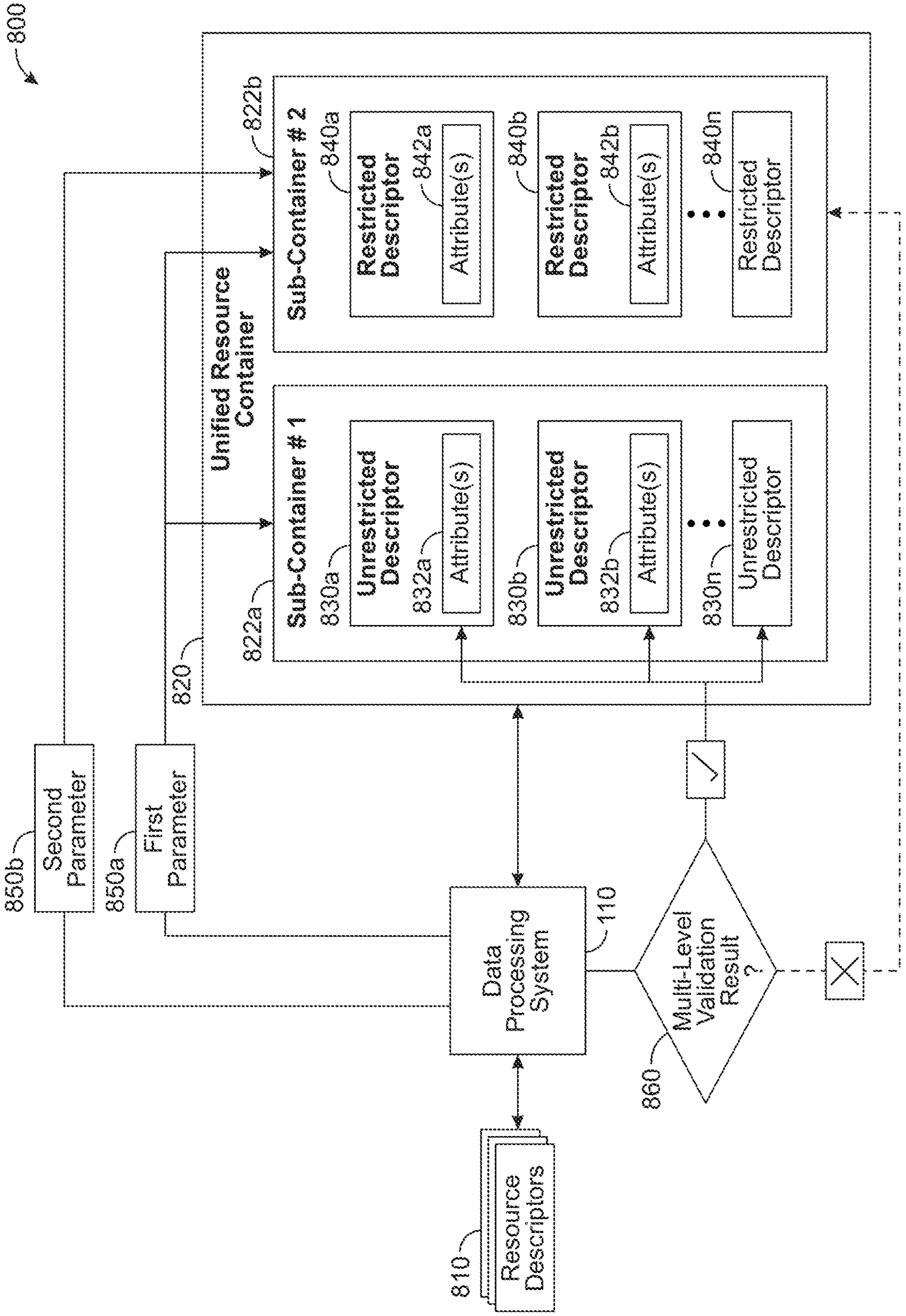
FIG. 8 depicts a block diagram of an example system for multi-level validation using a unified containerized framework, according to some implementations.

Referring now to FIG. 8, a block diagram of an example system 800 for multi-level validation using a unified containerized framework is shown, according to some implementations. In some implementations, the example system 800 can include data processing system 110, which can be structured or configured to receive one or more resource descriptors 810 corresponding to one or more restricted or unrestricted RDOs. In response to receiving the resource descriptors, 810, the data processing system 110 can generate a unified resource container 820. The data processing system 110 can generate one or more sub-containers within the unified resource container 820, such as a first sub-container 822*a* and a second sub-container 822*a*. In some examples, the first sub-container 822*a* can include a sleeve or token storing one or more unrestricted resource descriptors 830*a*-830*n* (collectively, unrestricted resource descriptors 830) and corresponding resource attributes 832*a*-832*b* (collectively, attributes 832). For example, the second sub-container 822*b* can include a sleeve or token storing one or more restricted resource descriptors 840*a*-840*n* (collectively, restricted resource descriptors 840) and corresponding resource attributes 842*a*-842*b* (collectively, attributes 842). In some examples, the one or more processors can perform a multi-level validation by applying a first parameter 850*a* to the first sub-container 822*a* and/or the second sub-container 822*b* and by applying a second parameter 850*b* to the second sub-container 822*b*. Based on an determining a multi-validation result 860, the data processing system 110 can update one or more attributes 832 of the unrestricted resource descriptors 830 in the first sub-container 822*a* and/or restrict an update to one or more attributes 842 of the restricted resource descriptors 840 in the second sub-container 822*b*.

FIG. 8 relates to systems and methods for dynamically managing financial assets within a unified resource container architecture. Current banking systems often manage a diverse set of client accounts, including deposit accounts, investment accounts, and/or insurance holdings, across multiple institutions. These systems lack a centralized mechanism for consolidating real-time updates to client portfolios, leading to inefficiencies in portfolio management, risk assessment, and/or advisory services. For example, providers rely on asynchronous data updates from disparate systems, which can result in outdated or incomplete portfolio views. Furthermore, manual processes for reconciling off-chain events, such as changes in resource allocations, asset revaluations, and/or regulatory updates, introduce operational delays and inaccuracies in portfolio data.

Traditional methods for asset management rely on static data models and periodic updates that fail to capture dynamic changes in client portfolios. These methods lack the ability to perform real-time validation of portfolio compliance with operational rules, lifecycle restrictions, and/or threshold conditions. For example, allocation limits for restricted investments can be breached without immediate detection due to infrequent data synchronization. Additionally, existing systems lack mechanisms for automating compliance checks and deferral conditions, resulting in increased reliance on manual intervention and higher operational costs.

Implementations of the present disclosure relate to systems and methods for improving portfolio management by dynamically partitioning financial assets into unified resource containers with sub-containers based on asset lifecycle characteristics. A data processing system can receive resource descriptors corresponding to client assets, where a first subset of resource descriptors represents unrestricted assets and a second subset represents restricted assets. The system can generate a unified resource container, partitioned into sub-containers that encapsulate metadata objects, resource dimension attributes, and/or operational markers for each asset.

Systems and methods in accordance with the present disclosure can improve real-time (or near real-time) data transfer and validation by dynamically determining and applying parameters based on operational data, such as off-chain events or compliance requirements. For example, the system can detect lifecycle restrictions or threshold breaches within resource descriptors, ensuring that updates to restricted assets are deferred until validation is completed. Additionally, the system can update unrestricted assets without delay, enhancing operational efficiency.

The system performs multi-level validation, applying global allocation parameters to the unified resource container and specific lifecycle constraints to the restricted asset sub-container. Based on the validation results, the system updates resource dimension fields for unrestricted assets while restricting updates to restricted assets. For example, if an off-chain event triggers a revaluation of a restricted asset, the system defers updates to the restricted sub-container pending manual approval or compliance checks. By recording state transitions within metadata objects, the system maintains an auditable history of portfolio changes and ensures adherence to operational rules. These systems and methods allow providers to improve portfolio management by automating compliance checks, reducing operational delays, and providing real-time insights into portfolio allocations. For example, by dynamically updating resource dimensions and operational markers, the system facilitates rebalancing, risk assessments, and financial planning services with enhanced accuracy and efficiency.

Systems and methods in accordance with the present disclosure can enhance financial data processing by employing dynamic partitioning techniques within a unified resource container framework. By consolidating client assets into a singular structure and dynamically validating operational parameters, providers can achieve higher accuracy and efficiency in portfolio management. The disclosed system operates by receiving a plurality of resource descriptors, each containing metadata objects encapsulating resource dimension attributes and operational markers. These resource descriptors are partitioned into sub-containers based on asset lifecycle characteristics, facilitating dynamic validation and updates. For example, a first parameter can be applied to the unified resource container to validate overall portfolio allocation, while a second parameter is applied to the restricted asset sub-container to validate compliance with lifecycle restrictions. In examples of threshold breaches or deferral conditions, the system can restrict updates to the corresponding sub-container and record a deferred update status in the metadata object. Additionally, updates to unrestricted assets can be performed in real time, improving responsiveness and operational efficiency. The disclosed system dynamically adapts to changes in off-chain events, such as revaluations, regulatory updates, and/or synchronization indicators from control nodes. By recording state transitions and operational markers within the metadata, the system provides an audit trail for portfolio activities. Thus, the dynamic partitioning system described herein improves data accuracy, reduces manual intervention, and/or enhances compliance modeling.

In some implementations, the data processing system 110 can initialize the unified resource container 820 by processing resource descriptors 810 received from external systems or data sources (e.g., control nodes, user computing systems, etc.). For example, the data processing system 110 can receive unrestricted resource descriptors 830 corresponding to publicly traded equities or ETFs and store data corresponding to the resource descriptors in the first sub-container 822*a*. For example, the data processing system 110 can receive restricted resource descriptors 840 corresponding to private equity holdings or limited partnership interests and store data corresponding to the resource descriptors in the second sub-container 822*b*. In some examples, the data processing system 110 can categorize or group assets or resources by generating sub-container tags or embedding data metadata objects (e.g., attributes 832, attributes 842, etc.) with data fields or storage locations (e.g., addresses, access points, identifiers, etc.) associated with the sub-containers 822*a*-822*b* (collectively, sub-containers 822). For example, unrestricted resource descriptors 830 can include attributes 832 indicating quantitative or logical data (e.g., target allocation levels or risk tolerances) and restricted resource descriptors 840 can include attributes 842 encoding lifecycle restrictions (e.g., lock periods, other state-based constraints).

In some implementations, the data processing system 110 can receive a trigger or command to perform a portfolio rebalancing operation or to query specific resource attributes. For example, the data processing system 110 can receive a request, notification, or trigger originating from an external manager or control node and via a protected data channel (e.g., encrypted API call or distributed ledger transaction). In some implementations, the request, notification, or trigger can include an event, condition, update, and/or any data corresponding with the unified resource container 820 and/or included assets or resources. For example, the data processing system 110 can receive a request to rebalance an account including the first parameter 850*a* and/or second parameter 850*b*. In some examples, the first parameter 850*a* and/or second parameter 850*b* can be stored in association with the unified resource container 820 or one or more sub-containers (e.g., first sub-container 822*a* or second sub-container 822*b*). For example, the first parameter 850*a* and/or second parameter 850*b* can be stored within a metadata object or root control structure associated with the unified resource container 820 and/or sub-containers 822. In another example, the first parameter 850*a* and/or second parameter 850*b* can be stored within metadata objects or token control structures corresponding with the stored resource descriptors.

In response to the trigger or command, the data processing system 110 can perform various operations, such as modifying resource descriptors or performing a lookup operation. For example, in response receiving a rebalancing command, the data processing system 110 can update allocation parameters by updating resource dimension attributes (e.g., attributes 832) associated with the unrestricted resource descriptors 830. within unrestricted resource descriptors 830 in the first sub-container 822*a* to align with portfolio-wide constraints or updated risk parameters. In another example, in response to receiving a lookup or query command, the data processing system 110 can retrieve one or more of the attributes 832 or attributes 842 and provide corresponding resource data using a graphical user interface, API, and/or other output mechanism (e.g., by generating a structured report or transmitting a dataset to an external system). That is, the data processing system 110 can process commands or triggers to perform operations including rebalancing portfolios, querying resource data, performing resource updates, and/or various additional or supplemental operations.

While this specification contains many specific implementation details and/or arrangement details, these should not be construed as limitations on the scope of any disclosure or of what may be claimed, but rather as descriptions of features specific to particular implementations and/or arrangements of the systems and methods described herein. Certain features that are described in this specification in the context of separate implementations and/or arrangements can also be implemented and/or arranged in combination in a single implementation and/or arrangement. Conversely, various features that are described in the context of a single implementation and/or arrangement can also be implemented and arranged in multiple implementations and/or arrangements separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Additionally, features described with respect to particular headings may be utilized with respect to and/or in combination with illustrative implementation described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations and/or arrangements described above should not be understood as requiring such separation in all implementations and/or arrangements, and it should be understood that the described program components and systems can generally be integrated together in a single software product or packaged into multiple software products.

Having now described some illustrative implementations, implementations, illustrative arrangements, and arrangements it is apparent that the foregoing is illustrative and not limiting, having been presented by way of example. In particular, although many of the examples presented herein involve specific combinations of method acts or system elements, those acts, and those elements may be combined in other ways to accomplish the same objectives. Acts, elements and features discussed only in connection with one implementation and/or arrangement are not intended to be excluded from a similar role in other implementations or arrangements.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations and/or arrangements consisting of the items listed thereafter exclusively. In one arrangement, the systems and methods described herein consist of one, each combination of more than one, or all of the described elements, acts, or components.

Any references to implementations, arrangements, or elements or acts of the systems and methods herein referred to in the singular may also embrace implementations and/or arrangements including a plurality of these elements, and any references in plural to any implementation, arrangement, or element or act herein may also embrace implementations and/or arrangements including only a single element. References in the singular or plural form are not intended to limit the presently disclosed systems or methods, their components, acts, or elements to single or plural configurations. References to any act or element being based on any information, act or element may include implementations and/or arrangements where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

Any arrangement disclosed herein may be combined with any other arrangement, and references to "an arrangement," "some arrangements," "an alternate arrangement," "various arrangements," "one arrangement" or the like are not necessarily mutually exclusive and are intended to indicate that a particular feature, structure, or characteristic described in connection with the arrangement may be included in at least one arrangement. Such terms as used herein are not necessarily all referring to the same arrangement. Any arrangement may be combined with any other arrangement, inclusively or exclusively, in any manner consistent with the aspects and arrangements disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations and/or arrangements are illustrative rather than limiting of the described systems and methods. Scope of the systems and methods described herein is thus indicated by the appended claims, rather than the foregoing description, and changes that come within the meaning and range of equivalency of the claims are embraced therein.

It should be understood that no claim element herein is to be construed under the provisions of 35 U.S.C. § 112(f) unless the element is expressly recited using the phrase "means for."

As used herein, the term "circuit" may include hardware structured to execute the functions described herein. In some implementations, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors. In some implementations, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring.

The "circuit" may also include one or more processors communicatively coupled to one or more memory or memory devices. In this regard, the one or more processors may execute instructions stored in the memory or may execute instructions otherwise accessible to the one or more processors. In some implementations, the one or more processors may be embodied in various ways. The one or more processors may be constructed in a manner sufficient to perform at least the operations described herein. In some implementations, the one or more processors may be shared by multiple circuits (e.g., circuit A and circuit B may comprise or otherwise share the same processor which, in some example implementations, may execute instructions stored, or otherwise accessed, via different areas of memory). Alternatively, or additionally, the one or more processors may be structured to perform or otherwise execute certain operations independent of one or more co-processors. In other example implementations, two or more processors may be coupled via a bus to facilitate independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor. In some implementations, the one or more processors may be external to the apparatus, for example the one or more processors may be a remote processor (e.g., a cloud based processor). Alternatively, or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the implementations can include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some implementations, the non-volatile media may take the form of ROM, flash memory (e.g., flash memory such as NAND, 3D NAND, NOR, 3D NOR), EEPROM, MRAM, magnetic storage, hard discs, optical discs, etc. In other implementations, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example implementations described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), math-based currencies (often referred to as cryptocurrencies), and central bank digital currency (often referred to as CBDC). Examples of math-based currencies include Bitcoin, Ethereum, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure can be accomplished with standard programming techniques with rule-based logic and other logic to accomplish the various database searching steps, correlation steps, comparison steps and decision steps.

What is claimed is:

1. A system, comprising:

a data processing system comprising memory and one or more processors configured to:

receive, from a user device, a protected record authorization for obtaining a plurality of protection records, the plurality of protection records corresponding to a plurality of control nodes, wherein each protection record of the plurality of protection records comprises at least a quant measure, a classification index, and an identifier;

obtain, using a protected data channel, the plurality of protection records from each control node of the plurality of control nodes based on performing at least one handshake verifying a source of each control node of the plurality of control nodes;

generate, based on the plurality of protection records, a set of tokens encapsulating a metadata object, wherein each token comprises a token control structure that restricts an update or an output to the metadata object, and wherein the metadata object comprises at least one status attribute corresponding with an operational state of a corresponding protection record and at least one quant attribute corresponding with tracking an update in the quant measure of the corresponding protection record;

store, in a ledger storage, the set of tokens;

generate a root control structure to apply a plurality of operational rules for metadata object updates, wherein the root control structure comprises executable instructions to interface with a plurality of metadata objects of the set of tokens;

detect, using the root control structure, at least one off-chain event or condition corresponding with at least one protection record of the plurality of protection records; and in response to detecting the at least one off-chain event or condition, update, on the ledger storage using at least one of the root control structure or the token control structure, the metadata object based on updating at least one of a status attribute of a token of the set of tokens or a quant attribute of the token of the set of tokens.

2. The system of claim 1, wherein the root control structure comprises additional executable instructions to interface with the token control structure of each token of the set of tokens by embedding operational logic into the metadata object, wherein the operational logic comprises a plurality of instructions for updating the status attribute or the quant attribute based on the at least one off-chain event or condition detected by the root control structure.

3. The system of claim 2, wherein to update the metadata object, the one or more processors configured to:

update, using at least one of the root control structure or the token control structure and the plurality of instructions, the status attribute indicating at least one of a state change or updated status corresponding with the operational state of the corresponding protection record; or update, using at least one of the root control structure or the token control structure and the plurality of instructions, the quant attribute of the token based at least on the update to the quant measure of the corresponding protection record.

4. The system of claim 1, wherein to detect the at least one off-chain event or condition, the one or more processors configured to:

receive, using at least one of the root control structure or the token control structure and the protected data channel, a synchronization indicator from one or more control nodes of the plurality of control nodes, wherein the synchronization indicator corresponds with at least one of:

receipt or detection of updated resource data corresponding with the corresponding protection record; or identification of a predefined temporal event corresponding with the one or more control nodes.

5. The system of claim 1, wherein to detect the at least one off-chain event or condition, the one or more processors configured to:

determine at least one of an exchange at one or more control nodes of the plurality of control nodes updating the quant measure of the corresponding protection record; or update the quant measure of the corresponding protection record based on a re-modeling applied by the one or more control nodes.

6. The system of claim 1, the one or more processors configured to:

validate, using a first public key of a first public-private key pair corresponding with at least one control node of the plurality of control nodes, a first cryptographic signature of the corresponding protection record, wherein the first cryptographic signature is generated using a first private key of the first public-private key pair; and embed a second cryptographic signature in at least one field of the metadata object of the token, wherein the second cryptographic signature is generated using a second private key of a second public-private key pair corresponding with the data processing system or a third private key of the at least one control node.

7. The system of claim 6, the one or more processors configured to:

store or provide, using the ledger storage or the protected data channel, a second public key of the second public-private key pair; and perform, using at least one of the root control structure or the token control structure, the update to the metadata object in response to validating the second cryptographic signature using the second public key, wherein validating comprises:

extraction of the second cryptographic signature from the at least one field of the metadata object;

decryption, using the second public key, of the second cryptographic signature to generate a validation hash; and comparison of the validation hash to a computed hash of the metadata object.

8. The system of claim 6, the one or more processors configured to:

perform, using the protected data channel, the at least one handshake based on at least one of (i) exchanging at least one of the first public key and the second public key with the at least one control node, (ii) executing a challenge-response protocol with the at least one control node, or (iii) analyzing a digital certificate provided by the at least one control node; and restrict, using the token control structure, the update to the metadata object based on determining that a validation of the second cryptographic signature indicates a variation between the second cryptographic signature and a computed hash of the metadata object.

9. The system of claim 1, the one or more processors configured to:

identify, based on the classification index, a plurality of resource descriptors corresponding with the plurality of protection records; and identify, based on the plurality of resource descriptors and a plurality of quant attributes of the set of tokens, a resource distribution corresponding with the set of tokens.

10. The system of claim 1, wherein the quant attribute of the token comprises at least one numeric or alphanumeric data field of the metadata object indicating a resource quantity of the corresponding protection record, and wherein the update in the quant measure of the corresponding protection record is based on an off-chain or on-chain modification to the resource quantity.

11. A method, comprising:

receiving, by one or more processors of a data processing system from a user device, a protected record authorization for obtaining a plurality of protection records, the plurality of protection records corresponding to a plurality of control nodes, wherein each protection record of the plurality of protection records comprises at least a quant measure, a classification index, and an identifier;

obtaining, by the one or more processors using a protected data channel, the plurality of protection records from each control node of the plurality of control nodes based on performing at least one handshake verifying a source of each control node of the plurality of control nodes;

generating, by the one or more processors based on the plurality of protection records, a set of tokens encapsulating a metadata object, wherein each token comprises a token control structure that restricts an update or an output to the metadata object, and wherein the metadata object comprises at least one status attribute corresponding with an operational state of a corresponding protection record and at least one quant attribute corresponding with tracking an update in the quant measure of the corresponding protection record;

storing, by the one or more processors in a ledger storage, the set of tokens;

generating, by the one or more processors, a root control structure to apply a plurality of operational rules for metadata object updates, wherein the root control structure comprises executable instructions to interface with a plurality of metadata objects of the set of tokens;

detecting, by the one or more processors using the root control structure, at least one off-chain event or condition corresponding with at least one protection record of the plurality of protection records; and in response to detecting the at least one off-chain event or condition, updating, by the one or more processors on the ledger storage using at least one of the root control structure or the token control structure, the metadata object based on updating at least one of a status attribute of a token of the set of tokens or a quant attribute of the token of the set of tokens.

12. The method of claim 11, wherein the root control structure comprises additional executable instructions to interface with the token control structure of each token of the set of tokens by embedding operational logic into the metadata object, wherein the operational logic comprises a plurality of instructions for updating the status attribute or the quant attribute based on the at least one off-chain event or condition detected by the root control structure.

13. The method of claim 12, wherein updating the metadata object comprises:

updating, by the one or more processors using at least one of the root control structure or the token control structure and the plurality of instructions, the status attribute indicating at least one of a state change or updated status corresponding with the operational state of the corresponding protection record; or updating, by the one or more processors using at least one of the root control structure or the token control structure and the plurality of instructions, the quant attribute of the token based at least on the update to the quant measure of the corresponding protection record.

14. The method of claim 11, wherein detecting the at least one off-chain event or condition comprises:

receiving, by the one or more processors using at least one of the root control structure or the token control structure and the protected data channel, a synchronization indicator from one or more control nodes of the plurality of control nodes, wherein the synchronization indicator corresponds with at least one of:

receipt or detection of updated resource data corresponding with the corresponding protection record; or identification of a predefined temporal event corresponding with the one or more control nodes.

15. The method of claim 11, wherein detecting the at least one off-chain event or condition comprises:

determining, by the one or more processors, at least one of an exchange at one or more control nodes of the plurality of control nodes updating the quant measure of the corresponding protection record; or updating, by the one or more processors, the quant measure of the corresponding protection record based on a re-modeling applied by the one or more control nodes.

16. The method of claim 11, comprising:

validating, by the one or more processors using a first public key of a first public-private key pair corresponding with at least one control node of the plurality of control nodes, a first cryptographic signature of the corresponding protection record, wherein the first cryptographic signature is generated using a first private key of the first public-private key pair; and embedding, by the one or more processors using the token control structure, a second cryptographic signature in at least one field of the metadata object of the token, wherein the second cryptographic signature is generated using a second private key of a second public-private key pair corresponding with the data processing system or a third private key of the at least one control node.

17. The method of claim 16, comprising:

storing or providing, by the one or more processors using the ledger storage or the protected data channel, a second public key of the second public-private key pair; and performing, by the one or more processors using at least one of the root control structure or the token control structure, the update to the metadata object in response to validating the second cryptographic signature using the second public key, wherein validating comprises:

extraction of the second cryptographic signature from the at least one field of the metadata object;

decryption, using the second public key, of the second cryptographic signature to generate a validation hash; and comparison of the validation hash to a computed hash of the metadata object.

18. The method of claim 16, comprising:

performing, by the one or more processors using the protected data channel, the at least one handshake based on at least one of (i) exchanging at least one of the first public key and the second public key with the at least one control node, (ii) executing a challenge-response protocol with the at least one control node, or (iii) analyzing a digital certificate provided by the at least one control node; and restricting, by the one or more processors using the token control structure, the update to the metadata object based on determining that a validation of the second cryptographic signature indicates a variation between the second cryptographic signature and a computed hash of the metadata object.

19. The method of claim 11, comprising:

determining, by the one or more processors based on the classification index, a plurality of resource descriptors corresponding with the plurality of protection records; and identifying, by the one or more processors based on the plurality of resource descriptors and a plurality of quant attributes of the set of tokens, a resource distribution corresponding with the set of tokens.

20. A non-transitory computer readable medium (CRM) comprising one or more instructions stored thereon that, when executed by one or more processors, cause the one or more processors to perform operations comprising:

receiving, from a user device, a protected record authorization for obtaining a plurality of protection records, the plurality of protection records corresponding to a plurality of control nodes, wherein each protection record of the plurality of protection records comprises at least a quant measure, a classification index, and an identifier;

obtaining, using a protected data channel, the plurality of protection records from each control node of the plurality of control nodes based on performing at least one handshake verifying a source of each control node of the plurality of control nodes;

generating, based on the plurality of protection records, a set of tokens encapsulating a metadata object, wherein each token comprises a token control structure that restricts an update or an output to the metadata object, and wherein the metadata object comprises at least one status attribute corresponding with an operational state of a corresponding protection record and at least one quant attribute corresponding with tracking an update in the quant measure of the corresponding protection record;

storing, in a ledger storage, the set of tokens;

generating a root control structure to apply a plurality of operational rules for metadata object updates, wherein the root control structure comprises executable instructions to interface with a plurality of metadata objects of the set of tokens;

detecting, by the one or more processors using the root control structure, at least one off-chain event or condition corresponding with at least one protection record of the plurality of protection records; and in response to detecting the at least one off-chain event or condition, updating, on the ledger storage using at least one of the root control structure or the token control structure, the metadata object based on updating at least one of a status attribute of a token of the set of tokens or a quant attribute of the token of the set of tokens.

* * * * *